US011063770B1

(12) United States Patent
Peng

(10) Patent No.: US 11,063,770 B1
(45) Date of Patent: Jul. 13, 2021

(54) DATA AUTHORIZATION BASED ON DECENTRALIZED IDENTIFIERS

(71) Applicant: ALIPAY (HANGZHOU) INFORMATION TECHNOLOGY CO., LTD., Zhejiang (CN)

(72) Inventor: Yujun Peng, Hangzhou (CN)

(73) Assignee: Alipay (Hangzhou) Information Technology Co., Ltd., Zhejiang (CN)

( * ) Notice: Subject to any disclaimer, the term of this patent is extended or adjusted under 35 U.S.C. 154(b) by 0 days.

(21) Appl. No.: 17/139,132

(22) Filed: Dec. 31, 2020

Related U.S. Application Data

(63) Continuation of application No. PCT/CN2020/079347, filed on Mar. 13, 2020.

(51) Int. Cl.
  *H04L 29/06* (2006.01)
  *H04L 9/32* (2006.01)
  *G06F 21/62* (2013.01)

(52) U.S. Cl.
  CPC ........ *H04L 9/3247* (2013.01); *G06F 21/6227* (2013.01); *H04L 9/3239* (2013.01); *H04L 2209/38* (2013.01)

(58) Field of Classification Search
  CPC . H04L 9/3247; H04L 9/3239; H04L 2209/38; G06F 21/6227
  See application file for complete search history.

(56) References Cited

U.S. PATENT DOCUMENTS

2018/0139186 A1  5/2018 Castagna
2019/0230092 A1* 7/2019 Patel ................. H04L 9/0869
(Continued)

FOREIGN PATENT DOCUMENTS

CN  110795501  2/2020
CN  111095865  5/2020
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Ghodrat Jamshidi
(74) *Attorney, Agent, or Firm* — Fish & Richardson P.C.

(57) ABSTRACT

Disclosed herein are methods, systems, and apparatus for controlling authorization of access to user data. One of the methods includes generating a first decentralized identifier based on information about a second decentralized identifier and information about a third decentralized identifier; registering a first set of records and the first decentralized identifier at a second blockchain, the second blockchain includes one or more blockchain contracts configured to, upon execution, perform one or more operations associated with the first decentralized identifier, and registering the first set of records includes storing a hash value for each record in the first set of records in the second blockchain; and controlling authorization of access to the first set of records based on the first decentralized identifier, including in response to receiving a request to grant a second user access to a particular record in the first set of records, determining whether the request includes the first decentralized identifier.

20 Claims, 35 Drawing Sheets

(56) References Cited

U.S. PATENT DOCUMENTS

| | | | | |
|---|---|---|---|---|
| 2019/0333054 A1* | 10/2019 | Cona | ................. | H04L 9/0894 |
| 2020/0036707 A1* | 1/2020 | Callahan | ............... | H04L 9/3231 |
| 2020/0067907 A1 | 2/2020 | Avetisov et al. | | |
| 2020/0127828 A1* | 4/2020 | Liu | ......................... | H04L 9/30 |
| 2020/0127847 A1* | 4/2020 | Yang | .................. | H04L 63/0815 |
| 2020/0153606 A1* | 5/2020 | Li | .......................... | H04L 63/08 |
| 2020/0153639 A1 | 5/2020 | Yang et al. | | |
| 2020/0301894 A1* | 9/2020 | Heo | ...................... | H04L 9/3239 |
| 2020/0344237 A1* | 10/2020 | Murdoch | ............. | H04L 9/3239 |

FOREIGN PATENT DOCUMENTS

| | | |
|---|---|---|
| EP | 3799642 | 4/2021 |
| WO | WO 2019228557 | 12/2019 |
| WO | WO 2020098839 | 5/2020 |
| WO | WO 2021000337 | 1/2021 |

OTHER PUBLICATIONS

Nakamoto, "Bitcoin: A Peer-to-Peer Electronic Cash System," www.bitcoin.org, 2005, 9 pages.

PCT International Search Report and Written Opinion in International Application No. PCT/CN2020/079347, dated Dec. 16, 2020, 8 pages.

www.w3.org [online], "Decentralized Identifiers (DIDS) v1.0, Core Data Model and Syntaxes," W3C Working Draft, dated Dec. 9, 2019, retreived on Feb. 1, 2021, retrieved from URL<"https://www.w3.org/TR/did-core"> 102 pages.

Extended European Search Report in European Application No. 20725752.8 dated May 10, 2021, 6 pages.

\* cited by examiner

1400

1402 Receive multiple sets of one or more requests for digital activity DIDs, in which each digital activity identifier is associated with a DID of a user and also associated with a consortium blockchain, each set of one or more requests includes information about a corresponding DID of a user and one or more business DIDs associated with one or more consortium blockchains, and different sets of one or more requests include information about different DIDs of different users.

1404 Generate the digital activity DIDs in response to the multiple sets of one or more requests for digital activity DIDs, in which each digital activity DID is associated with a particular DID of a particular user and also associated with a particular business DID, different digital activity DIDs associated with the same set of one or more requests are associated with a same DID of a user and associated with different business DIDs, and different digital activity DIDs associated with different sets of one or more requests are associated with different DIDs of different users.

1406 Store data about the digital activity DIDs and the DIDs of the users in multiple records in a first DID blockchain, in which each record stores data associated with one of the users. In some embodiments, storing data includes executing a smart contract at the DID blockchain node to store the data.

1408 Manage authorization of access to data that are associated with the users and stored in the consortium blockchains at least in part based on the records stored in the first DID blockchain. In some embodiments, managing authorization of access to the data includes enabling one user to authorize another user to access data that are associated with the one user and stored in the corresponding consortium blockchain.

FIG. 14

DATA AUTHORIZATION BASED ON DECENTRALIZED IDENTIFIERS

CROSS-REFERENCE TO RELATED APPLICATIONS

This application is a continuation of PCT Application No. PCT/CN2020/079347, filed on Mar. 13, 2020, which is hereby incorporated by reference in its entirety.

TECHNICAL FIELD

This specification relates to data authorization based on decentralized identifiers with enhanced security.

BACKGROUND

Distributed ledger systems (DLSs), which can also be referred to as consensus networks, and/or blockchain networks, enable participating entities to securely, and immutably store data. DLSs are commonly referred to as blockchain networks without referencing any particular user case. Examples of types of blockchain networks can include public blockchain networks, private blockchain networks, and consortium blockchain networks. A consortium blockchain network is provided for a select group of entities, which control the consensus process, and includes an access control layer. The blockchain networks can be associated with many applications that provide services to users, and each user can have one or more identifiers that can be used to prove the identity of the user. The applications can generate large amounts of data associated with the users, e.g., business transaction data, financial data, healthcare data, shopping data, entertainment activity data, web search data, communication data, and transportation activity data.

It would be desirable to allow each user to be able to control (e.g., authorize or deny) the release or access of the data associated with the user by other users.

SUMMARY

Described embodiments of the subject matter can include one or more features, alone or in combination.

For example, in one embodiment, a computer-implemented method includes generating a first decentralized identifier based on information about a second decentralized identifier and information about a third decentralized identifier, in which the second decentralized identifier is associated with a first user, the third decentralized identifier is associated with a first blockchain that is configured to store records associated with the first user; registering a first set of records and the first decentralized identifier at a second blockchain, wherein the first set of records include data associated with the first user, and the first set of records is stored in the first consortium blockchain, the second blockchain includes one or more blockchain contracts configured to, upon execution, perform one or more operations associated with the first decentralized identifier, and registering the first set of records includes storing a hash value for each record in the first set of records in the second blockchain; and controlling authorization of access to the first set of records based on the first decentralized identifier, including in response to receiving a request to grant a second user access to a particular record in the first set of records, determining whether the request includes the first decentralized identifier.

In some embodiments, these general and specific aspects may be implemented using a system, a method, or a computer program, or any combination of systems, methods, and computer programs. The foregoing and other described embodiments can each, optionally, include one or more of the following aspects:

In some embodiments, the first decentralized identifier includes a digital activity decentralized identifier, the second decentralized identifier includes a digital identity decentralized identifier, and the third decentralized identifier includes a business decentralized identifier.

In some embodiments, the first set of records is generated or managed by a business system that provides a service to the first user, and the business system manages storage of the records into the first consortium blockchain and retrieval of the records from the first consortium blockchain.

In some embodiments, the first blockchain includes a consortium blockchain

In some embodiments, the second blockchain includes a decentralized identifier blockchain that is configured to store records associated with a plurality of decentralized identifiers of a plurality of users, and the decentralized identifier blockchain includes one or more blockchain contracts configured to, upon execution, perform one or more operations associated with the decentralized identifiers.

In some embodiments, the request includes a first value that represents a hash value of the particular record, wherein controlling authorization of access to the first set of records includes: comparing the first value in the request with a hash value of the particular record stored in the second blockchain, and at least one of (i) upon determining that the first value in the request is equal to the hash value of the particular record stored in the second blockchain, approving the request to grant the second user access to the particular record, or (ii) upon determining that the first value in the request is different from the hash value of the particular record stored in the second blockchain, denying the request to grant the second user access to the particular record.

In some embodiments, the method further includes sending a first message to a first application program associated with the first user to cause the first application program to retrieve the particular record from the first blockchain and present the particular record for review by the first user.

In some embodiments, the first message includes a first value that represents the hash value of the particular record, and the first message is configured to cause the first application program to: calculate a second value that represents a hash value of the particular record retrieved from the first blockchain, compare the first value with the second value, and at least one of (i) upon determining that the first value is equal to the second value, approve the request to grant the second user access to the particular record, or (ii) upon determining that the first value is different from the second value, deny the request to grant the second user access to the particular record.

In another embodiment, a system for managing user data based on decentralized identifiers is provided. The system includes a decentralized identifier generation module configured to generate digital identity decentralized identifiers that are associated with users, wherein each digital identity decentralized identifier is associated with one of the users, the decentralized identifier generation module is configured to generate business decentralized identifiers that are associated with consortium blockchains that are configured to store data records associated with the users, each business decentralized identifier is associated with one of the consortium blockchains, and the decentralized identifier generation module is further configured to generate digital activity decentralized identifiers that are each associated with one of the users and one of the consortium blockchains; a verification module configured to verify validity of digital identity decentralized identifiers, the validity of business decentralized identifiers, and the validity of digital activity decentralized identifiers; and a decentralized identifier blockchain module configured to update information in a decentralized identifier blockchain that is configured to store digital identity decentralized identifiers and business decentralized identifiers, wherein the decentralized identifier blockchain is further configured to store hash values of the data records stored in the consortium blockchains, and the decentralized identifier blockchain includes one or more blockchain contracts configured to, upon execution, perform one or more operations associated with the various decentralized identifiers.

In some embodiments, these general and specific aspects may be implemented using a system, a method, or a computer program, or any combination of systems, methods, and computer programs. The foregoing and other described embodiments can each, optionally, include one or more of the following aspects:

In some embodiments, the verification module is configured to verify validity of a first request to grant a second user access to a first record associated with a first user, wherein the first record is stored in a first consortium blockchain, and the verification module is configured to determine whether the first request includes a digital activity decentralized identifier associated with the first user and the first consortium blockchain.

In some embodiments, the first request includes a first value representing a hash value of the first record, the verification module is configured to compare the first value with a stored hash value of the first record, and at least one of (i) upon determining that the first value is equal to the stored hash value of the first record, approve the first request to grant the second user access to the first record, or (ii) upon determining that the first value is different from the stored hash value of the first record, deny the first request to grant the second user access to the first record.

In some embodiments, the verification module is configured to send a first message to a first decentralized application program associated with the first user to cause the first decentralized application program to retrieve the first record from the first consortium blockchain and present the first record on a user interface.

In some embodiments, the first message includes a second value that represents the hash value of the first record, and the first message is configured to cause the first decentralized application program to: retrieve the first record from the first consortium blockchain, calculate a third value that represents a hash value of the first record retrieved from the first consortium blockchain, compare the second value with the third value, and at least one of (i) upon determining that the second value is equal to the third value, approve the first request to grant the second user access to the first record, or (ii) upon determining that the second value is different from the third value, deny the first request to grant the second user access to the first record.

In some embodiments, the decentralized identifier generation module is configured to generate each digital activity decentralized identifier based on information about a digital identity decentralized identifier associated with a corresponding user and information about a business decentralized identifier associated with a corresponding consortium blockchain.

In some embodiments, the decentralized identifier blockchain module is configured to link each hash value with the corresponding digital identity decentralized identifier that is associated with the corresponding user, in which the hash value is calculated from a corresponding data record associated with the corresponding user.

In some embodiments, the system further includes a first business system that generates and/or manages the data records associated with the first user and stored in a first consortium blockchain, wherein the first business system provides a user interface to enable the first user to interact with the first business system, and the first business system manages storage of the data records into the first consortium blockchain and retrieval of the data records from the first consortium blockchain.

In some embodiments, the system further includes a decentralized application program that is executed on a device of a first user and configured to interact with the decentralized identifier generation module to obtain a decentralized identifier for the first user.

In some embodiments, the decentralized application program is configured to interact with the decentralized identifier generation module to obtain a digital activity decentralized identifier that is associated with a first consortium blockchain that stores data records associated with the first user.

In some embodiments, the decentralized application program is configured to, upon receiving a message indicating that the system has received a first request to grant a second user access to a first record associated with the first user, the first record being stored in a first consortium blockchain, retrieve the first record from the first consortium blockchain and present the first record on a user interface.

In another embodiment, a computer-implemented method for controlling authorization of access to data is provided. The method includes receiving a first request for a first digital activity decentralized identifier, wherein the first request is sent from a first application program associated with a first user, the first request includes information about a first user decentralized identifier (DID) associated with the first user and a first business decentralized identifier associated with a first blockchain network that maintains a first blockchain; generating the first digital activity decentralized identifier; providing the first digital activity decentralized identifier to the first application program; storing information about the first user decentralized identifier and the first digital activity decentralized identifier in a first record in a first decentralized identifier blockchain that is configured to store records associated with a plurality of decentralized identifiers of a plurality of users; and controlling authorization of access to data that are associated with the first user and stored in the first blockchain using the information stored in the first record in the first decentralized identifier blockchain.

In some embodiments, these general and specific aspects may be implemented using a system, a method, or a computer program, or any combination of systems, methods, and computer programs. The foregoing and other described embodiments can each, optionally, include one or more of the following aspects:

In some embodiments, the first blockchain network includes a first consortium blockchain network, and the first blockchain includes a first consortium blockchain.

In some embodiments, the method includes storing information about the first business decentralized identifier associated with the first consortium blockchain network in the first record in the first decentralized identifier blockchain.

In some embodiments, the method further includes receiving a second request for a second digital activity decentralized identifier, wherein the second request includes information about the first user decentralized identifier of the first user and a second business decentralized identifier associated with a second consortium blockchain network that maintains a second consortium blockchain; generating the second digital activity decentralized identifier; providing the second digital activity decentralized identifier to the first application program; storing information about the second digital activity decentralized identifier in the first record in the first decentralized identifier blockchain; and controlling authorization of records that are associated with the first user and stored in the second consortium blockchain using information in the first record in the first decentralized identifier blockchain.

In some embodiments, the method includes storing information about the second business decentralized identifier associated with the second consortium blockchain in the first record in the first decentralized identifier blockchain.

In some embodiments, the method further includes receiving a plurality of requests for a plurality of digital activity decentralized identifiers, wherein each of the plurality of requests includes information about the first user decentralized identifier of the first user and a particular business decentralized identifier associated with a particular consortium blockchain; generating the plurality of digital activity decentralized identifiers, wherein each of the digital activity decentralized identifiers corresponds to one of the business decentralized identifiers; storing the digital activity decentralized identifiers in the first record in the first decentralized identifier blockchain; and controlling authorization of records that are associated with the first user and stored in the consortium blockchains using information in the first record in the first decentralized identifier blockchain.

In some embodiments, the method further includes storing information about the business decentralized identifiers corresponding to the plurality of digital activity decentralized identifiers in the first record in the first decentralized identifier blockchain.

In some embodiments, the first application program associated with the first user includes a digital wallet decentralized application program associated with the first user.

In some embodiments, the first request is received at a first blockchain node of a first decentralized identifier blockchain network, and the first digital activity decentralized identifier is generated at the first blockchain node.

In some embodiments, generating the first digital activity decentralized identifier includes executing a smart contract at the first blockchain node of the first decentralized identifier blockchain network, wherein the smart contract is configured to generate the first digital activity decentralized identifier based on information included in the first request.

In some embodiments, storing information about the first user decentralized identifier of the first user and the first digital activity decentralized identifier in the first record in the first decentralized identifier blockchain includes executing a smart contract at the first blockchain node of the first decentralized identifier blockchain network to store the information.

In some embodiments, the method further includes: prior to receiving the first request for the first digital activity decentralized identifier, receiving a second request for obtaining the first user decentralized identifier, wherein the second request is sent from the first application program associated with the first user; obtaining a first proof of identity authentication based on the second request; verifying an identity of the first user based on the first proof of identity authentication; generating the first user decentralized identifier of the first user; providing the first user decentralized identifier of the first user to the first application program associated with the first user; and storing the first proof of identity authentication in the first record in the first decentralized identifier blockchain.

In some embodiments, the method further includes: prior to receiving the first request, receiving a second request for obtaining the first business decentralized identifier, wherein the second request is sent from a node of the first consortium blockchain network; generating the first business decentralized identifier; and providing the first business decentralized identifier to the node of the first consortium blockchain network.

In some embodiments, the data that are associated with the first user and stored in the first consortium blockchain includes at least one of warehouse receipt records, merchandise order processing records, medical health records, shopping transaction records, housing rental transaction records, vehicle rental transaction records, transportation transaction records, warehouse transaction records, financial transaction records, or marathon records.

In some embodiments, the method further includes: receiving a second request for a second digital activity decentralized identifier, wherein the second request is sent from a second application program associated with a second user, the second request includes information about a second decentralized identifier of the second user and the first business decentralized identifier associated with the first consortium blockchain; generating the second digital activity decentralized identifier; providing the second digital activity decentralized identifier to the second application program; storing information about the second decentralized identifier of the second user and the second digital activity decentralized identifier in a second record in the first decentralized identifier blockchain; and controlling authorization of records that are associated with the second user and stored in the first consortium blockchain at least in part based on information in the second record in the first decentralized identifier blockchain.

In some embodiments, the method further includes: receiving a plurality of requests for digital activity decentralized identifiers, wherein each of the plurality of requests includes information about a particular decentralized identifier of one of a plurality of users and the first business decentralized identifier associated with the first consortium blockchain network; generating the plurality of digital activity decentralized identifiers, each of the digital activity decentralized identifiers corresponding to one of the plurality of users; storing information about each of the digital activity decentralized identifiers to a corresponding record associated with a corresponding user; and controlling authorization of records that are associated with the each of the users and stored in the first consortium blockchain at least in part based on the information in the records.

In some embodiments, controlling authorization of the records includes enabling the first user to authorize a second user to access one or more of the records that are associated with the first user and stored in the first consortium blockchain.

In another embodiment, a computer-implemented method for controlling authorization of access to data is provided. The method includes receiving a first request for a first digital activity decentralized identifier, wherein the first request includes information about a first user decentralized identifier associated with a first user and a first business decentralized identifier associated with a first blockchain network that maintains a first blockchain; generating the first digital activity decentralized identifier; storing information about the first digital activity decentralized identifier and the first user decentralized identifier in a first record in a first decentralized identifier blockchain; receiving a second request for a second digital activity decentralized identifier, wherein the second request includes information about the first user decentralized identifier and a second business decentralized identifier associated with a second blockchain network that maintains a second blockchain; generating the second digital activity decentralized identifier; storing information about the second digital activity decentralized identifier in the first record; receiving a third request for a third digital activity decentralized identifier, wherein the third request includes information about a second user decentralized identifier associated with a second user and the first business decentralized identifier associated with the first blockchain; generating the third digital activity decentralized identifier; storing information about the third digital activity decentralized identifier and the second user decentralized identifier in a second record in the first decentralized identifier blockchain; controlling authorization of records that are associated with the first user and stored in the first blockchain at least in part based on the information in the first record; controlling authorization of records that are associated with the first user and stored in the second blockchain at least in part based on the information in the first record; and controlling authorization of records that are associated with the second user and stored in the first blockchain at least in part based on information in the second record.

In some embodiments, these general and specific aspects may be implemented using a system, a method, or a computer program, or any combination of systems, methods, and computer programs. The foregoing and other described embodiments can each, optionally, include one or more of the following aspects:

In some embodiments, the first blockchain network includes a first consortium blockchain network, the first blockchain includes a first consortium blockchain, the second blockchain network includes a second consortium blockchain network, and the second blockchain includes a second consortium blockchain.

In some embodiments, the records that are associated with the first user and stored in the first consortium blockchain includes at least a first one of warehouse receipt records, merchandise order processing records, medical health records, shopping transaction records, housing rental transaction records, vehicle rental transaction records, transportation transaction records, warehouse transaction records, financial transaction records, or marathon records, and wherein the records that are associated with the first user and stored in the second consortium blockchain includes at least a second one of warehouse receipt records, merchandise order processing records, medical health records, shopping transaction records, housing rental transaction records, vehicle rental transaction records, transportation transaction records, warehouse transaction records, financial transaction records, or marathon records.

In another embodiment, a computer-implemented method for controlling authorization of access to data is provided. The method includes receiving multiple sets of one or more requests for digital activity decentralized identifiers (DIDs), wherein each digital activity decentralized identifier is associated with a decentralized identifier of a user and a business decentralized identifier associated with a consortium blockchain, each set of one or more requests includes information about a corresponding decentralized identifier of a user and one or more business decentralized identifiers associated with one or more consortium blockchains, and different sets of one or more requests include information about different decentralized identifiers of different users; generating the digital activity decentralized identifiers in response to the multiple sets of one or more requests for digital activity decentralized identifiers, wherein each digital activity decentralized identifier is associated with a particular decentralized identifier of a particular user and also associated with a particular business decentralized identifier, different digital activity decentralized identifiers associated with the same set of one or more requests are associated with a same decentralized identifier of a user and associated with different business decentralized identifiers, and different digital activity decentralized identifiers associated with different sets of one or more requests are associated with different decentralized identifiers of different users; storing data about the digital activity decentralized identifiers and the decentralized identifiers of the users in multiple records in a first decentralized identifier blockchain, wherein each record stores data associated with one of the users; and controlling authorization of access to data that are associated with the users and stored in the consortium blockchains at least in part based on the records stored in the first decentralized identifier blockchain.

In some embodiments, these general and specific aspects may be implemented using a system, a method, or a computer program, or any combination of systems, methods, and computer programs. The foregoing and other described embodiments can each, optionally, include one or more of the following aspects:

In some embodiments, the data that are associated with the users and stored in the consortium blockchains includes at least one of warehouse receipt records, merchandise order processing records, medical health records, shopping transaction records, housing rental transaction records, vehicle rental transaction records, transportation transaction records, warehouse transaction records, financial transaction records, or marathon records.

In another embodiment, a computer-implemented method for controlling authorization of access to data is provided. The method includes sending a first request for a first digital activity decentralized identifier to a decentralized identifier blockchain node that is associated with a decentralized identifier blockchain configured to store records associated with a plurality of decentralized identifiers (DID) of a plurality of users, wherein the first request includes a first decentralized identifier associated with a first user, and the first request also includes a first business decentralized identifier associated with a first blockchain network that maintains a first blockchain; receiving the first digital activity decentralized identifier from the decentralized identifier blockchain node; and controlling authorization of access to data that are associated with the first user and stored in the first blockchain using the first digital activity decentralized identifier.

In some embodiments, these general and specific aspects may be implemented using a system, a method, or a computer program, or any combination of systems, methods, and computer programs. The foregoing and other described embodiments can each, optionally, include one or more of the following aspects:

In some embodiments, the first blockchain network includes a first consortium blockchain network, and the first blockchain includes a first consortium blockchain.

In some embodiments, the method further includes: sending a second request for a second digital activity decentralized identifier to a decentralized identifier blockchain node, wherein the second request includes the first decentralized identifier associated with the first user, and the second request also includes a second business decentralized identifier associated with a second consortium blockchain network that maintains a second consortium blockchain; receiving the second digital activity decentralized identifier from the decentralized identifier blockchain node; and controlling authorization of access to data that are associated with the first user and stored in the second consortium blockchain using the second digital activity decentralized identifier.

In another embodiment, a computer-implemented method for controlling authorization of access to data is provided. The method includes receiving a first request that includes a first digital activity decentralized identifier (DID) and a first hash value of first digital activity data, wherein the first digital activity decentralized identifier is associated with a first decentralized identifier of a first user and a first business decentralized identifier associated with a first consortium blockchain; storing the first digital activity decentralized identifier and the first hash value in a first record in a decentralized identifier blockchain that is configured to store records associated with a plurality of decentralized identifiers of a plurality of users; and controlling authorization of access to the first digital activity data stored in the first consortium blockchain using information stored in the first record in the decentralized identifier blockchain, including determining whether to authorize another user access to the first digital activity data based on the information stored in the first record in the decentralized identifier blockchain.

In some embodiments, these general and specific aspects may be implemented using a system, a method, or a computer program, or any combination of systems, methods, and computer programs. The foregoing and other described embodiments can each, optionally, include one or more of the following aspects:

In some embodiments, the first request is sent from a first consortium blockchain node associated with the first consortium blockchain.

In some embodiments, the method further includes sending a first message to a first application program associated with the first user, wherein the first message includes the first hash value of the first digital activity data; receiving a second message from the first application program indicating whether the first hash value is correct; storing the first hash value in the first record if the second message indicates that the first hash value is correct; and not storing the first hash value in the first record if the second message indicates that the first hash value is not correct.

In some embodiments, the first application program includes a digital wallet decentralized application program.

In some embodiments, the method further includes determining whether the first digital activity decentralized identifier is valid by comparing the first digital activity decentralized identifier with pre-stored digital activity decentralized identifiers that are stored in the decentralized identifier blockchain.

In some embodiments, the method further includes receiving a second request that includes the first digital activity decentralized identifier and a second hash value of second digital activity data; storing the second hash value in the first record in the decentralized identifier blockchain; and controlling authorization of access to the second digital activity data stored in the first consortium blockchain using information stored in the first record in the decentralized identifier blockchain, including determining whether to authorize another user access to the second digital activity data based on the information stored in the first record in the decentralized identifier blockchain.

In some embodiments, the second request is sent from the first consortium blockchain.

In some embodiments, the method further includes receiving a second request that includes a second digital activity decentralized identifier and a second hash value of second digital activity data from a second consortium blockchain network that maintains a second consortium blockchain, wherein the second digital activity decentralized identifier is associated with the first decentralized identifier of the first user and a second business decentralized identifier associated with the second consortium blockchain; storing the second digital activity decentralized identifier and the second hash value in the first record in the decentralized identifier blockchain; and controlling authorization of access to the second digital activity data stored in the second consortium blockchain using information stored in the first record in the decentralized identifier blockchain, including determining whether to authorize another user access to the second digital activity data based on the information stored in the first record in the decentralized identifier blockchain.

In some embodiments, the method further includes receiving a second request that includes a second digital activity decentralized identifier and a second hash value of second digital activity data from the first consortium blockchain, wherein the second digital activity decentralized identifier is associated with a second decentralized identifier of a second user and the first business decentralized identifier associated with the first consortium blockchain; storing the second digital activity decentralized identifier and the second hash value in a second record in the decentralized identifier blockchain; and controlling authorization of access to the second digital activity data stored in the first consortium blockchain using information stored in the second record in the decentralized identifier blockchain, including determining whether to authorize another user access to the second digital activity data based on the information stored in the second record in the decentralized identifier blockchain.

In another embodiment, a computer-implemented method for controlling authorization of access to data is provided. The method includes receiving a first hash value of first digital activity data from a decentralized identifier (DID) blockchain at an application program associated with a first user, wherein the first digital activity data is stored in a first consortium blockchain; obtaining the first digital activity data from the first consortium blockchain; generating a second hash value of the first digital activity data obtained from the first consortium blockchain; comparing the first hash value with the second hash value; and upon determining that the first hash value matches the second hash value, sending a message to the decentralized identifier blockchain node associated with the decentralized identifier blockchain indicating that the first hash value is accurate.

In some embodiments, these general and specific aspects may be implemented using a system, a method, or a computer program, or any combination of systems, methods, and computer programs. The foregoing and other described embodiments can each, optionally, include one or more of the following aspects:

In some embodiments, the method further includes providing a user interface that shows the first digital activity data obtained from the first consortium blockchain to the first user; receiving an indication from the first user indicating whether the first digital activity data are correct; and sending the indication from the first user indicating whether the first digital activity data are correct to the decentralized identifier blockchain.

In some embodiments, the application program includes a digital wallet decentralized application program.

In another embodiment, a computer-implemented method for controlling authorization of access to data is provided. The method includes receiving a first request to allow a second user to access first digital activity data of a first user, wherein the first request includes a first hash value of the first digital activity data, a first digital activity decentralized identifier associated with a first decentralized identifier of the second user and a first business decentralized identifier associated with a first consortium blockchain, the first request is sent from the first consortium blockchain and received at a decentralized identifier (DID) blockchain that is configured to store records associated with a plurality of decentralized identifiers (DID) of a plurality of users, and the first digital activity data are stored at the first consortium blockchain; determining whether the first digital activity decentralized identifier, the first hash value, and the first business decentralized identifier are valid; and controlling authorization of access to the first digital activity data stored in the first consortium blockchain by the second user using the determination regarding whether the first digital activity decentralized identifier, the first hash value, and the first business decentralized identifier are valid.

In some embodiments, these general and specific aspects may be implemented using a system, a method, or a computer program, or any combination of systems, methods, and computer programs. The foregoing and other described embodiments can each, optionally, include one or more of the following aspects:

In some embodiments, the method further includes prior to receiving the first request, storing a second hash value of the first digital activity data provided by the first consortium blockchain, wherein determining whether the first hash value is valid includes comparing the first hash value with a stored second hash value, and determining that the first hash value is valid if the first hash value is the same as the stored second hash value.

In some embodiments, the method further includes sending a first message to an application program associated with the first user to inform the first user about the first request to allow the second user to access the first digital activity data.

In some embodiments, the application program associated with the first user includes a digital wallet decentralized application program.

In some embodiments, the method further includes receiving a second message from the application program indicating whether the first user authorizes the second user to access the first digital activity data, and wherein the controlling of the authorization of access to the first digital activity data is based at least in part on whether the second message indicates that the first user authorizes the second user to access the first digital activity data.

In some embodiments, the method further includes upon determining that the first digital activity decentralized identifier, the first hash value, and the first business decentralized identifier are valid, and receiving the second message indicating that the first user authorizes the second user to access the first digital activity data, sending a third message to the first consortium blockchain to indicate that the first user has authorized the second user to access the first digital activity data.

In some embodiments, the second message includes a condition on the access of the first digital activity data by the second user.

In some embodiments, the condition includes a time limit condition specifying that the second user can only access the first digital activity data within a specified time limit.

In another embodiment, a computer-implemented method for controlling authorization of access to data is provided. The method includes receiving a first request to allow a second user to access first digital activity data of a first user, wherein the first digital activity data are stored in the first consortium blockchain, the first request is sent from a decentralized identifier (DID) blockchain node associated with a first decentralized identifier blockchain that is configured to store records associated with a plurality of decentralized identifiers of a plurality of users, and the first request is received at an application program associated with the first user; providing a user interface to show the first request to the first user; receiving an instruction from the first user regarding whether to authorize the second user to access the first digital activity data stored in the first consortium blockchain; and sending a first message to the decentralized identifier blockchain node indicating whether the first user authorizes the second user to access the first digital activity data.

In some embodiments, these general and specific aspects may be implemented using a system, a method, or a computer program, or any combination of systems, methods, and computer programs. The foregoing and other described embodiments can each, optionally, include one or more of the following aspects:

In some embodiments, the first message includes a condition on the access of the first digital activity data by the second user.

In some embodiments, the condition include a time limit condition specifying that the second user can only access the first digital activity data within a specified time limit.

It is appreciated that methods in accordance with this specification may include any combination of the aspects and features described herein. That is, methods in accordance with this specification are not limited to the combinations of aspects and features specifically described herein, but also include any combination of the aspects and features provided.

The details of one or more embodiments of this specification are set forth in the accompanying drawings and the description below. Other features and advantages of this specification will be apparent from the description and drawings, and from the claims.

BRIEF DESCRIPTION OF THE DRAWINGS

FIGS. 12 to 15 depict examples of processes for managing authorization of access to data that can be executed in accordance with embodiments of this specification.

Like reference numbers and designations in the various drawings indicate like elements.

DETAILED DESCRIPTION

Figure 1:
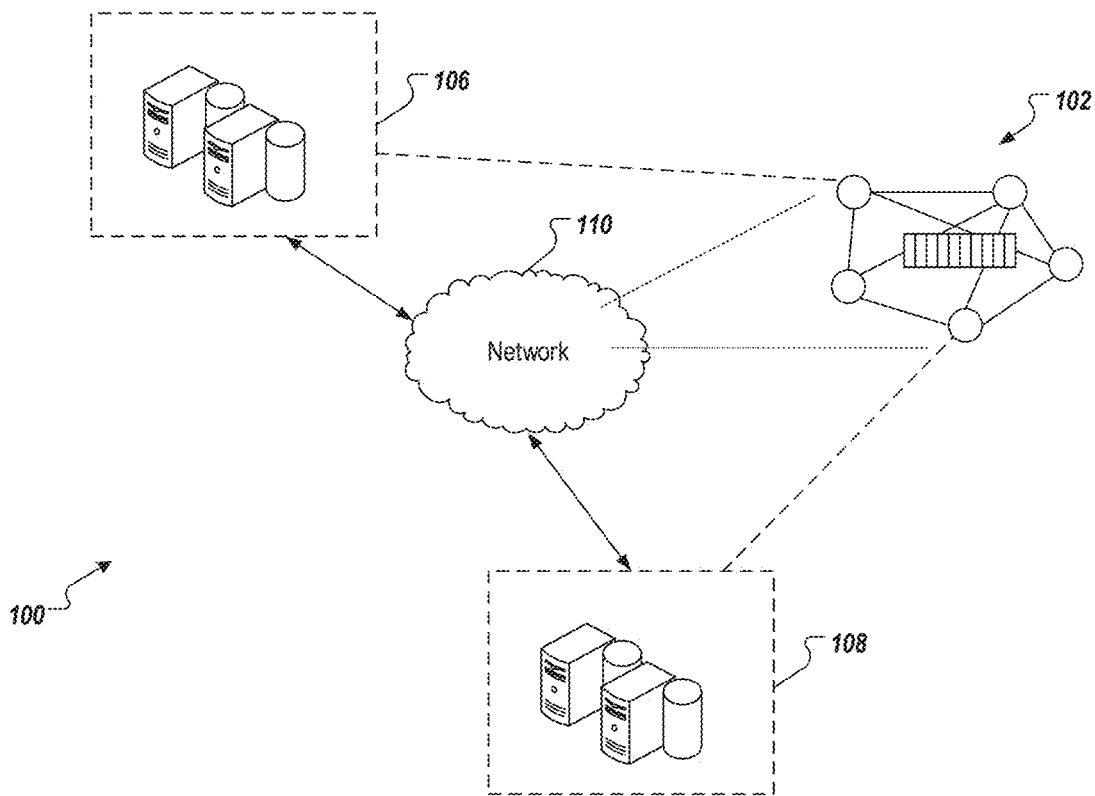
FIG. 1 is a diagram illustrating an example of an environment that can be used to execute embodiments of this specification.

This specification describes technologies for allowing users to manage access to data by use of decentralized identities associated with the users, in which the data are generated by blockchain-based applications. These technologies generally involve using a data decentralized identifier (DID) blockchain to store records that include data associated with the users, in which the records also include decentralized identifiers of the users and the decentralized identifiers of the consortium blockchains associated with the digital data. For example, the records can store data related to services provided by service providers to the users, in which the service providers store the data in the consortium blockchains. The data decentralized identifier blockchain includes smart contracts for verifying that the consortium blockchains are authorized by the users to share the records that include the data associated with the users. The technologies enable compliance with relevant data privacy laws, such as the General Data Protection Regulation (GDPR) in Europe. For example, for healthcare related data, the technologies can enable compliance with Health Insurance Portability and Accountability Act (HIPAA) rules.

For example, a first user may be an importer and exporter of goods who store the goods at a warehouse, and records of warehouse receipts are stored in a warehouse consortium blockchain. The first user interacts with the warehouse through a business system (e.g., user portal) provided by the warehouse, but the first user does not have direct access to the warehouse consortium blockchain, and may not even be aware of the warehouse consortium blockchain. The system described in this specification can allow the first user to manage authorization of access to the records stored in the warehouse consortium blockchain by other users. For example, the first user may wish to obtain a loan from a bank and use a particular shipment of goods as collateral. The first user can use the system described in this specification to authorize the bank to, subject to certain conditions imposed by the first user, review the record that includes the warehouse receipt associated with the particular shipment of goods.

For example, a first user may be a patient of a first hospital, and medical records that include healthcare data associated with the first user are stored in a hospital consortium blockchain. The first user interacts with the first hospital through a business system (e.g., user portal) provided by the first hospital, but the first user does not have direct access to the hospital consortium blockchain, and may not even be aware of the hospital consortium blockchain. The system described in this specification can allow the first user to manage authorization of access to the medical records stored in the hospital consortium blockchain by other users. For example, the first user may wish to participate in a medical research conducted by a university professor. The first user can use the system described in this specification to authorize the university professor to, subject to certain conditions imposed by the first user, review certain medical records that the first user wishes to share with the university professor.

For example, a first user may have saving and checking accounts with a bank, and records that include financial data associated with the first user are stored in a bank consortium blockchain. The first user interacts with the bank through a business system (e.g., user portal) provided by the bank, but the first user does not have direct access to the bank consortium blockchain, and may not even be aware of the bank consortium blockchain. The system described in this specification can allow the first user to manage authorization of access to the records stored in the bank consortium blockchain by other users. For example, the first user may wish to rent an apartment from a landlord. The first user can use the system described in this specification to authorize the landlord to, subject to certain conditions imposed by the first user, review certain financial records that the first user wishes to share with the landlord.

For example, the system can allow users located in different jurisdictions (e.g., a first user in China, a second user in the U.S., and a third user in Europe) to share data stored in blockchain networks in a secure manner, in which each user can control what data is being shared even when the user does not have direct access to the blockchain networks. The system can process the access to user data in a way that complies with local data protection laws.

The techniques described in this specification produce several technical effects. A system having enhanced security features is provided to enable a first user to securely share data with a second user, in which the data is stored in a consortium blockchain controlled by a business entity. Enhanced security of user data is achieved by multiple layers of verification, including verifying that the entity who purports to have authority to authorize sharing of data is the correct entity, verifying that the entity who seeks to gain access to the data is the correct entity, and verifying that the data to be shared with the second user are the correct data. The system assigns unique decentralized identifiers that are associated with the data that belong to a particular user and stored in a particular consortium blockchain. The techniques combine the security features associated with decentralized identifiers with the reliability of blockchain technology to enhance the security of sharing data among multiple users.

In some examples, user data are stored in consortium blockchains that are controlled by service providers and may not be accessible to end users. In order to enable a first user to verify the correctness of the data record the first user intends to share with other users, each data record that the first user intends to share is registered by storing a hash value of the data record in a separate blockchain (decentralized identifier blockchain) accessible to the first user. By storing only a hash value (and not the entire data record) in the separate blockchain, the amount of data that needs to be stored in the separate blockchain is small, and can still be used to verify the correctness of the actual data. At a later time, when the first user wishes to authorize other users to access the data record, the actual data record is retrieved from the consortium blockchain controlled by the service provider, and a hash value of the retrieved data record is compared with the stored hash value to verify that the retrieved data record is correct. The first user may access the services of many service providers, and the data records of the first user may be stored in many consortium blockchains controlled by many different service providers. In some examples, all the data records associated with the first user are registered in a single blockchain (i.e., the hash values of all the data records that the first user intends to share with others are stored in the single blockchain), making it easier for the first user to keep track of what data records are available for sharing, and to manage the authorization of the access of the data records by other users. If desired, the hash values can also be registered in two or more blockchains that are accessible to the first user.

A unique digital activity decentralized identifier is associated with data records of a particular user that are stored in a particular consortium blockchain. The unique digital activity decentralized identifier is associated with, or a function of, a unique decentralized identifier of the particular user and a unique business decentralized identifier associated with the particular consortium blockchain. When the particular consortium blockchain sends a request to register a data record stored in the particular consortium blockchain so that a hash value of the data record can be stored in the decentralized identifier blockchain, the request includes the unique digital activity decentralized identifier and the hash value of the data record. The system verifies the validity of the digital activity decentralized identifier, the validity of the decentralized identifier of the particular user, and the validity of the decentralized identifier associated with the particular consortium blockchain. Each decentralized identifier can be verified using protocols specified by the World Wide Web Consortium (W3C). For example, each decentralized identifier has an associated decentralized identifier document that can include (i) a set of cryptographic material, such as public keys, that can be used for authentication or interaction with the decentralized identifier subject, (ii) a set of cryptographic protocols for interacting with the decentralized identifier subject, such as authentication and capability delegation, (iii) an optional JSON-LD signature to verify the integrity of the decentralized identifier document. Furthermore, verifiable claims may allow for authorizations, endorsements, and acknowledgements among different entities. Verifying the decentralized identifiers using the corresponding cryptographic material, cryptographic protocols, and JSON-LD signature enhances the security of the overall system, ensuring that the hash value being registered in the decentralized identifier blockchain corresponds to a data record that indeed belongs to the correct user and stored in the correct consortium blockchain.

When the particular consortium blockchain sends a request to authorize a second user to access a data record that belongs to a first user and stored in the particular consortium blockchain, the request includes the decentralized identifier of the second user, the hash value of the data record, and the unique digital activity decentralized identifier associated with the data record (which is associated with the decentralized identifier of the first user and the decentralized identifier of the particular consortium blockchain.). The system verifies the validity of the decentralized identifier of the second user, the validity of the digital activity decentralized identifier, the validity of the decentralized identifier of the first user, the validity of the decentralized identifier of the particular consortium blockchain, and the correctness of the hash value of the data record. This ensures that the data record being shared indeed belongs to the correct user (i.e., the first user), is shared with the correct entity (i.e., the second user), is retrieved from the correct consortium blockchain, and the content of data record is correct.

To provide further context for embodiments of this specification, and as introduced above, distributed ledger systems (DLSs), which can also be referred to as consensus networks (e.g., made up of peer-to-peer nodes), and blockchain networks, enable participating entities to securely, and immutably conduct transactions, and store data. Although the term blockchain is generally associated with particular networks, and/or use cases, blockchain is used herein to generally refer to a DLS without reference to any particular use case.

A blockchain is a data structure that stores transactions in a way that the transactions are immutable. Thus, transactions recorded on a blockchain are reliable and trustworthy. A blockchain includes one or more blocks. Each block in the chain is linked to a previous block immediately before it in the chain by including a cryptographic hash of the previous block. Each block also includes a timestamp, its own cryptographic hash, and one or more transactions. The transactions, which have already been verified by the nodes of the blockchain network, are hashed and encoded into a Merkle tree. A Merkle tree is a data structure in which data at the leaf nodes of the tree is hashed, and all hashes in each branch of the tree are concatenated at the root of the branch. This process continues up the tree to the root of the entire tree, which stores a hash that is representative of all data in the tree. A hash purporting to be of a transaction stored in the tree can be quickly verified by determining whether it is consistent with the structure of the tree.

Whereas a blockchain is a decentralized or at least partially decentralized data structure for storing transactions, a blockchain network is a network of computing nodes that manage, update, and maintain one or more blockchains by broadcasting, verifying and validating transactions, etc. As introduced above, a blockchain network can be provided as a public blockchain network, a private blockchain network, or a consortium blockchain network. Embodiments of this specification are described in further detail herein with reference to a consortium blockchain network. It is contemplated, however, that embodiments of this specification can be realized in any appropriate type of blockchain network.

In general, a consortium blockchain network is private among the participating entities. In a consortium blockchain network, the consensus process is controlled by an authorized set of nodes, which can be referred to as consensus nodes, one or more consensus nodes being operated by a respective entity (e.g., a financial institution, insurance company). For example, a consortium of ten (10) entities (e.g., financial institutions, insurance companies) can operate a consortium blockchain network, each of which operates at least one node in the consortium blockchain network.

In some examples, within a consortium blockchain network, a global blockchain is provided as a blockchain that is replicated across all nodes. That is, all consensus nodes are in perfect state consensus with respect to the global blockchain. To achieve consensus (e.g., agreement to the addition of a block to a blockchain), a consensus protocol is implemented within the consortium blockchain network. For example, the consortium blockchain network can implement a practical Byzantine fault tolerance (PBFT) consensus, described in further detail below.

FIG. 1 is a diagram illustrating an example of an environment 100 that can be used to execute embodiments of this specification. In some examples, the environment 100 enables entities to participate in a consortium blockchain network 102. The environment 100 includes computing systems 106, 108, and a network 110. In some examples, the network 110 includes a local area network (LAN), wide area network (WAN), the Internet, or a combination thereof, and connects web sites, user devices (e.g., computing devices), and back-end systems. In some examples, the network 110 can be accessed over a wired and/or a wireless communications link. In some examples, the network 110 enables communication with, and within the consortium blockchain network 102. In general the network 110 represents one or more communication networks. In some cases, the computing systems 106, 108 can be nodes of a cloud computing system (not shown), or each of the computing systems 106, 108 can be a separate cloud computing system including a number of computers interconnected by a network and functioning as a distributed processing system.

In the depicted example, the computing systems 106, 108 can each include any appropriate computing device that enables participation as a node in the consortium blockchain network 102. Examples of computing devices include, without limitation, a server, a desktop computer, a laptop computer, a tablet computing device, and a smartphone. In some examples, the computing systems 106, 108 host one or more computer-implemented services for interacting with the consortium blockchain network 102. For example, the computing system 106 can host computer-implemented services of a first entity (e.g., user A), such as a transaction management system that the first entity uses to manage its transactions with one or more other entities (e.g., other users). The computing system 108 can host computer-implemented services of a second entity (e.g., user B), such as a transaction management system that the second entity uses to manage its transactions with one or more other entities (e.g., other users). In the example of FIG. 1, the consortium blockchain network 102 is represented as a peer-to-peer network of nodes, and the computing systems 106, 108 provide nodes of the first entity, and second entity respectively, which participate in the consortium blockchain network 102.

Figure 2:
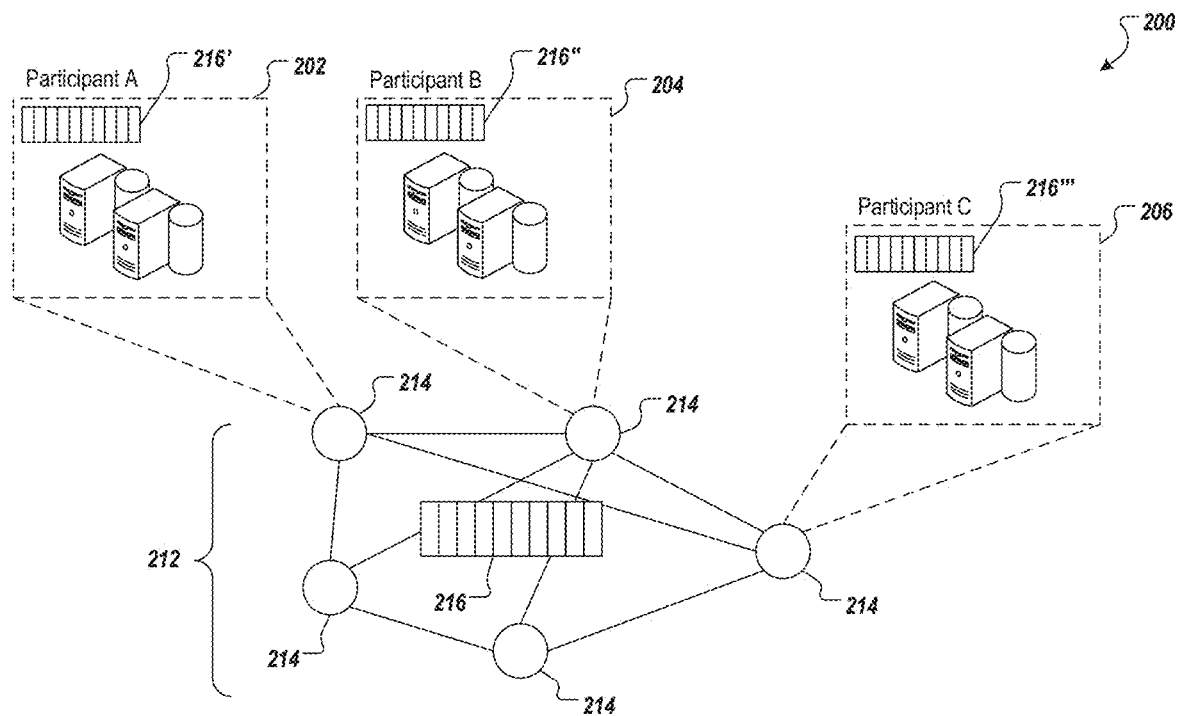
FIG. 2 is a diagram illustrating an example of an architecture in accordance with embodiments of this specification.

FIG. 2 depicts an example of an architecture 200 in accordance with embodiments of this specification. The example conceptual architecture 200 includes participant systems 202, 204, 206 that correspond to Participant A, Participant B, and Participant C, respectively. Each participant (e.g., user, enterprise) participates in a blockchain network 212 provided as a peer-to-peer network including a plurality of nodes 214, at least some of which immutably record information in a blockchain 216. Although a single blockchain 216 is schematically depicted within the blockchain network 212, multiple copies of the blockchain 216 are provided, and are maintained across the blockchain network 212, as described in further detail herein.

In the depicted example, each participant system 202, 204, 206 is provided by, or on behalf of Participant A, Participant B, and Participant C, respectively, and functions as a respective node 214 within the blockchain network. As used herein, a node generally refers to an individual system (e.g., computer, server) that is connected to the blockchain network 212, and enables a respective participant to participate in the blockchain network. In the example of FIG. 2, a participant corresponds to each node 214. It is contemplated, however, that a participant can operate multiple nodes 214 within the blockchain network 212, and/or multiple participants can share a node 214. In some examples, the participant systems 202, 204, 206 communicate with, or through the blockchain network 212 using a protocol (e.g., hypertext transfer protocol secure (HTTPS)), and/or using remote procedure calls (RPCs).

Nodes 214 can have varying degrees of participation within the blockchain network 212. For example, some nodes 214 can participate in the consensus process (e.g., as miner nodes that add blocks to the blockchain 216), while other nodes 214 do not participate in the consensus process. As another example, some nodes 214 store a complete copy of the blockchain 216, while other nodes 214 only store copies of portions of the blockchain 216. For example, data access privileges can limit the blockchain data that a respective participant stores within its respective system. In the example of FIG. 2, the participant systems 202, 204, and 206 store respective, complete copies 216', 216", and 216'" of the blockchain 216.

A blockchain (e.g., the blockchain 216 of FIG. 2) is made up of a chain of blocks, each block storing data. Examples of data include transaction data representative of a transaction between two or more participants. While transactions are used herein by way of non-limiting example, it is contemplated that any appropriate data can be stored in a blockchain (e.g., documents, images, videos, audio). Examples of a transaction can include, without limitation, exchanges of something of value (e.g., assets, products, services, currency). The transaction data is immutably stored within the blockchain. That is, the transaction data cannot be changed.

Before storing in a block, the transaction data is hashed. Hashing is a process of transforming the transaction data (provided as string data) into a fixed-length hash value (also provided as string data). It is not possible to un-hash the hash value to obtain the transaction data. Hashing ensures that even a slight change in the transaction data results in a completely different hash value. Further, and as noted above, the hash value is of fixed length. That is, no matter the size of the transaction data the length of the hash value is fixed. Hashing includes processing the transaction data through a hash function to generate the hash value. An example of a hash function includes, without limitation, the secure hash algorithm (SHA)-256, which outputs 256-bit hash values.

Transaction data of multiple transactions are hashed and stored in a block. For example, hash values of two transactions are provided, and are themselves hashed to provide another hash. This process is repeated until, for all transactions to be stored in a block, a single hash value is provided. This hash value is referred to as a Merkle root hash, and is stored in a header of the block. A change in any of the transactions will result in change in its hash value, and ultimately, a change in the Merkle root hash.

Blocks are added to the blockchain through a consensus protocol. Multiple nodes within the blockchain network participate in the consensus protocol, and perform work to have a block added to the blockchain. Such nodes are referred to as consensus nodes. PBFT, introduced above, is used as a non-limiting example of a consensus protocol. The consensus nodes execute the consensus protocol to add transactions to the blockchain, and update the overall state of the blockchain network.

In further detail, the consensus node generates a block header, hashes all of the transactions in the block, and combines the hash value in pairs to generate further hash values until a single hash value is provided for all transactions in the block (the Merkle root hash). This hash is added to the block header. The consensus node also determines the hash value of the most recent block in the blockchain (i.e., the last block added to the blockchain). The consensus node also adds a nonce value, and a timestamp to the block header.

In general, PBFT provides a practical Byzantine state machine replication that tolerates Byzantine faults (e.g., malfunctioning nodes, malicious nodes). This is achieved in PBFT by assuming that faults will occur (e.g., assuming the existence of independent node failures, and/or manipulated messages sent by consensus nodes). In PBFT, the consensus nodes are provided in a sequence that includes a primary consensus node, and backup consensus nodes. The primary consensus node is periodically changed. Transactions are added to the blockchain by all consensus nodes within the blockchain network reaching an agreement as to the world state of the blockchain network. In this process, messages are transmitted between consensus nodes, and each consensus nodes proves that a message is received from a specified peer node, and verifies that the message was not modified during transmission.

In PBFT, the consensus protocol is provided in multiple phases with all consensus nodes beginning in the same state. To begin, a client sends a request to the primary consensus node to invoke a service operation (e.g., execute a transaction within the blockchain network). In response to receiving the request, the primary consensus node multicasts the request to the backup consensus nodes. The backup consensus nodes execute the request, and each sends a reply to the client. The client waits until a threshold number of replies are received. In some examples, the client waits for f+1 replies to be received, where f is the maximum number of faulty consensus nodes that can be tolerated within the blockchain network. The final result is that a sufficient number of consensus nodes come to an agreement on the order of the record that is to be added to the blockchain, and the record is either accepted, or rejected.

In some blockchain networks, cryptography is implemented to maintain privacy of transactions. For example, if two nodes want to keep a transaction private, such that other nodes in the blockchain network cannot discern details of the transaction, the nodes can encrypt the transaction data. An example of cryptography includes, without limitation, symmetric encryption, and asymmetric encryption. Symmetric encryption refers to an encryption process that uses a single key for both encryption (generating ciphertext from plaintext), and decryption (generating plaintext from ciphertext). In symmetric encryption, the same key is available to multiple nodes, so each node can en-/de-crypt transaction data.

Asymmetric encryption uses keys pairs that each include a private key, and a public key, the private key being known only to a respective node, and the public key being known to any or all other nodes in the blockchain network. A node can use the public key of another node to encrypt data, and the encrypted data can be decrypted using other node's private key. For example, and referring again to FIG. 2, Participant A can use Participant B's public key to encrypt data, and send the encrypted data to Participant B. Participant B can use its private key to decrypt the encrypted data (ciphertext) and extract the original data (plaintext). Messages encrypted with a node's public key can only be decrypted using the node's private key.

Asymmetric encryption is used to provide digital signatures, which enables participants in a transaction to confirm other participants in the transaction, as well as the validity of the transaction. For example, anode can digitally sign a message, and another node can confirm that the message was sent by the node based on the digital signature of Participant A. Digital signatures can also be used to ensure that messages are not tampered with in transit. For example, and again referencing FIG. 2, Participant A is to send a message to Participant B. Participant A generates a hash of the message, and then, using its private key, encrypts the hash to provide a digital signature as the encrypted hash. Participant A appends the digital signature to the message, and sends the message with digital signature to Participant B. Participant B decrypts the digital signature using the public key of Participant A, and extracts the hash. Participant B hashes the message and compares the hashes. If the hashes are same, Participant B can confirm that the message was indeed from Participant A, and was not tampered with.

Some blockchains systems enable blockchain contracts (also referred to as smart contracts) to be executed through blockchain transactions. Blockchain transactions can be, e.g., signed messages that originate from blockchain accounts, transmitted by the blockchain network, and recorded in the blockchain. The blockchain contracts can be written to achieve various functions, such as adding data to blockchain accounts, and/or changing data in the blockchain. A smart contract is not necessarily related to the classical concept of a contract, but can be any kind of computer program. The blockchain can be maintained and updated by executing various blockchain transactions. In some implementations, when a blockchain transaction involves a blockchain contract, the blockchain nodes can execute the blockchain contract locally in respective virtual machines (VMs). To handle the blockchain contracts, each blockchain node of the blockchain network can execute a corresponding virtual machine and execute the same instructions in the blockchain contract. A virtual machine is a software emulation of a computer system based on computer architectures and provide functionality of a physical computer. Virtual machines in the blockchain context can be understood as a system designed to operate as a runtime environment for blockchain contracts.

A certain blockchain node that successfully mines a proposed new block of blockchain transactions in accordance with consensus rules can pack the new block into its local copy of the blockchain and multicast the results to other blockchain nodes. The certain blockchain node can be a blockchain node that has first successfully completed the verification, obtained a verification privilege, or been chosen based on another consensus rule. The other blockchain nodes can follow the same order of execution performed by the certain blockchain node to locally execute the blockchain transactions in the new block, verify the execution results with one another (e.g., by performing hash calculations), and synchronize their copies of the blockchain with that of the certain blockchain node. By updating their local copies of the blockchain, the other blockchain nodes can similarly write such information in the blockchain transaction into respective local memories. A blockchain contract can be deployed on the blockchain using the method described above.

The deployed blockchain contract can have an address, according to which the deployed contract can be accessed. A blockchain node can invoke the deployed blockchain contract by inputting certain parameters to the blockchain contract. In some embodiments, a user terminal can request to invoke the deployed blockchain contract to perform various operations. For example, data stored in the deployed blockchain contract can be retrieved, data can be added to the deployed blockchain contract, and/or a financial transaction specified in the deployed blockchain contract can be executed.

The invention described in this specification relates to the authorization of access to user data stored in blockchains maintained by business entities, in which the user data are associated with users that are identified by decentralized identifiers. In some conventional systems, it is difficult for a user to have precise control over the authorization of access to data that are associated with the user and managed by a business entity. The business entity can obtain and generate a considerable amount of data about the user, but it may be difficult for the user to know exactly what information the business entity has about the user. Furthermore, often the data associated with a first user and managed by the business entity are access through a business software interface or portal owned by the business entity, and the first user has no control over the business software interface or portal. The business entity may store dozens, hundreds, thousands, or millions of data entries or transaction records associated with the first user, and it is difficult for the first user to identify and specify the exact data entries or records that the first user wishes to give access to another user.

For example, the business entity can provide a portal (e.g., a web portal) to allow each user to access data associated with the user. A first user may wish to authorize a second user access to some of the data belonging to the first user. The first user may instruct the business entity to allow the second user to access certain information of the first user. However, because the first user does not have control over the portal, it is difficult to know whether the business entity granted the second user access to the exact information that the first user wishes to share, whether the business entity allowed the second user to access more (or less) information than the first user wishes to share, or whether the business entity gave incorrect information about the first user to the second user.

For example, a medical related foundation patient registry may collect information on the health status of people with certain illness and who agree to participate in the registry. Suppose a first user goes to a hospital to seek treatments for several illnesses over the course of a number of years, the hospital system can obtain and/or generate a considerable amount of data about the first user, including information voluntarily provided to the hospital by the user (e.g., information entered into patient intake forms by the user), diagnostic information entered into the patient record system by nurses and doctors, lab results from analyses of blood samples, other body fluid samples, and/or tissue samples, imaging results such as X-rays images, CT scan images, and/or MRI images. Many patients do not know exactly what information the hospital has about the patients. A patient after undergoing X-ray scans, CT scans, or MRI scans may receive a diagnosis from the doctor who examined the X-ray images, CT scan images, and/or MRI images, but the patient himself/herself may not have viewed the images. The hospital may provide a patient gateway or portal to allow each patient to view his/her medical records, but the portal may not show all of the data that the hospital has about the patient, and the portal may not have the function of allowing a first user to select specific data to share with a second user. If a patient wishes to participate in a medical related foundation patient registry that collects information on the health status of people with a particular illness, the patient may want to share only information related to that particular illness with the foundation, and not share information related to the other illnesses that the patient may have. The conventional hospital patient gateway software may not have the functionality of allowing the patient such precise control over the authorization of the patient data.

The following describes a technology that can provide a process to allow each user to more precisely control what information is being shared with other users in a secure manner. The technology involves two types of blockchains. A first type of blockchains are managed by business entities to store records that include data associated with users, in which the records are managed by business systems that provide services to the users. We will use a consortium blockchain as an example for the first type of blockchains. The records or data associated with the user will be referred to as "user record" or "user data." A second type of blockchains store records that include decentralized identifiers (DID) of the users and other data that are bound to, or associated with, the decentralized identifiers. The blockchain of the second type is referred to as a "data decentralized identifier blockchain." The data decentralized identifier blockchain stores information that can be used to manage authorization of the access to the user records or user data stored in the consortium blockchains. For example, the data decentralized identifier blockchain can be used to verify the identity of a second user who wishes to access data that belong to a first user, and to verify that the data for which the second user is to be given access have been previously authorized by the first user.

A decentralized identifier (DID) for an entity can allow the entity to obtain control over its identity and information associated with the identity. In a business setting, a service or product provider can use its customers' decentralized identifiers to identify the customers and to provide services or products to the customers. In some embodiments, a decentralized identifier can be a unique identifier indicating a mapping relationship between a real-world entity and an online identity. The decentralized identifier can include a universal resource locator (URL) scheme identifier, an identifier for a decentralized identifier method, and a decentralized identifier method-specific identifier. Each decentralized identifier can point to a corresponding decentralized identifier document, which can include descriptive text in a preset format (e.g., JSON-LD) about the decentralized identifier and the owner of the decentralized identifier. The decentralized identifier can serve as a uniform resource identifier (URI) for locating the decentralized identifier document. The decentralized identifier document can include various properties such as contexts, decentralized identifier subject, public keys, authentication, authorization and delegation, service endpoints, generation, updates, proof, and extensibility. The decentralized identifier document can define or point to resources defining a plurality of operations that can be performed with respect to the decentralized identifier. In the examples described in this specification, the decentralized identifiers comply with the standards specified by the World Wide Web Consortium (W3C). Information about example implementations of the decentralized identifiers can be found in the document "DECENTRALIZED IDENTIFIERS (DIDS) v1.0, Core Data Model and Syntaxes," W3C Working Draft, Dec. 9, 2019, available at the web address "https://www.w3.org/TR/did-core." However, other decentralized identifiers can also be used. Additional information regarding the decentralized identifiers is provided later in this specification.

Figure 3:
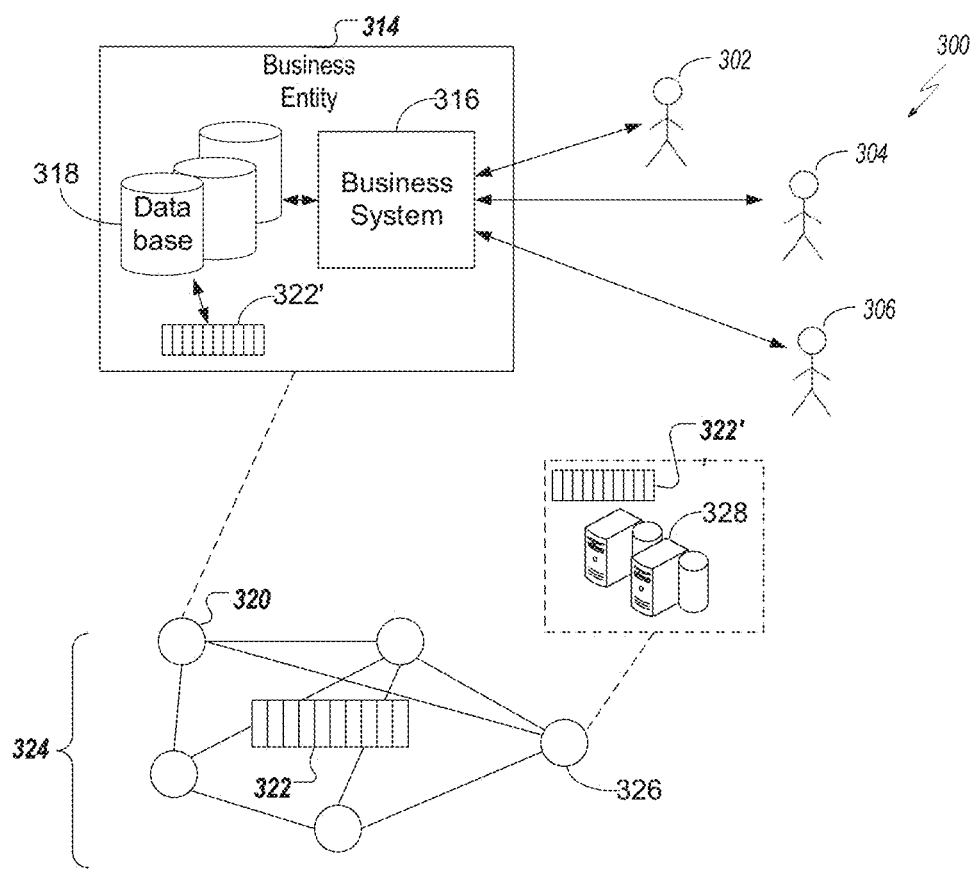
FIG. 3 is a diagram of an example of an environment in which users can access services provided by a business entity through a business system.

FIG. 3 shows an example of an environment 300 in which users (e.g., 302, 304, and 306) access services provided by a business entity (or service provider) 314 through a business system 316. The business system 316 can include any system of the business entity 314 that interacts with the users when the business entity 314 provides services to the users. The business system 316 can include hardware and/or software. A user can interact with the business system 316 directly or through an agent or representative of the business entity 314.

For example, a patient can interact with a hospital business system by entering information into the business system through a terminal device, either locally or remotely through a network. The patient can also interact with nurses and/or doctors, who then in turn enter information into the business system. The patient can interact with the business system through instruments that measure or analyze patient samples, e.g., blood samples, other body fluid samples, and/or tissue samples, instruments that capture images of the patient, such as X-ray machines, computer tomography scanners, and/or magnetic resonance imaging scanners. As the patient uses the services of the hospital, the hospital generates a large amount of data about the patient, and at least a portion of the data can be stored in a blockchain, such as a consortium blockchain.

In general, as each user (e.g., 302, 304, and 306) uses the services provided by the business entity 314, the business system 316 can generate data records that include information associated with the user or the activities of the user. The data records or some portions of the data records may be stored in a blockchain 322, such as a consortium blockchain 322. A first user may want to share certain records stored in the blockchain 322 with a second user.

In a conventional system, the first user interacts with the business system and does not interact with the blockchain. The first user does not know exactly what information is included in the records stored in the blockchain. The first user may send a message to the business entity and ask the business entity to authorize the second user to access certain information of the first user that is stored in the blockchain. However, it is difficult for the first user to verify whether the business entity correctly granted access to the second user. For example, the first user may intend the second user to be granted access to a first piece of information, but the business entity may grant the second user access to a second piece of information different from the first piece of information, or the business entity may grant the second user access to the first piece of information and additional information that the first user did not intend to disclose to the second user. If the business entity incorrectly authorized the second user access to information of the first user without approval from the first user, the business entity may breach a contract with the first user, and may also violate data protection laws, such as the GDPR in Europe.

In this specification, the term "business entity" is broadly used to refer to any organization, including e.g., a for-profit business, a non-profit organization, or a government entity. For example, the business entity 314 can be a warehouse, and the user records managed and/or generated by the business system 316 can include warehouse receipts, detailed information about the goods, commodity, or merchandise associated with the warehouse receipts. The business entity 314 can be a supplier of electronic devices and components, and the user records managed and/or generated by the business system 316 can include purchase orders and invoices, historical data on purchases and payments, and/or aggregate information about what products were purchased for what quantities and during what time periods, etc. The business entity 314 can be a hospital, and the user records can include patient healthcare information, such as patient medical history, biometrics data, pharmaceutical prescription information, X-ray scans, MRI scans, and/or doctors' recommendations for treatments, etc. The business entity 314 can be a bank, and the user records can include customer financial data, such as information about the checking and saving accounts, 401K accounts, mortgage loans, and/or investment portfolio, etc. The business entity 314 can be a utilities company, such as a company that provides electricity, gas, heating oil, and/or water to the users, and the user records can include history of usage of the electricity, gas, heating oil, and/or water. The business entity 314 can be a company that provides transportation services, such as ride hailing services, and the user records can include travel records of the users. The business entity 314 can be a company that provides microfinance services to users, and the user records can include user credit information, such as how many microloans were taken out by the user and whether the loans were fully paid on time. The business entity 314 can be a restaurant, and the user records can include what food items were ordered by the users at what time on what dates. For example, the business entity 314 can be a government tax collection agency that has tax records of residents. The business entity 314 can be a university that has educational records of students, including certificates and grades of the courses that have been completed by the students. The business entity 314 can be a marathon group that has contact information about its members, running schedules of the members, athletic gears used by the members, and information about sponsors of the members.

The inventive techniques described in this specification can be applied to the authorization of all types of data managed and/or generated by all types of organizations, and not limited to those specifically described in this specification.

In some embodiments, the business system 316 stores the data records in one or more databases 318, generates a hash value for each of the records, and adds a block that includes the records and the hash values to a blockchain 322'. The business entity 314 includes a computer server (which can be part of the business system 316 or interact with the business system 316) that can be associated with one of the nodes 320 of a blockchain network 324 in which a blockchain 322 is replicated across the blockchain network 324, and the blockchain 322' maintained by the business entity 314 is a copy of the blockchain 322. In one example, the first user 302 is a patient, and the business entity 314 is a first hospital that provided medical treatments for several illnesses to the first user 302. A node 326 in the blockchain network 324 can be associated with a computer server 328 of a patient record management service provider that maintains the software used by the hospital for managing patient records. The blockchain network 324 can be, e.g., a consortium blockchain network in which the computer server of the business entity 314, the computer server 328, and other approved computer servers (e.g., computer servers of medical clinics affiliated with the hospital) can control the consensus process.

For example, the first user 302 may decide to visit a second hospital to receive treatment for a particular illness. The second user 304 can be a doctor at the second hospital who will be treating the first user 302, and the doctor would like to see past medical treatment information related to the particular illness. The first user 302 may decide to allow the doctor (the second user 304) at the second hospital to see past treatment information related to the particular illness, but not see past treatment information related to other illnesses. The first user 302 may want to control what information is provided from the first hospital to the doctor (the second user 304) at the second hospital. The following describes a process that allows the first user 302 to determine which record or records are shared with the second user 304.

In the examples described below, the data of the first user 302 are stored in various consortium blockchains. The following describes processes for allowing the first user 302 to authorize access to records that include data that are associated with the first user 302 and also associated with a consortium blockchain managed by a business entity, in which the first user 302 interacts with the business entity through a business system. For example, the data can be stored in the consortium blockchain. The records can include any type of data, including plain text data, structured data that can be in the form of spreadsheets, image files, audio files, and/or video files.

In the example described below, the first user uses a digital wallet decentralized application (Dapp) program to request and obtain a digital identity decentralized identifier (DID). However, other types of application programs or apps can also be used. A consortium blockchain requests and obtains a business identifier. For example, the business identifier can be a decentralized identifier, referred to as a business decentralized identifier. In the examples below, the business identifiers are decentralized identifiers. The digital wallet Dapp requests and obtains a digital activity decentralized identifier for user data associated with the consortium blockchain. The term "digital activity decentralized identifier" refers to an identifier that identifies the digital activity data associated with a particular user and a particular consortium blockchain. The term "digital activity data" refers to data associated with the user, in which the data are stored in one or more of the consortium blockchains. In some examples, the digital activity data are generated or collected as a result of the user's digital activities, such as online activities. The digital activity data can include data associated with the user, in which the data are generated or collected as a result of the user using the services of the business entity. The digital activity data can include data associated with the user, in which the data are generated or collected by the business entity when the user did not use the services of the business entity. The digital activity data can also include data associated with the user, in which the data are generated or collected by the business entity on behalf of another entity that interacts with the user. A hash value of a record that includes data associated with the first user is registered with the data decentralized identifier blockchain based in part on the digital activity decentralized identifier. The first user can grant a second user access to the record based in part on the digital activity decentralized identifier, which includes information about both the digital identity decentralized identifier of the user and the business decentralized identifier of the consortium blockchain.

Figure 4:
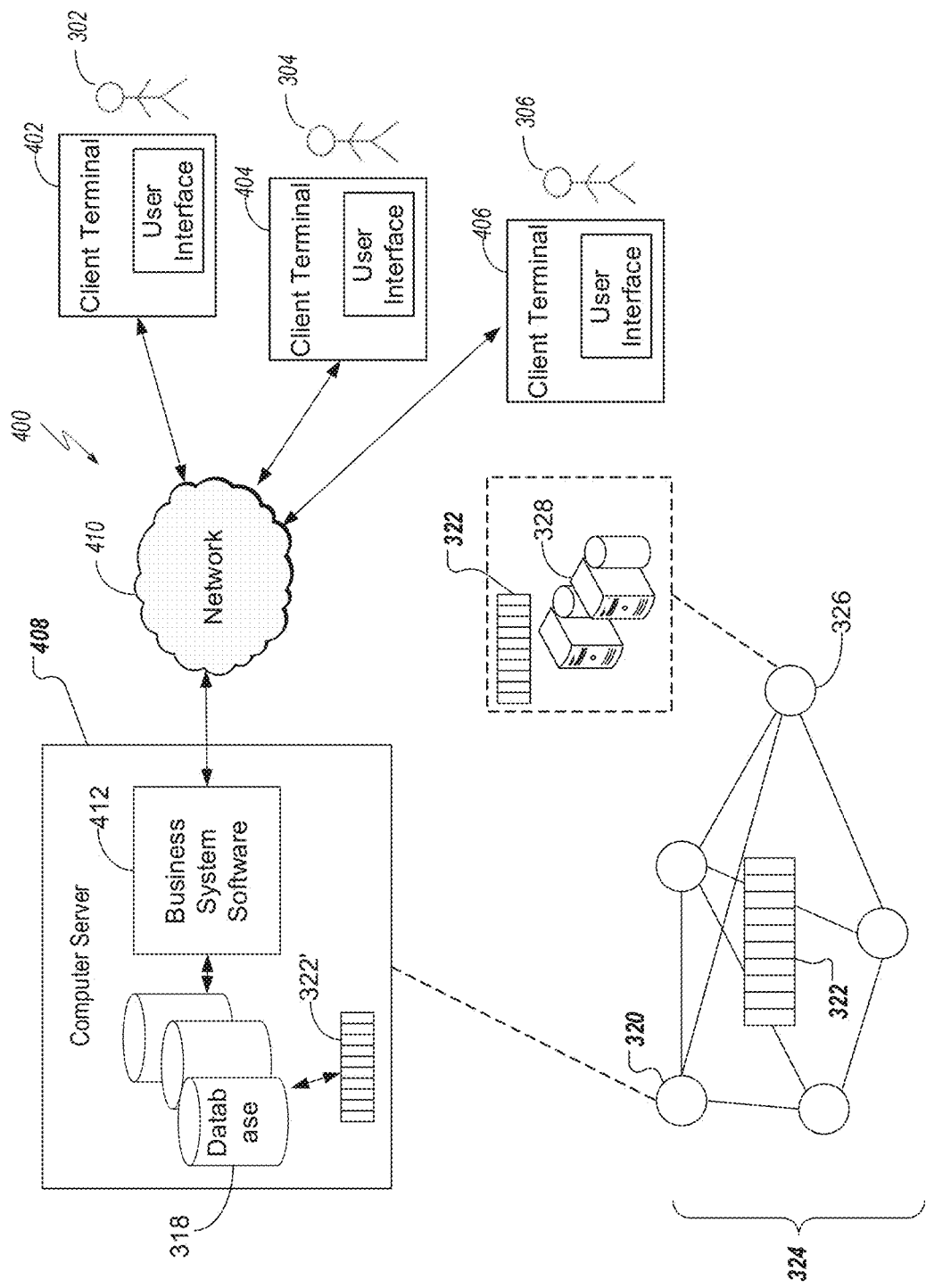
FIG. 4 is a diagram of an example of an environment in which users can access services provided by a business entity by using terminal devices that interact with a computer server of the business entity through a network.

FIG. 4 shows another example of an environment 400 in which users (e.g., 302, 304, 306) can access services provided by a business entity by using terminal devices (e.g., 402, 404, 406) that interact with a computer server 408 of the business entity through a network 410. The computer server 408 executes a business system software 412 that provides the services to the users. When the users access the services provided by the business system software 412, the business system software 412 generates many data records related to the services provided to the users.

In some embodiments, the business system software 412 stores the data records in one or more databases 318, generates a hash value for each of the records, and adds a block that includes the records and the hash values to a blockchain 322'. The computer server 408 can be associated with one of the nodes 320 of a blockchain network 324 in which a blockchain 322 is replicated across the blockchain network 324. The blockchain 322' maintained by the computer server 408 is a copy of the blockchain 322.

To enable the users to have greater control over the management of access to user data stored in consortium blockchains managed by business entities, a user data management platform is provided to support processes that achieve the following:

Registration of users. These users have data records stored in consortium blockchains that are managed by business entities that provide services to the users.

For each registered user, registration of the consortium blockchains that store the data records associated with the user.

For each registered user and each registered consortium blockchain that store data records associated with the user, registration of each data record associated with the user that is eligible for sharing with one or more third parties.

Authorization, by each user, of access to the data records associated with the user and stored in the consortium blockchains, in which the data records have been pre-registered as eligible for sharing with one or more third parties.

The authorization, by a particular user, of a particular third party to access a particular data record stored in a particular consortium blockchain involves first verifying that the consortium blockchain has been pre-approved to share data records belonging to the particular user with third parties, and second verifying that the particular user indeed wishes to share the particular data record with the particular third party.

In the examples described in this specification, the users are identified using decentralized identifiers, referred to as "digital identity decentralized identifiers." The consortium blockchains are identified using decentralized identifiers, referred to as "business decentralized identifiers." Another type of decentralized identifiers, referred to as "consortium blockchain digital activity decentralized identifiers," or "digital activity decentralized identifiers" for short, are associated with both a particular user and a particular consortium blockchain. The digital activity decentralized identifiers bind the business decentralized identifiers of the consortium blockchains with the digital identity decentralized identifiers of the users. The digital activity decentralized identifier associated with a particular user and a particular consortium blockchain is used by the user data management platform to verify requests related to data records that are associated with the particular user and stored in the particular consortium blockchain. For example, if a first set of data records associated with a first user is stored in a first consortium blockchain, and a second set of data records associated with the first user is stored in a second consortium blockchain, then a first digital activity decentralized identifier is used to verify requests related to the first set of data records, and a second digital activity decentralized identifier is used to verify requests related to the second set of data records. If a third set of data records associated with a second user is stored in the first consortium blockchain, and a fourth set of data records associated with the second user is stored in the second consortium blockchain, then a third digital activity decentralized identifier is used to verify the requests related to the third set of data records, and a fourth digital activity decentralized identifier is used to verify the requests related to the fourth set of data records.

In some implementations, when a business system wishes to grant a third party access to data records associated with a particular user, in which the data records are stored in a particular consortium blockchain associated with the business system, the business system invokes a smart contract associated with the particular consortium blockchain to cause a request for authorization of third party access to the user data records to be sent for approval. The request includes information about the data records that the third party wishes to access, and the digital activity decentralized identifier associated with the particular user and the particular consortium blockchain. By presenting the digital activity decentralized identifier, the request shows that the particular consortium blockchain has previously been approved to share data records associated with the particular user with third parties.

If the request does not include the correct digital activity decentralized identifier, the request will not be approved. For example, if the request includes information about data records associated with a first user that the third party wishes to access, and the digital activity decentralized identifier is associated with a second user, the request will not be approved. If the request includes information about data records stored in a first consortium blockchain that the third party wishes to access, and the digital activity decentralized identifier is associated with a second consortium blockchain, the request will also not be approved.

The following describes various processes that can be implemented by the user data management platform to achieve the features described above, including registration of users, registration of the consortium blockchains, registration of the data records, and authorization of access to the data records.

Figure 5:
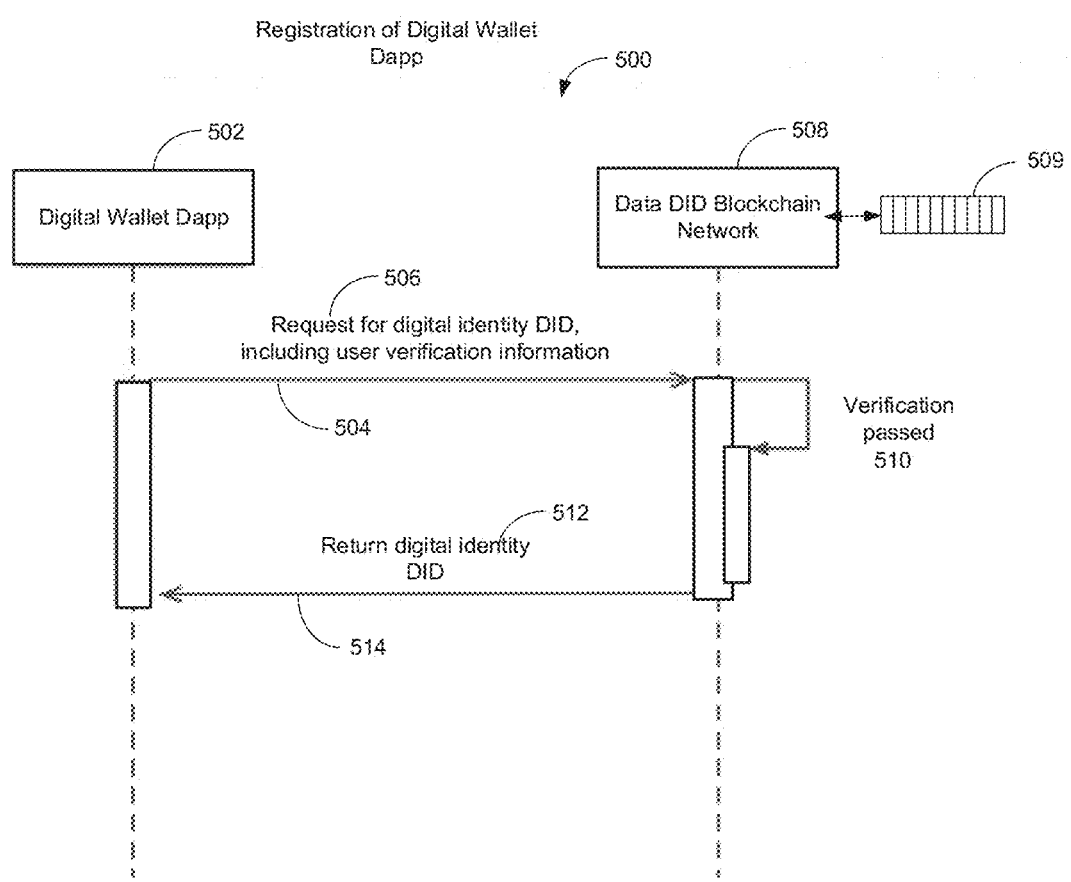
FIG. 5 is a diagram of an example of a process for a user to apply for a digital identity decentralized identifier.

FIG. 5 is a diagram of an example of a process 500 for a user (e.g., 302) to apply for a digital identity decentralized identifier (digital identity DID). In this example, the user is the user 302. In general, decentralized identifiers can be used for many purposes. Here, the decentralized identifier is used as a digital identity of the user 302, and is referred to as the digital identity decentralized identifier. In some embodiments, the user 302 uses an application program that is designed to interact with a data decentralized identifier blockchain in order to apply for the digital identity decentralized identifier. For example, the application program can be a digital wallet decentralized application (Dapp) 502. The digital wallet decentralized application 502 can be executed on, e.g., a mobile phone or a personal computer. However, the user can also use other types of application programs or apps to apply for the digital identity decentralized identifier.

The digital wallet decentralized application 502 sends 504 a request 506 for a digital identity decentralized identifier to a blockchain network 508 that maintains a blockchain 509 configured to maintain decentralized identifiers, referred to as a data decentralized identifier blockchain (or "data DID blockchain") 509. The blockchain network 508 is referred to as the data decentralized identifier blockchain network 508, which can be a network of computers that belong to a plurality of entities. Because the data decentralized identifier blockchain 509 is maintained by a plurality of entities, no single entity has control over the decentralized identifiers stored in the data decentralized identifier blockchain 509. Examples of implementations of the data decentralized identifier blockchain network 508 is described later in this specification. The request 506 includes verification information for verifying the identity of the user 302. Here, when we say that the request 506 is sent to the data decentralized identifier blockchain network 508, we mean that the request 506 is sent to an address associated with a smart blockchain contract or smart contract that is configured to verify the identity of the user 302 and generate the digital identity decentralized identifier for the user 302. The smart contract can be executed on a node, e.g., a computer server, of the data decentralized identifier blockchain network 508 that is responsible for verifying the identity of the user 302 and generating the digital identity decentralized identifier for the user 302. For example, the request 506 can be sent through a network, such as the Internet.

For example, the verification information can be a copy of the user's passport, national identify card, driver's license, credit card statements, and/or biometric information, such as one or more fingerprints, one or more voiceprints, or iris information. The data decentralized identifier blockchain network 508 verifies 510 the identity of the user 302 based on the information in the request 506 provided by the digital wallet Dapp 502, and confirms that the user 302 is indeed who he/she claims to be. Here, when we say that the data decentralized identifier blockchain network 508 verifies the identity of the user 302, we mean that a node, e.g., a computer server, of the data decentralized identifier blockchain network 508 that is responsible for verifying the identity of the users verifies the identity of the user 302.

If the identity of the user 302 is verified, the data decentralized identifier blockchain network 508 generates a unique digital identity decentralized identifier 512, and returns 514 the digital identity decentralized identifier 512 to the digital wallet Dapp 502. For example, the digital identity decentralized identifier 512 can be generated according to the standards specified by the World Wide Web Consortium (W3C). Here, when we say the data decentralized identifier blockchain network 508 generates a new digital identity decentralized identifier 512, we mean that a node, e.g., a computer server, of the data decentralized identifier blockchain network 508 that is responsible for generating digital identity decentralized identifiers generates the new digital identity decentralized identifier 512. The node also writes a record into the data decentralized identifier blockchain 509, in which the record includes the new digital identity decentralized identifier 512 and information about the user 302, such as what information is used to verify the identity of the user 302, so that the new digital identity decentralized identifier 512 can be mapped to, or associated with, the user 302.

For example, the digital wallet Dapp 502 can provide a user interface that allows the user 302 to perform various activities, such as requesting a new digital identity decentralized identifier, viewing the digital identity decentralized identifier, or sending the digital identity decentralized identifier to other entities in order to verify the identity of the user 302.

The data decentralized identifier blockchain network 508 can receive requests from multiple users, each request requesting a digital identity decentralized identifier for the respective user. The data decentralized identifier blockchain 508 can generate a unique digital identity decentralized identifier for each user, and store information about the digital identity decentralized identifiers and their corresponding users.

Figure 6:
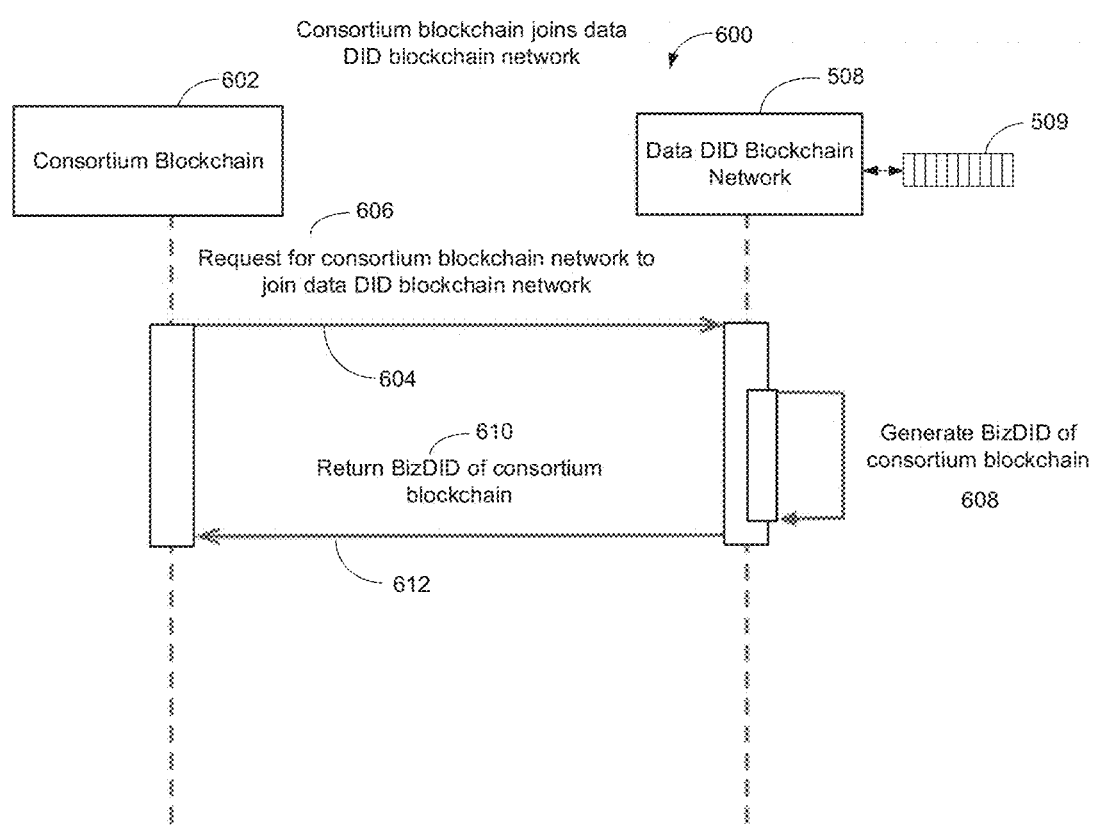
FIG. 6 is a diagram of an example of a process for a consortium blockchain to join or register with a data decentralized identifier (DID) blockchain network.

FIG. 6 is a diagram of an example of a process 600 for a consortium blockchain 602 to join the data decentralized identifier blockchain network 508 by registering itself with the decentralized identifier blockchain network 508 and obtain a business identifier (which in this example is also a decentralized identifier). After registration, the consortium blockchain 602 becomes associated with, or linked to, the data decentralized identifier blockchain network 508 through data channels and smart contracts.

For example, the consortium blockchain 602 can be maintained by a consortium blockchain network that include nodes associated with business entities that have shared interests or activities. For example, as shown in the example of FIG. 3, a consortium blockchain network can include nodes associated with one or more hospitals and related entities, or nodes associated with one or more suppliers of electronic devices and components and related entities, or nodes associated with one or more financial institutions and related entities, or nodes associated with one or more utilities company and related entities, or nodes associated with one or more companies that provide transportation services and related entities, or nodes associated with one or more restaurants and related entities, or nodes associated with one or more government organizations and related entities, or nodes associated with one or more non-profit organizations and related entities, or nodes associated with one or more educational institutions and/or research institutions and related entities, or nodes associated with one or more recreational groups and related entities. The consortium blockchain 602 can also maintained by a consortium blockchain network that includes nodes associated with other types of entities not described above.

The consortium blockchain 602 sends 604 a request 606 for joining or registering with the data decentralized identifier blockchain network 508 to the data decentralized identifier blockchain network 508. For example, the request 606 can be sent through a network, such as the Internet. Here, when we say that the consortium blockchain 602 sends the request 606, we mean that a node, e.g., a computer server, of the consortium blockchain network that maintains the consortium blockchain 602 that is responsible for obtaining business decentralized identifiers sends the request 606. When we say the request 606 is sent to the data decentralized identifier blockchain network 508, we mean that the request 606 is sent to a node, e.g., a computer server, of the data decentralized identifier blockchain network 508 responsible for receiving such requests. In this example, the request 606 includes information about the consortium blockchain 602, the public key of the consortium blockchain 602, and the recall smart contract function (or hook function) to allow the data decentralized identifier blockchain network 508 to call the consortium blockchain 602 later to send over the requested business decentralized identifier. The data decentralized identifier blockchain network 508 uses the public key to verify the request and the recall smart contract function. After verification, the data decentralized identifier blockchain network 508 generates 608 a business decentralized identifier BizDID 610 for the consortium blockchain 602. For example, the business decentralized identifier BizDID 610 can be generated according to the standards specified by the World Wide Web Consortium (W3C). Here, when we say the data decentralized identifier blockchain network 508 generates the business decentralized identifier BizDID 610, we mean that a node, e.g., a computer server, of the data decentralized identifier blockchain network 508 that is responsible for generating business decentralized identifiers generates the business decentralized identifier BizDID 610. The data decentralized identifier blockchain network 508 returns 612 the business decentralized identifier BizDID 610 to the consortium blockchain 602.

The data decentralized identifier blockchain network 508 can receive requests from multiple consortium blockchains, each request requesting a business decentralized identifier for the respective consortium blockchain. The data decentralized identifier blockchain network 508 can generate a unique business decentralized identifier for each consortium blockchain, and store information about the business decentralized identifiers and their corresponding consortium blockchains.

Figure 7:
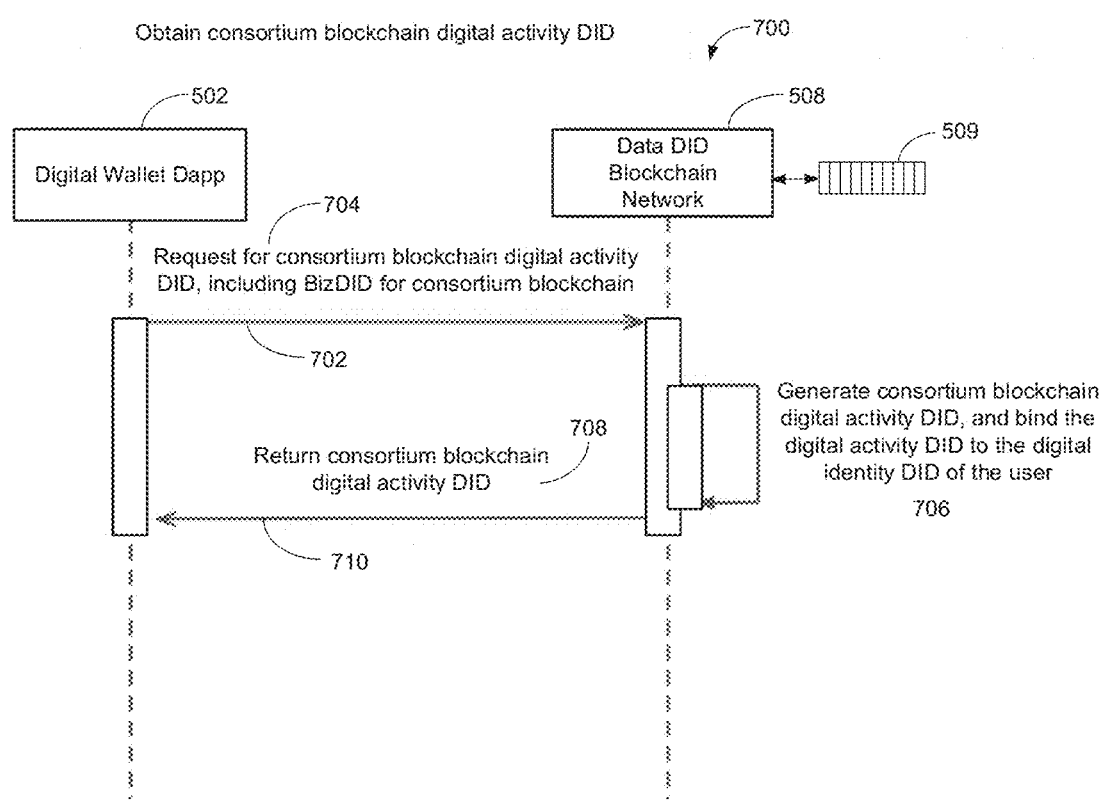
FIG. 7 is a diagram of an example process for requesting and obtaining a consortium blockchain digital activity identifier.

FIG. 7 is a diagram of an example process 700 for requesting and obtaining a consortium blockchain digital activity decentralized identifier. In this example, it is assumed that the user 302 instructs the digital wallet Dapp 502 to send the request for obtaining the digital activity decentralized identifier for the consortium blockchain 602. The digital activity decentralized identifier represents a combination of the user digital identity decentralized identifier 512 and the consortium blockchain decentralized identifier BizDID 610, and is used to identify data associated with the user and stored in the consortium blockchain 602.

In process 700, the user instructs the digital wallet Dapp 502 to send 702 a request 704 for a consortium blockchain digital activity decentralized identifier to the data decentralized identifier blockchain network 508. The request 704 includes the business decentralized identifier BizDID 610 of the consortium blockchain 602. Here, when we say that the request 704 is sent to the data decentralized identifier blockchain network 508, we mean that the request 704 is sent to a node, e.g., a computer server, of the data decentralized identifier blockchain network 508 responsible for generating consortium blockchain digital activity decentralized identifiers. The node for generating the consortium blockchain digital activity decentralized identifiers can be the same or different from the node for generating the business decentralized identifiers BizDIDs (FIG. 5). The node for generating the consortium blockchain digital activity decentralized identifiers can be the same or different from the node for generating the user digital identity decentralized identifiers (FIG. 4).

The data decentralized identifier blockchain network 508 generates 706 a new consortium blockchain digital activity decentralized identifier 708, and binds the digital activity decentralized identifier 708 with the digital identity decentralized identifier 512 of the user. In some implementations, the consortium blockchain digital activity decentralized identifier 708 is a function of the digital identity decentralized identifier 512 and the business decentralized identifier BizDID 610. For example, the digital activity decentralized identifier 708 can be generated according to the standards specified by the World Wide Web Consortium (W3C). The "consortium blockchain digital activity decentralized identifier" can be used to verify the identity of the user, in a way similar to using the "digital identity decentralized identifier to verify the identity of the user. Here, when we say that the data decentralized identifier blockchain network 508 generates 706 the new consortium blockchain digital activity decentralized identifier 708, we mean that a node, e.g., a computer server, of the data decentralized identifier blockchain network 508 responsible for generating digital activity decentralized identifiers generates the new digital activity decentralized identifier 708. The data decentralized identifier blockchain network 508 returns 710 the new digital activity decentralized identifier 708 to the digital wallet Dapp 502.

The process 700 can be repeated for requesting and obtaining additional digital activity decentralized identifiers for other consortium blockchains. For example, the user 302 may interact with a hospital, and the hospital may generate medical data for the user 302 and store the medial data in a hospital consortium blockchain. The user 302 may interact with a bank, and the bank may generate financial data for the user 302 and store the financial data in a bank consortium blockchain. The user 302 may interact with a supplier of products, and the supplier may generate purchase order data for the user 302 and store the purchase order data in a supplier consortium blockchain.

For example, the user 302 can instruct the digital wallet Dapp 502 to request and obtain a hospital consortium blockchain digital activity decentralized identifier that identifies data of the user 302 that are stored in the hospital consortium blockchain. The user 302 can instruct the digital wallet Dapp 502 to request and obtain a bank consortium blockchain digital activity decentralized identifier that identifies data of the user 302 that are stored in the bank consortium blockchain. The user 302 can instruct the digital wallet Dapp 502 to request and obtain a supplier consortium blockchain digital activity decentralized identifier that identifies data of the user 302 that are stored in the supplier consortium blockchain.

The data decentralized identifier blockchain 509 can store records about the digital identity decentralized identifiers of multiple users, in which each record has information about the digital identity decentralized identifier of one user. The record can include information about multiple consortium blockchain digital activity decentralized identifiers, in which each consortium blockchain digital activity decentralized identifier is associated with one consortium blockchain. Thus, if the user 302 has data stored in ten different consortium blockchains, the record can include information about ten digital activity decentralized identifiers for the ten consortium blockchains.

Figure 8:
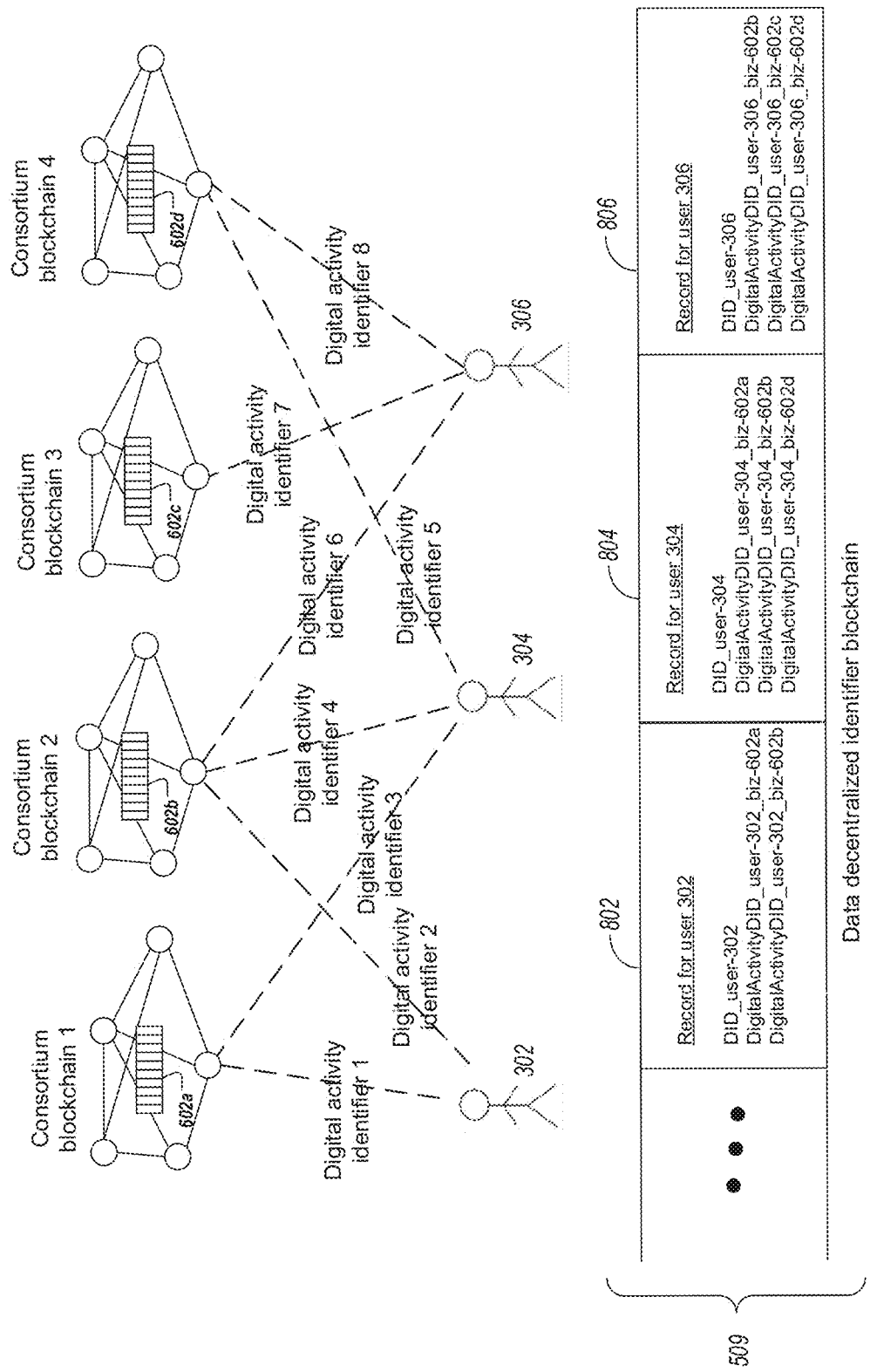
FIG. 8 is a diagram that shows users interacting with business entities that store data of the users in consortium blockchains.

Referring to FIG. 8, for example, the first user 302 interacts with a first business entity that stores data of the first user 302 in a first consortium blockchain 602*a*, and interacts with a second business entity that stores data of the first user 302 in a second consortium blockchain 602*b*. The second user 304 interacts with the first business entity that stores data of the second user 304 in the first consortium blockchain 602*a*, interacts with the second business entity that stores data of the second user 304 in the second consortium blockchain 602*b*, and interacts with a fourth business entity that stores data of the second user 304 in a fourth consortium blockchain 602*d*. The third user 306 interacts with the second business entity that stores data of the third user 306 in the second consortium blockchain 602*b*, interacts with the third business entity that stores data of the third user 306 in the third consortium blockchain 602*c*, and interacts with a fourth business entity that stores data of the third user 304 in a fourth consortium blockchain 602*d*.

In the example of FIG. 8, the first user 302 uses the digital wallet Dapp downloaded on the first user's device to obtain a first decentralized identifier DID_user-302 using the process 500 (FIG. 5). A first record 802 is added to the data decentralized identifier blockchain 509, in which the first record 802 includes the first decentralized identifier DID_user-302. The first record 802 will be used to store other identifiers that are bound to the first decentralized identifier DID_user-302. The second user 304 uses the digital wallet Dapp downloaded on the second user's device to obtain a second decentralized identifier DID_user-304 using the process 500. A second record 804 is added to the data decentralized identifier blockchain 509, in which the second record 804 includes the second decentralized identifier DID_user-304. The second record 804 will be used to store other identifiers that are bound to the second decentralized identifier DID_user-304. The third user 306 uses the digital wallet Dapp downloaded on the third user's device to obtain a third decentralized identifier DID_user-306 using the process 500. A third record 806 is added to the data decentralized identifier blockchain 509, in which the third record 806 includes the third decentralized identifier DID_user-306. The third record 806 will be used to store other identifiers that are bound to the third decentralized identifier DID_user-306.

The first consortium blockchain 602*a* obtains a first consortium blockchain decentralized identifier BizDID_602*a* using the process 600 (FIG. 6). In a similar manner, the second consortium blockchain 602*b*, the third consortium blockchain 602*c*, and the fourth consortium blockchain 602*d* obtain a second consortium blockchain decentralized identifier BizDID_602*b*, a third consortium blockchain decentralized identifier BizDID_602*c*, and a fourth consortium blockchain decentralized identifier BizDID_602*d*, respectively, using the process 600.

Using the process 700, the first user 302 instructs the digital wallet Dapp 502 to obtain a first consortium blockchain digital activity decentralized identifier DigitalActivityDID_user-302_biz-602*a* based on the decentralized identifier (DID_user-302) of the first user 302 and the business decentralized identifier BizDID_602*a* for the first consortium blockchain 602*a*. The first digital activity decentralized identifier DigitalActivityDID_user-302_biz-602*a* is bound to the first decentralized identifier DID_user-302, and is added to the first record 802 in the data decentralized identifier blockchain 509. The first digital activity decentralized identifier DigitalActivityDID_user-302_biz-602*a* will be used to identify the data associated with the first user 302 that are stored in the first consortium blockchain 602*a*.

The first user 302 instructs the digital wallet Dapp 502 to obtain a second consortium blockchain digital activity decentralized identifier DigitalActivityDID_user-302_biz-602*b* based on the decentralized identifier (DID_user-302) of the user 302 and the business decentralized identifier BizDID_602*b* for the second consortium blockchain 602*b*. The second digital activity decentralized identifier DigitalActivityDID_user-302_biz-602b is bound to the first decentralized identifier DID_user-302, and is added to the first record 802 in the data decentralized identifier blockchain 509. The second digital activity decentralized identifier DigitalActivityDID_user-302_biz-602b will be used to identify the data associated with the first user 302 that are stored in the second consortium blockchain 602b.

Using the process 700, the second user 304 instructs the digital wallet Dapp 502 on the second user's device to obtain a third consortium blockchain digital activity decentralized identifier DigitalActivityDID_user-304_biz-602a based on the decentralized identifier (DID_user-304) of the second user 304 and the business decentralized identifier BizDID_602a for the first consortium blockchain 602a. The third digital activity decentralized identifier DigitalActivityDID_user-304_biz-602a is bound to the second decentralized identifier DID_user-304, and is added to the second record 804 in the data decentralized identifier blockchain 509. The third digital activity decentralized identifier DigitalActivityDID_user-304_biz-602a will be used to identify the data associated with the second user 304 that are stored in the first consortium blockchain 602a.

The second user 304 instructs the digital wallet Dapp 502 on the second user's device to obtain a fourth consortium blockchain digital activity decentralized identifier DigitalActivityID_user-304_biz-602b based on the decentralized identifier (DID_user-304) of the second user 304 and the business decentralized identifier BizDID_602b for the second consortium blockchain 602b. The fourth digital activity decentralized identifier DigitalActivityDID_user-304_biz-602b is bound to the second decentralized identifier DID_user-304, and is added to the second record 804 in the data decentralized identifier blockchain 509. The fourth digital activity decentralized identifier DigitalActivityDID_user-304_biz-602b will be used to identify the data associated with the second user 304 that are stored in the second consortium blockchain 602b.

The second user 304 instructs the digital wallet Dapp 502 on the second user's device to obtain a fifth consortium blockchain digital activity decentralized identifier DigitalActivityDID_user-304_biz-602d based on the decentralized identifier (DID_user-304) of the second user 304 and the business decentralized identifier BizDID_602d for the fourth consortium blockchain 602d. The fifth digital activity decentralized identifier DigitalActivityDID_user-304_biz-602d is bound to the second decentralized identifier DID_user-304, and is added to the second record 804 in the data decentralized identifier blockchain 509. The fifth digital activity decentralized identifier DigitalActivityDID_user-304_biz-602d will be used to identify the data associated with the second user 304 that are stored in the fourth consortium blockchain 602d.

In a similar manner, using the process 700, the third user 306 instructs the digital wallet Dapp 502 on the third user's device to obtain a sixth consortium blockchain digital activity decentralized identifier DigitalActivityDID_user-306_biz-602b based on the decentralized identifier (DID_user-306) of the third user 306 and the business decentralized identifier BizDID_602b for the second consortium blockchain 602b. The sixth digital activity decentralized identifier DigitalActivityDID_user-306_biz-602b is bound to the third decentralized identifier DID_user-306, and is added to the third record 806 in the data decentralized identifier blockchain 509. The sixth digital activity decentralized identifier DigitalActivityDID_user-306_biz-602b will be used to identify the data associated with the third user 306 that are stored in the second consortium blockchain 602b.

The third user 306 instructs the digital wallet Dapp 502 on the third user's device to obtain a seventh consortium blockchain digital activity decentralized identifier DigitalActivityDID_user-306_biz-602c based on the decentralized identifier (DID_user-306) of the third user 306 and the business decentralized identifier BizDID_602c for the third consortium blockchain 602c. The seventh digital activity decentralized identifier DigitalActivityDID_user-306_biz-602c is bound to the third decentralized identifier DID_user-306, and is added to the third record 806 in the data decentralized identifier blockchain 509. The seventh digital activity decentralized identifier DigitalActivityDID_user-306_biz-602c will be used to identify the data associated with the third user 306 that are stored in the third consortium blockchain 602c.

The third user 306 instructs the digital wallet Dapp 502 on the third user's device to obtain an eighth consortium blockchain digital activity decentralized identifier DigitalActivityDID_user-306_biz-602d based on the decentralized identifier (DID_user-306) of the third user 306 and the business decentralized identifier BizDID_602d for the fourth consortium blockchain 602d. The eighth digital activity decentralized identifier DigitalActivityDID_user-306_biz-602d is bound to the third decentralized identifier DID_user-306, and is added to the third record 806 in the data decentralized identifier blockchain 509. The eighth digital activity decentralized identifier DigitalActivityDID_user-306_biz-602d will be used to identify the data associated with the third user 306 that are stored in the fourth consortium blockchain 602d.

Using the processes 500, 600, 700 shown in FIGS. 5 to 7 described above, the users can obtain (through the digital wallet applications) digital identity decentralized identifiers, consortium blockchains can obtain business decentralized identifiers, and the users can obtain (through the digital wallet applications) consortium blockchain digital activity decentralized identifiers for identifying records associated with the users and stored in the consortium blockchains. FIG. 8 shows an example of the data decentralized identifier blockchain 509 after the users and the consortium blockchains have used the processes 500, 600, 700 to obtain the digital identity decentralized identifiers, the business decentralized identifiers, and the digital activity decentralized identifiers.

Figure 9:
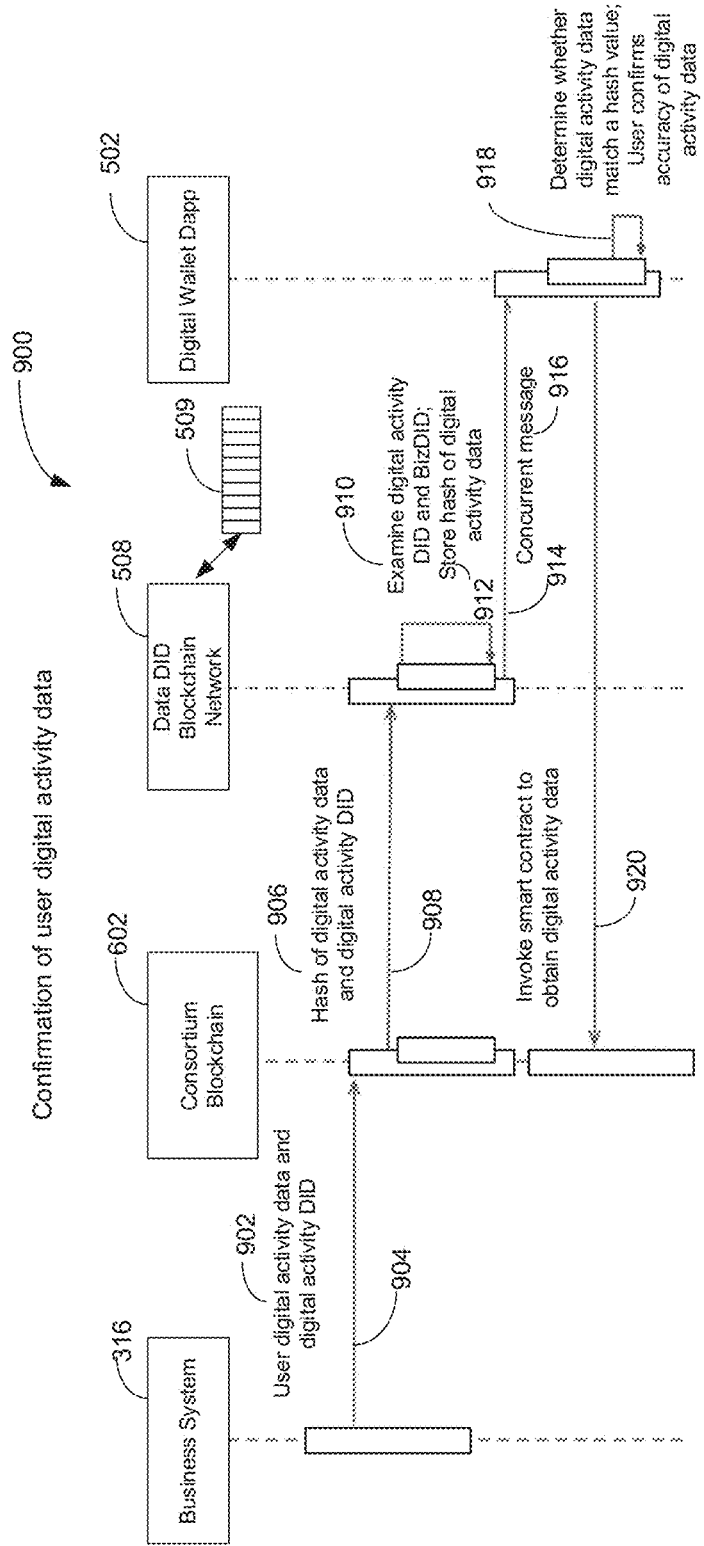
FIG. 9 is a flow diagram of an example of a process for the user to confirm the accuracy of a record that is stored in the consortium blockchain.

FIG. 9 is a flow diagram of an example of a process 900 for the user 302 to confirm the accuracy of a record that is stored in the consortium blockchain 602. The same principle can be used for the user 302 to confirm the accuracy of records that are stored in other consortium blockchains, or by other users to confirm the accuracy of records that are stored in the consortium blockchain 602 or other consortium blockchains.

The user 302 interacts with the business system 316, and user digital activity data 902 is generated by the user 302 or the business system 316. For example, if the business system 316 manages warehouse orders, the user digital activity data 902 can include, e.g., information about the user (e.g., name, postal and e-mail addresses, phone number(s), and billing information, etc.) provided by the user, and information related to the orders (e.g., information about products ordered by the user 302, quantity of the products ordered, time and date of the orders, payment history, etc.) generated by the business system 316.

The business system 316 stores 904 the digital activity data 902 associated with the user 302 and the relevant digital activity decentralized identifier into the consortium blockchain 602, in which the digital activity decentralized identifier (e.g., DigitalActivityDID_user-302_biz-602a in FIG. 8) is associated with the digital identity decentralized identifier of the user 302 and the business decentralized identifier of the consortium blockchain 602. In some implementations, the business system 316 provides a user interface that allows the user 302 to instruct the business system 316 that the user 302 wishes to store a record that can be viewed later and shared with others. The user interface can allow the user 302 to determine what information is included in the record. After the user 302 instructs the business system 316 to store a record, the user 302 can either view and verify the contents of the record using the user interface provided by the business system 316 or through the digital wallet Dapp 502. The business system 316 can invoke a smart contract at the consortium blockchain 602 such that upon receiving the digital activity data at the consortium blockchain 602, the smart contract generates a hash value 906 for the digital activity data, and sends 908 a request that includes the hash value 906 and the digital activity decentralized identifier to the data decentralized identifier blockchain network 508. For example, the request can also include a description of the digital activity data, such as "Warehouse receipt #1 for shipment 1 from company A on date B," "Medical record #5 for annual physical checkup performed on date C," "Image IoT009." The description can be used to identity a particular piece of digital activity data in the consortium blockchain 602.

At the data decentralized identifier blockchain network 508, a smart contract examines 910 the digital activity decentralized identifier to confirm that both the digital identity decentralized identifier of the user 302 and the business decentralized identifier of the consortium blockchain 602 are valid. For example, verifying the validity of the digital identity decentralized identifier of the user 302 may involve proving control of the decentralized identifier, i.e., the binding between the decentralized identifier and the decentralized identifier document that describes it, using a two step process: (i) Resolving the decentralized identifier to a decentralized identifier document according to its decentralized identifier method specification, and (ii) Verifying that the id property of the resulting decentralized identifier document matches the decentralized identifier that was resolved. The decentralized identifier document can express cryptographic keys and other verification methods, which can be used to authenticate or authorize interactions with the user 302 or associated parties. The information expressed often includes globally unambiguous identifiers and public key material, which can be used to verify digital signatures. The validity of the business decentralized identifier of the consortium blockchain 602 can be verified in a similar manner.

If there is no error message from the digital wallet Dapp 502 (described below), the smart contract stores 912 the hash value of the digital activity data 902 in the data decentralized identifier blockchain 509 in a record associated with the user, such as the first record 802 of FIG. 8. The smart contract also stores the description of the digital activity data 902 and an address of the consortium blockchain 602 in the data decentralized identifier blockchain 509. The data decentralized identifier blockchain 509 does not store the digital activity data 902, which are only stored in the consortium blockchain 602.

The smart contract at the data decentralized identifier blockchain network 508 sends 914 a concurrent message 916 to the digital wallet Dapp 502, in which the message 916 includes the hash value 906 of the digital activity data and the description of the digital activity data. The digital wallet Dapp 502 determines 918 whether the hash value 906 corresponds to the correct digital activity data that the user 302 wants to store at the consortium blockchain 602. The digital wallet Dapp 502 communicates with the consortium blockchain 602 to obtain the relevant digital activity data 902. For example, the digital wallet Dapp 502 may send the hash value 906 and the description of the digital activity data 902 to the blockchain 602 and invoke 920 a smart contract at the consortium blockchain 602 to obtain the relevant digital activity data 902. The smart contract verifies the identity of the digital wallet Dapp 502 to confirm that the Dapp 502 is indeed associated with the user 302 who can authorize access to the digital activity data 902. The smart contract then uses the information provided by the digital wallet Dapp 502 to look up the relevant digital activity data 902 and sends the digital activity data 902 to the digital wallet Dapp 502. The digital wallet Dapp 502 generates a hash value of the digital activity data retrieved from the consortium blockchain 602, and compares the generated hash value with the hash value provided by the data decentralized identifier blockchain network 508. If the hash values do not match, the digital wallet Dapp 502 informs the user 302 there is an error in the hash value provided by the data decentralized identifier blockchain network 508. The digital wallet Dapp 502 sends a message to the data decentralized identifier blockchain network 508 indicating there is an error in the hash value. In response to the error message from the digital wallet Dapp 502, the data decentralized identifier blockchain network 508 does not store the hash of the digital activity data in the blockchain 509, and informs the consortium blockchain 602 there is an error in the hash value.

If the digital wallet Dapp 502 determines that the hash value provided by the data decentralized identifier blockchain network 508 matches the hash value calculated by the digital wallet Dapp 502 based on the digital activity data retrieved from the consortium blockchain 602, the digital wallet Dapp 502 provides the digital activity data to the user 302 to enable the user 302 to review the content of the digital activity data. If the user 302 reviews the digital activity data and determines that the digital activity data is not correct (e.g., the record is for another user, or the details of the purchase order are not correct), the digital wallet Dapp 502 sends an error message to the data decentralized identifier blockchain network 508, and the data decentralized identifier blockchain network 508 does not store the hash of the digital activity data. The data decentralized identifier blockchain network 508 sends an error message to the consortium blockchain 602. If the user 302 reviews the digital activity data and confirms that the digital activity data is correct, the digital wallet Dapp 502 sends a message to the data decentralized identifier blockchain network 508 to confirm that the hash value is correct, and the data decentralized identifier blockchain network 508 stores the hash of the digital activity data in the data decentralized identifier blockchain 509.

The process 900 allows a user to verify the accuracy of the digital activity data, and register the hash value of the digital activity data in the data decentralized identifier blockchain 509. This allows the user to know what information will be shared with others when the user authorizes a third party to access a record associated with the user and stored in the consortium blockchain 602. The process 900 includes several safety features to ensure that the data shared by the user are accurate. For example, at step 910, the data decentralized identifier blockchain examines the digital activity decentralized identifier and the business decentralized identifier to confirm they are valid. By examining the digital activity decentralized identifier, the data decentralized identifier blockchain confirms that both the user and the consortium blockchain 602 have been registered with the data decentralized identifier blockchain. At step 918, the digital wallet Dapp 502 determines whether the hash value is correct in order to ensure the correctness of the content of the digital activity data.

Figure 10A:
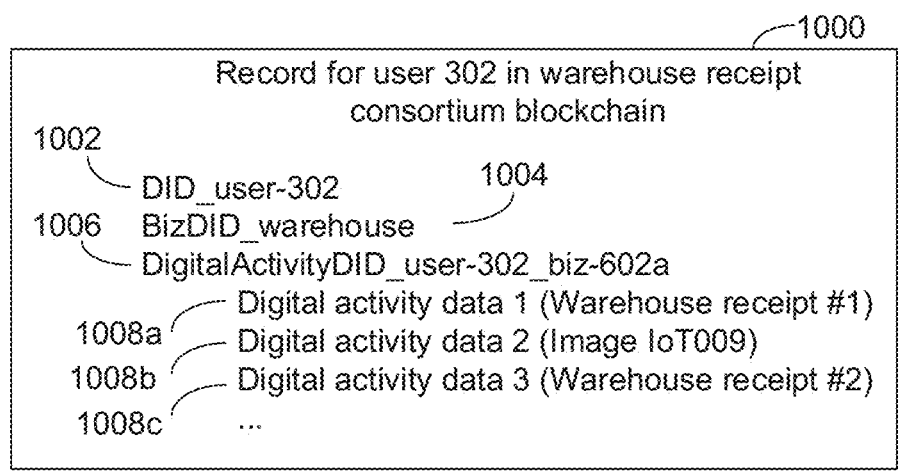
FIGS. 10A to 10C are diagrams that show examples of records stored in the consortium blockchains and the data decentralized identifier blockchain.
Figure 10B:
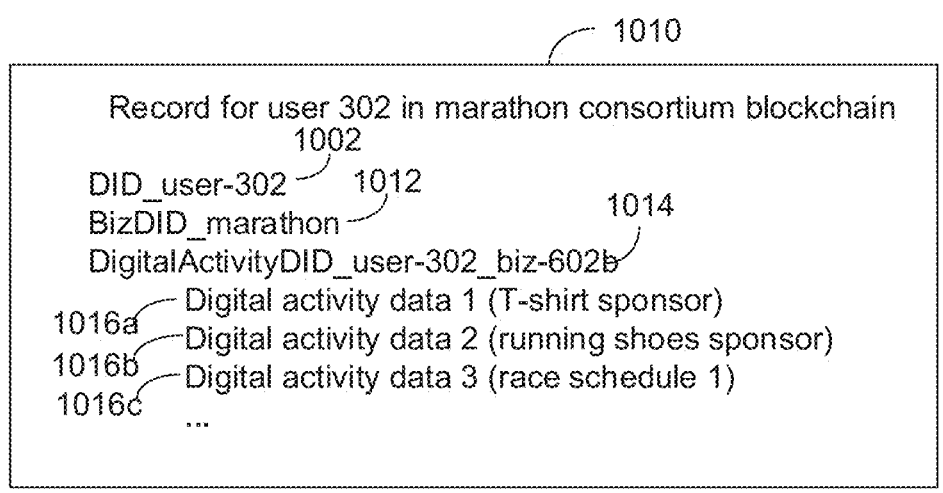
Figure 10C:
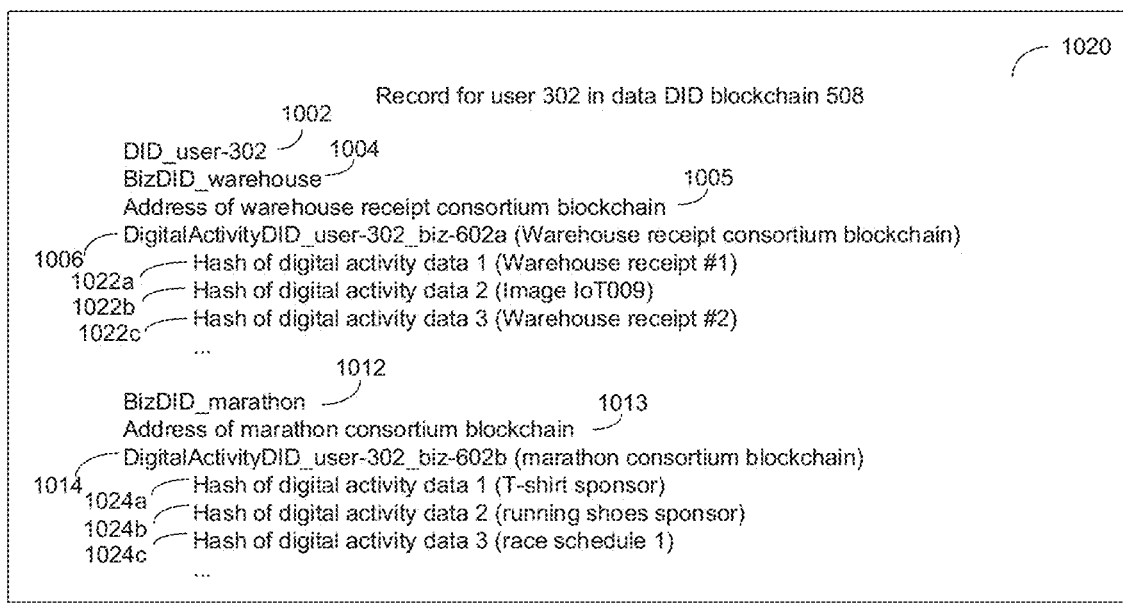

FIGS. 10A to 10C shows examples of records stored in the consortium blockchains and the data decentralized identifier blockchain. Referring to FIG. 10A, for example, a record 1000 in a warehouse receipt consortium blockchain stores data associated with the user 302. For example, the record 1000 stores a digital identity decentralized identifier 1002 of the user 302, a business decentralized identifier 1004 for the warehouse receipt consortium blockchain, and a consortium blockchain digital activity decentralized identifier 1006 (DigitalActivityDID_user-302_biz-602a) that identifies the digital activity data associated with the user 302 and stored in the warehouse receipt consortium blockchain. For example, the record 1000 stores first activity data 1008a related to a first warehouse receipt, second digital activity data 1008b related to an image file IoT009, and third digital activity data 1008c related to a second warehouse receipt.

Referring to FIG. 10B, for example, a record 1010 in a marathon consortium blockchain stores data associated with the user 302. For example, the record 1010 stores the digital identity decentralized identifier 1002 of the user 302, a business decentralized identifier 1012 for the marathon consortium blockchain, and a consortium blockchain digital activity decentralized identifier 1014 (DigitalActivityDID_user-302_biz-602b) that identifies the digital activity data associated with the user 302 and stored in the marathon consortium blockchain. For example, the record 1010 stores first digital activity data 1016a related to a first sponsor whose logo will be on a T-shirt that the user 302 will wear during a marathon race, second digital activity data 1016b related to a second sponsor who provided a pair of running shoes that the user 302 will wear during the marathon race, and third digital activity data 1016 related to a marathon race schedule.

Referring to FIG. 10C, for example, a record 1020 in the data decentralized identifier blockchain 509 stores data associated with the user 302. The record 1020 includes the digital identity decentralized identifier 1002 of the user 302, the business decentralized identifier (BizDID) 1004 of the warehouse receipt consortium blockchain, an address 1005 of the warehouse receipt consortium blockchain, and the consortium blockchain digital activity decentralized identifier 1006 (DigitalActivityDID_user-302_biz-602a) associated with the warehouse receipt consortium blockchain. The record 1020 includes the business decentralized identifier (BizDID) 1012 of the marathon consortium blockchain, an address 1013 of the warehouse receipt consortium blockchain, and the consortium blockchain digital activity decentralized identifier 1014 (DigitalActivityDID_user-302_biz-602b) associated with the marathon consortium blockchain. The record 1020 stores hash values of the digital activity data stored in the consortium blockchains, e.g., in step 912 in the process 900 of FIG. 9.

For example, the record 1020 stores hash values related to the digital activity data stored in the warehouse receipt consortium blockchain, including a first hash value 1022a of the first digital activity data 1008a related to the first warehouse receipt, a second hash value 1022b of the second digital activity data 1008b related to the image file IoT009, and a third hash value 1022c related to the second warehouse receipt. For example, the record 1020 stores hash values related to the digital activity data stored in the marathon consortium blockchain, including a hash value 1024a of the first digital activity data 1016a related to the first sponsor whose logo will be on the T-shirt that the user 302 will wear during the marathon race, a second hash value 1024b of the second digital activity data 1016b related to the second sponsor who provided the pair of running shoes that the user 302 will wear during the marathon race, and a third hash value 1024c of the digital activity data 1016c related to the marathon race schedule.

In this example, the consortium blockchain digital activity decentralized identifier 1006 (DigitalActivityDID_user-302_biz-602a) binds the business decentralized identifier 1004 (BizDID warehouse) to the digital identity decentralized identifier of the user 302. When a message requests an action to be performed on digital activity data or a hash value of the digital activity data, the message includes the consortium blockchain digital activity decentralized identifier 1006 (DigitalActivityDID_user-302_biz-602a) to indicate that the digital activity data is associated with the user 302, in which the digital activity data are stored in the consortium blockchain 602a. Thus, the data decentralized identifier blockchain network 508 can manage the authorization of access to digital activity data of the user 302 that are stored in the consortium blockchain 602a by using the consortium blockchain digital activity decentralized identifier 1006 (DigitalActivityDID_user-302_biz-602a) to identify such digital activity data. Similarly, the data decentralized identifier blockchain network 508 can manage the authorization of access to digital activity data of the user 302 that are stored in the consortium blockchain 602b by using the consortium blockchain digital activity decentralized identifier 1014 (DigitalActivityDID_user-302_biz-602b) to identify such digital activity data.

Likewise, the digital wallet Dapp 502 can manage the authorization of access to digital activity data of the user 302 that are stored in the consortium blockchain 602a by using the consortium blockchain digital activity decentralized identifier 1006 (DigitalActivityDID_user-302_biz-602a) to identify such digital activity data. Similarly, the digital wallet Dapp 502 can also manage the authorization of access to digital activity data of the user 302 that are stored in the consortium blockchain 602b by using the consortium blockchain digital activity decentralized identifier 1014 (DigitalActivityDID_user-302_biz-602b) to identify such digital activity data.

Figure 11:
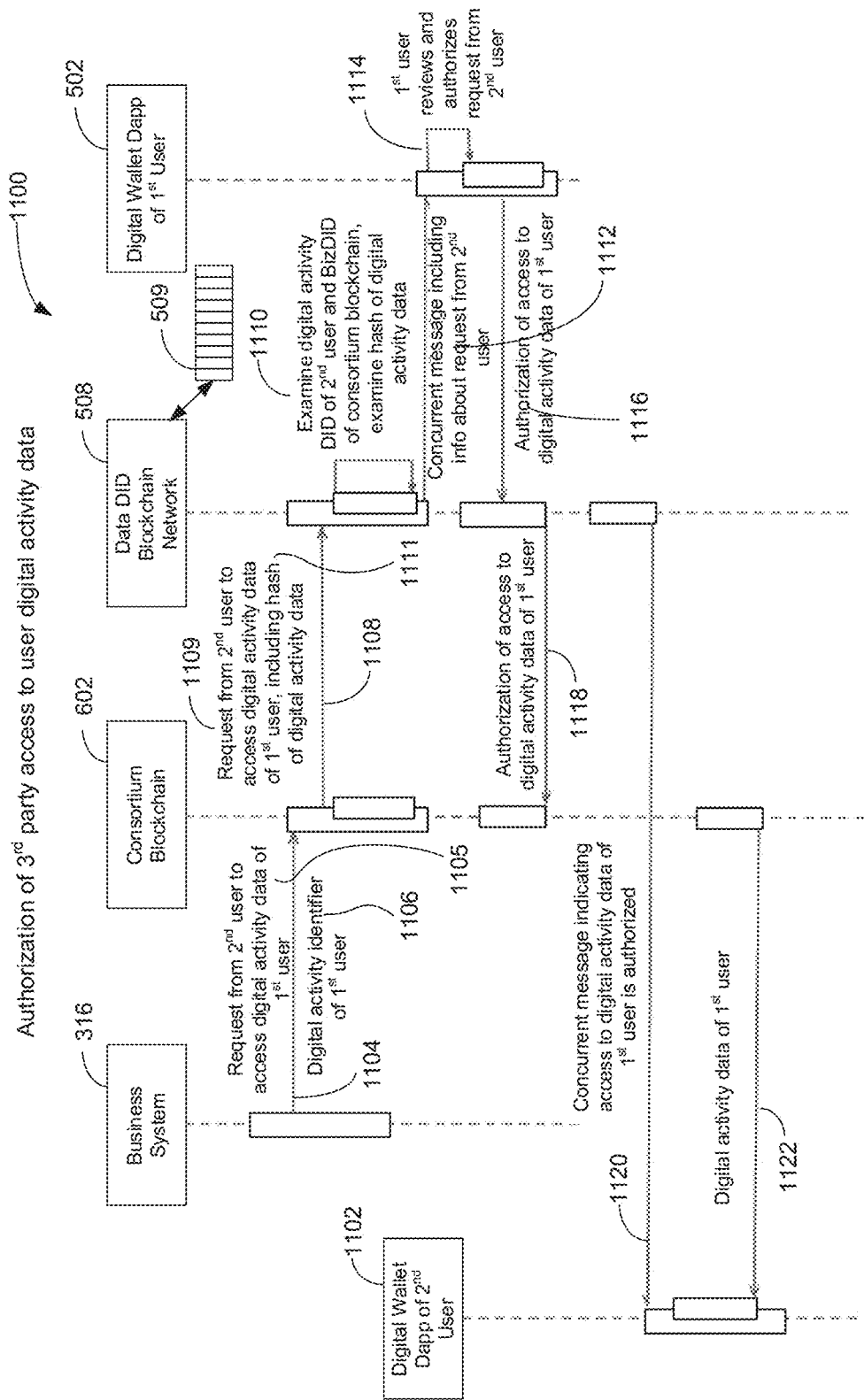
FIG. 11 is a flow diagram of an example of a process that allows a first user to authorize a second user to access the digital activity data associated with the first user.

FIG. 11 is a flow diagram of an example of a process 1100 that allows a first user (e.g., user 302) to authorize a second user (e.g., user 304) to access the digital activity data associated with the first user, in which the digital activity data are stored in a consortium blockchain (e.g., 602), and the hash values of the digital activity data are stored in a data decentralized identifier blockchain (e.g., 509). In this example, both the first and second users interact with a business system (e.g., 316) in order to obtain services provided by a business entity (e.g., 314). In the following, it is assumed that the first user is the user 302, the second user is the user 304, the consortium blockchain is the consortium blockchain 602, the data decentralized identifier blockchain network is the data decentralized identifier blockchain network 508, the business system is the business system 316, and the business entity is the business entity 314.

For example, the business entity 314 can be a warehouse receipt management system, and the business system 316 can provide a user interface that shows a list of warehouse receipts to certain users. The list can show basic information about each warehouse receipt without disclosing detailed information about the receipt. The basic information can include name and contact information of the user who deposited goods in the warehouse, but does not include detailed information such as the content of the goods, the quantity of the goods, and the value of the goods.

Referring to FIG. 11, the second user 304 accesses the business system 316 to see the list of warehouse receipts. If the second user 304 is interested in learning more about the details of a particular warehouse receipt, the second user 304 through the business system 316 sends 1104 a request to the consortium blockchain 602 for accessing the digital activity data 1105 associated with the particular warehouse receipt of the first user 302. The request includes the consortium blockchain digital activity decentralized identifier 1106 associated with the second user 304 and the consortium blockchain 602. The consortium blockchain 602 sends 1108 the request 1109 from the second user 304 for accessing the digital activity data of the first user 302 to the data decentralized identifier blockchain network 508. The request includes the consortium blockchain digital activity decentralized identifier 1106 of the second user 304, the business decentralized identifier (BizDID) of the consortium blockchain 602, and the hash value 1111 of the digital activity data being requested by the second user 304. The data decentralized identifier blockchain network 508 examines 1110 the digital activity decentralized identifier 1106 of the second user 304 and the business decentralized identifier of the consortium blockchain 602 to confirm that they are valid. The data decentralized identifier blockchain network 508 determines whether the hash value of the digital activity data provided by the consortium blockchain 602 matches a stored hash value. If the hash values match, this indicates that the digital activity data requested by the second user 304 likely has been pre-registered by the first user 302 using the process 900 of FIG. 9.

The data decentralized identifier blockchain network 508 concurrently sends 1112 a message to the digital wallet 502 of the first user 302, in which the message includes information about the request from the second user 304. In this example, the message is pushed from the data decentralized identifier blockchain network 508 to the digital wallet Dapp 502. In some examples, the digital wallet Dapp 502 can poll the data decentralized identifier blockchain network 508 periodically and retrieve the message from the data decentralized identifier blockchain network 508. The first user 302 reviews 1114 the request from the second user 304. If the first user 302 does not approve the request, the digital wallet Dapp 502 sends a message to the data decentralized identifier blockchain network 508 indicating that the request is not approved. The data decentralized identifier blockchain network 508 sends a message to the consortium blockchain 602 indicating that the request is not approved, and the consortium blockchain sends a message to the second user 304 indicating that the request is denied.

If the first user 302 approves the request, the digital wallet Dapp 502 sends 1116 a message to the data decentralized identifier blockchain network 508 indicating that the first user 302 has authorized the second user 304 to access the particular digital activity data. When the data decentralized identifier blockchain network 508 communicates with the digital wallet Dapp 502 of the first user 302, the data decentralized identifier blockchain network 508 verifies the decentralized identifier to make sure that it is the first user 302 and not some impostor who is authorizing the second user 304 access to the digital activity data. In some examples, the first user 302 can place conditions of the authorization granted to the second user 304. For example, the authorization can include a time limit, such as the authorization is valid for the next 2 hours, or the next 3 days. The data decentralized identifier blockchain network 508 sends 1118 a message indicating that the request from the second user 304 has been approved, and that the second user 304 is authorized to access the particular digital activity data with certain conditions, if any. Concurrently, the data decentralized identifier blockchain network 508 sends 1120 a message to the digital wallet Dapp 1102 of the second user 304 indicating that the request has been authorized and provides the address of the consortium blockchain 602 to the digital wallet Dapp 1102 of the second user 304. The digital wallet Dapp 1102 of the second user 304 sends a request to the consortium blockchain 602, requesting the digital activity data of the first user 302. The consortium blockchain 602 sends 1122 the digital activity data requested by the digital wallet Dapp 1102 to the digital wallet Dapp 1102.

The process 1100 allows a first user to authorize other users access to digital activity data associated with the first user, in which the digital activity data are stored in a blockchain that is not controlled by the user. The process 1100 ensures that only specific data authorized by the first user are shared with other users, under the conditions specified by the first user.

In some implementations, the "digital activity data associated with a user" include data that are accessible to the user through the business system 316, and does not include data that are not accessible to the user 302. For example, the user 302 can access a warehouse receipt history and see the user's information and information about the goods that have been deposited in the warehouse, and such information is included in the digital activity data associated with the user 302. The business system 316 can generate data about the user 302 that are confidential company information not shared with the user 302, such as how much profit is made doing business with the user 302. Such confidential information is not included as part of the digital activity data associated with the user.

In FIG. 11, the messages exchanged between the consortium blockchain 602, the decentralized identifier blockchain network 508, the digital wallet Dapp 502, and the digital wallet Dapp 1102 can be encrypted using various encryption technologies, such as Data Encryption Standard (DES), TripleDES, RSA, Advanced Encryption Standard (AES), Twofish, etc. Similarly, in FIGS. 5, 6, 7, and 9, the messages exchanged between the consortium blockchain 602, the decentralized identifier blockchain network 508, and the digital wallet Dapp 502 can be encrypted using various encryption technologies.

Figure 12:
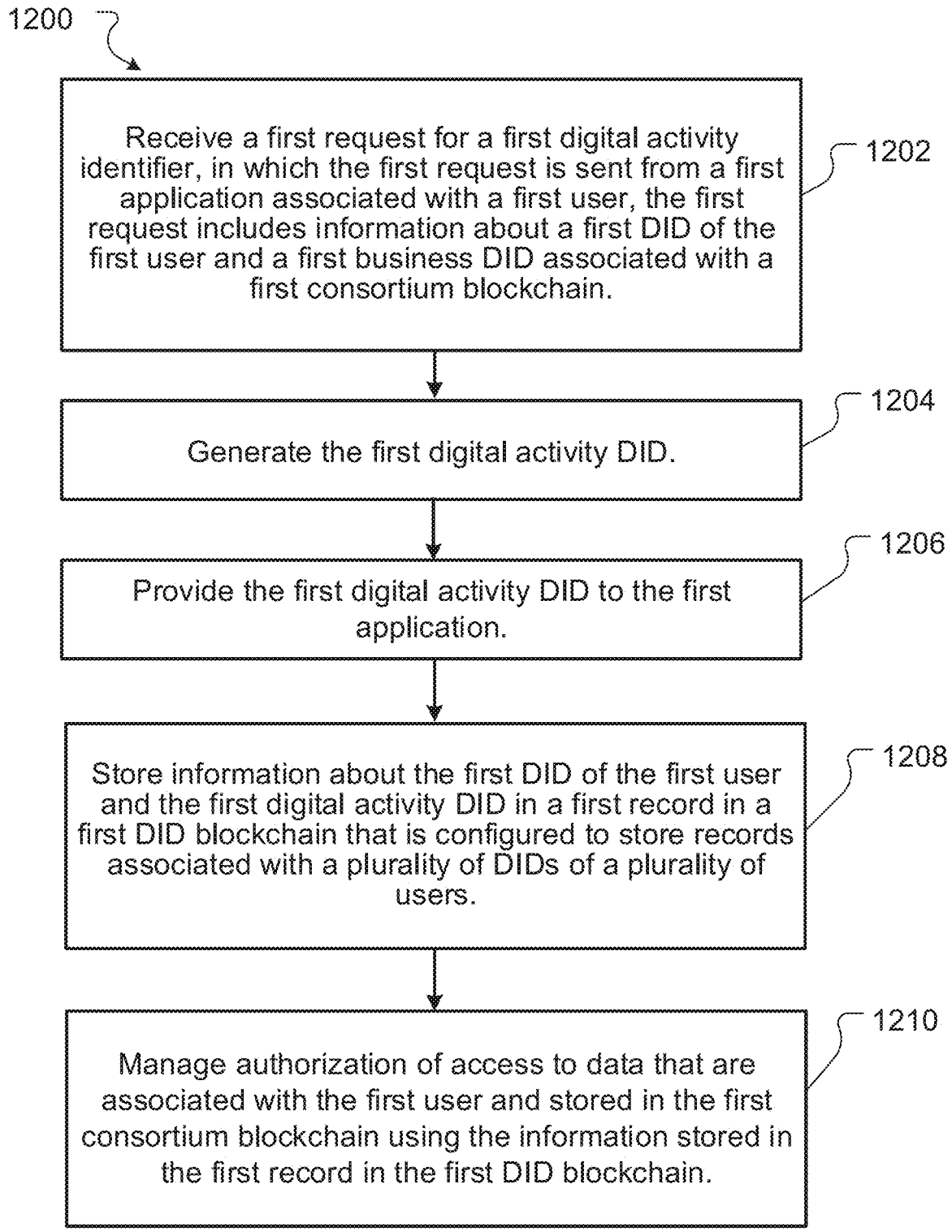

FIG. 12 is a flowchart of an example of a process 1200 for controlling or managing authorization of access to data. For convenience, the process 1200 will be described as being performed by a system of one or more computers, located in one or more locations, and programmed appropriately in accordance with this specification. For example, a computing system, e.g., the computing system 106 or 108 of FIG. 1, appropriately programmed, can perform the process 1200. The process 1200 includes the following steps.

At 1202, a decentralized identifier blockchain node receives a first request for a first digital activity decentralized identifier, in which the first request is sent from a first application associated with a first user, the first request includes information about a first decentralized identifier (DID) of the first user and a first business decentralized identifier (BizDID) associated with a first consortium blockchain.

In some embodiments, the first application associated with the first user can include a digital wallet decentralized application associated with the first user.

In some embodiments, the decentralized identifier blockchain node can be a blockchain node of the data decentralized identifier blockchain network 508 (FIG. 7), the first request can be the request 704, the first digital activity decentralized identifier can be the digital activity decentralized identifier 708, the first application can be the digital wallet Dapp 502, the first decentralized identifier of the first user can be the digital identity decentralized identifier 512 (FIG. 5), the first business decentralized identifier can be the business decentralized identifier 610 (FIG. 6), and the first consortium blockchain can be the consortium blockchain 602.

In some embodiments, the first consortium blockchain can store at least one of warehouse receipt records, merchandise order processing records, medical health records, shopping transaction records, housing rental transaction records, vehicle rental transaction records, transportation transaction records, warehouse transaction records, financial transaction records, or marathon records.

At 1204, the decentralized identifier blockchain node generates the first digital activity decentralized identifier. In some embodiments, generating the first digital activity decentralized identifier can include executing a smart contract at the decentralized identifier blockchain node, in which the smart contract is configured to generate the first digital activity decentralized identifier based on information included in the first request.

At 1206, the decentralized identifier blockchain node provides the first digital activity decentralized identifier to the first application.

At 1208, the decentralized identifier blockchain node stores information about the first decentralized identifier (DID) of the first user and the first digital activity decentralized identifier in a first record in a first decentralized identifier (DID) blockchain that is configured to store records associated with a plurality of decentralized identifiers (DID) of a plurality of users.

In some embodiments, storing information about the first decentralized identifier (DID) of the first user and the first digital activity decentralized identifier in the first record can include executing a smart contract at the decentralized identifier blockchain node to store the information.

At 1210, the decentralized identifier blockchain node controls or manages authorization of access to data that are associated with the first user and stored in the first consortium blockchain using the information stored in the first record in the decentralized identifier blockchain.

In some embodiments, managing authorization of the records can include enabling the first user to authorize a second user to access one or more of the records that are associated with the first user and stored in the first consortium blockchain. Managing authorization of access to data can include informing the first user about what data records associated with the first user are managed by the decentralized identifier blockchain. Managing authorization of access to data can include, in response to a request by a second user, prompting the first user to provide an instruction regarding whether to authorize the second user access to the data records associated with the first user. Managing authorization of access to data can include, in response to receiving the instruction from the first user, determining whether to authorize the second user access to the data records associated with the first user based on the instruction provided by the first user.

In some embodiments, the process 1200 can further include: The decentralized identifier blockchain node stores information about the first business decentralized identifier associated with the first consortium blockchain in the first record In some embodiments, the process 1200 can further include: The decentralized identifier blockchain node receives a second request for a second digital activity decentralized identifier, in which the second request includes information about the first decentralized identifier of the first user and a second business decentralized identifier associated with a second consortium blockchain. The decentralized identifier blockchain node generates the second digital activity decentralized identifier, provide the second digital activity decentralized identifier to the first application, store information about the second digital activity decentralized identifier in the first record, and manage authorization of records that are associated with the first user and stored in the second consortium blockchain using information in the first record.

In some embodiments, the process 1200 can further include: The decentralized identifier blockchain node stores information about the second business decentralized identifier associated with the second consortium blockchain in the first record.

In some embodiments, the process 1200 can further include: The decentralized identifier blockchain node receives a plurality of requests for digital activity decentralized identifiers, in which each of the plurality of requests includes information about the first decentralized identifier of the first user and a particular business decentralized identifier associated with a particular consortium blockchain. The decentralized identifier blockchain node generates the plurality of digital activity decentralized identifiers, in which each of the digital activity decentralized identifiers corresponds to one of the business decentralized identifiers, stores the digital activity decentralized identifiers in the first record, and manages authorization of records that are associated with the first user and stored in the consortium blockchains using information in the first record.

In some embodiments, the process 1200 can further include: The decentralized identifier blockchain node stores information about the business decentralized identifiers corresponding to the plurality of digital activity decentralized identifiers in the first record.

In some embodiments, the process 1200 can further include: The decentralized identifier blockchain node, prior to receiving the first request for the first digital activity decentralized identifier, receives a second request for obtaining the first decentralized identifier, in which the second request is sent from the first application associated with the first user. The decentralized identifier blockchain node obtains a first proof of identity authentication based on the second request, verifies an identity of the first user based on the first proof of identity authentication, generates the first decentralized identifier of the first user, provides the first decentralized identifier of the first user to the first application associated with the first user, and stores the first proof of identity authentication in the first record in the first decentralized identifier blockchain.

In some embodiments, the process 1200 can further include: The decentralized identifier blockchain node, prior to receiving the first request, receives a second request for obtaining the first business decentralized identifier, in which the second request is sent from the first consortium blockchain. The decentralized identifier blockchain node generates the first business decentralized identifier, and provides the first business decentralized identifier to the first consortium blockchain.

In some embodiments, the process 1200 can further include: The decentralized identifier blockchain node receives a second request for a second digital activity decentralized identifier, in which the second request is sent from a second application associated with a second user, the second request includes information about a second decentralized identifier of the second user and the first business decentralized identifier associated with the first consortium blockchain. The decentralized identifier blockchain node generates the second digital activity decentralized identifier, provides the second digital activity decentralized identifier to the second application, stores information about the second decentralized identifier of the second user and the second digital activity decentralized identifier in a second record in the first decentralized identifier (DID) blockchain, and manages authorization of records that are associated with the second user and stored in the first consortium blockchain at least in part based on information in the second record.

In some embodiments, the process 1200 can further include: The decentralized identifier blockchain node receives a plurality of requests for digital activity decentralized identifiers, in which each of the plurality of requests includes information about a particular decentralized identifier of one of a plurality of users and the first business decentralized identifier associated with the first consortium blockchain. The decentralized identifier blockchain node generates the plurality of digital activity decentralized identifiers, each of the digital activity decentralized identifiers corresponding to one of the plurality of users. The decentralized identifier blockchain node stores information about each of the digital activity decentralized identifiers to a corresponding record associated with a corresponding user, and manages authorization of records that are associated with the each of the users and stored in the first consortium blockchain at least in part based on the information in the records.

Figure 13:
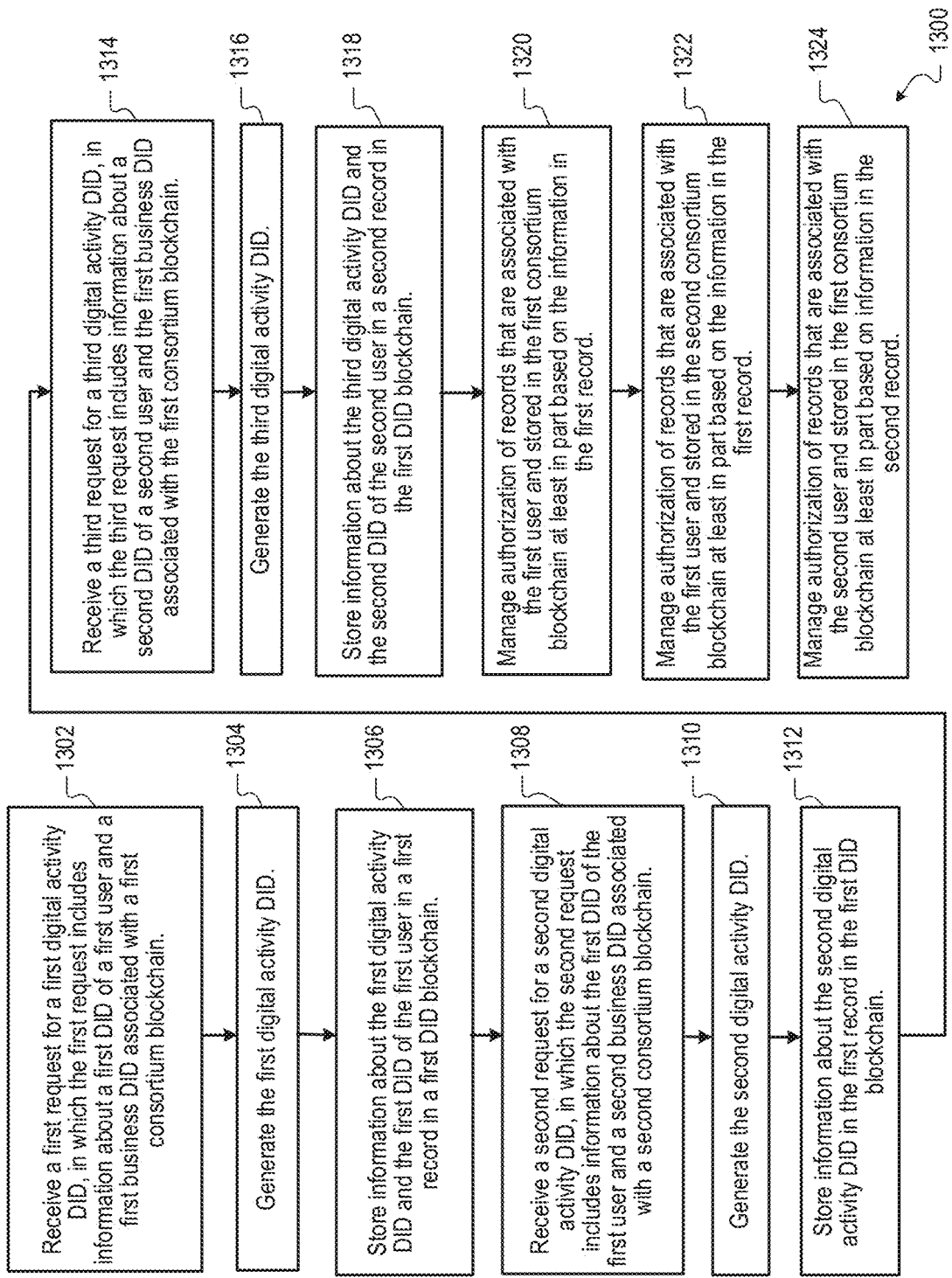

FIG. 13 is a flowchart of an example of a process 1300 for controlling or managing authorization of access to data. For convenience, the process 1300 will be described as being performed by a system of one or more computers, located in one or more locations, and programmed appropriately in accordance with this specification. For example, a computing system, e.g., the computing system 106 or 108 of FIG. 1, appropriately programmed, can perform the process 1300. The process 1300 includes the following steps.

At 1302, a decentralized identifier blockchain node receives a first request for a first digital activity decentralized identifier, in which the first request includes information about a first decentralized identifier of a first user and a first business decentralized identifier associated with a first consortium blockchain.

In some embodiments, the decentralized identifier blockchain node can be a blockchain node of the data decentralized identifier blockchain network 508 (FIG. 7), the first request can be the request 704, the first digital activity decentralized identifier can be the digital activity decentralized identifier 708, the first decentralized identifier of the first user can be the digital identity decentralized identifier 512 (FIG. 5), the first business decentralized identifier can be the business decentralized identifier 610 (FIG. 6), and the first consortium blockchain can be the consortium blockchain 602.

In some embodiments, the first consortium blockchain can store at least one of warehouse receipt records, merchandise order processing records, medical health records, shopping transaction records, housing rental transaction records, vehicle rental transaction records, transportation transaction records, warehouse transaction records, financial transaction records, or marathon records.

At 1304, the decentralized identifier blockchain node generates the first digital activity decentralized identifier. In some embodiments, generating the first digital activity decentralized identifier can include executing a smart contract at the decentralized identifier blockchain node, in which the smart contract is configured to generate the first digital activity decentralized identifier based on information included in the first request.

At 1306, the decentralized identifier blockchain node stores information about the first digital activity decentralized identifier and the first decentralized identifier of the first user in a first record in a first decentralized identifier blockchain. In some embodiments, storing information can include executing a smart contract at the decentralized identifier blockchain node to store the information.

At 1308, the decentralized identifier blockchain node receives a second request for a second digital activity decentralized identifier, in which the second request includes information about the first decentralized identifier of the first user and a second business decentralized identifier associated with a second consortium blockchain.

The second request can be similar to the request 704, the second digital activity decentralized identifier can be similar to the digital activity decentralized identifier 708, the second business decentralized identifier can be similar to the business decentralized identifier 610 (FIG. 6), and the second consortium blockchain can be similar to the consortium blockchain 602.

In some embodiments, the second consortium blockchain can store at least one of warehouse receipt records, merchandise order processing records, medical health records, shopping transaction records, housing rental transaction records, vehicle rental transaction records, transportation transaction records, warehouse transaction records, financial transaction records, or marathon records.

At 1310, the decentralized identifier blockchain node generates the second digital activity decentralized identifier. In some embodiments, generating the second digital activity decentralized identifier can include executing a smart contract at the decentralized identifier blockchain node, in which the smart contract is configured to generate the second digital activity decentralized identifier based on information included in the second request.

At 1312, the decentralized identifier blockchain node stores information about the second digital activity decentralized identifier in the first record. In some embodiments, storing information can include executing a smart contract at the decentralized identifier blockchain node to store the information.

At 1314, the decentralized identifier blockchain node receives a third request for a third digital activity decentralized identifier, in which the third request includes information about a second decentralized identifier of a second user and the first business decentralized identifier associated with the first consortium blockchain.

In some embodiments, the third request can be similar to the request 704, the third digital activity decentralized identifier can be similar to the digital activity decentralized identifier 708, and the second decentralized identifier of the second user can be similar to the digital identity decentralized identifier 512 (FIG. 5).

At 1316, the decentralized identifier blockchain node generates the third digital activity decentralized identifier. In some embodiments, generating the third digital activity decentralized identifier can include executing a smart contract at the decentralized identifier blockchain node, in which the smart contract is configured to generate the third digital activity decentralized identifier based on information included in the third request.

At 1318, the decentralized identifier blockchain node stores information about the third digital activity decentralized identifier and the second decentralized identifier of the second user in a second record in the first decentralized identifier blockchain. In some embodiments, storing information can include executing a smart contract at the decentralized identifier blockchain node to store the information.

At 1320, the decentralized identifier blockchain node controls or manages authorization of records that are associated with the first user and stored in the first consortium blockchain at least in part based on the information in the first record. In some embodiments, managing authorization of the records can include enabling the first user to authorize a second user to access one or more of the records that are associated with the first user and stored in the first consortium blockchain.

At 1322, the decentralized identifier blockchain node controls or manages authorization of records that are associated with the first user and stored in the second consortium blockchain at least in part based on the information in the first record. In some embodiments, managing authorization of the records can include enabling the first user to authorize a second user to access one or more of the records that are associated with the first user and stored in the second consortium blockchain.

At 1324, the decentralized identifier blockchain node controls or manages authorization of records that are associated with the second user and stored in the first consortium blockchain at least in part based on information in the second record. In some embodiments, managing authorization of the records can include enabling the second user to authorize a third user to access one or more of the records that are associated with the second user and stored in the first consortium blockchain.

FIG. 14 is a flowchart of an example of a process 1400 for controlling or managing authorization of access to data. For convenience, the process 1400 will be described as being performed by a system of one or more computers, located in one or more locations, and programmed appropriately in accordance with this specification. For example, a computing system, e.g., the computing system 106 or 108 of FIG. 1, appropriately programmed, can perform the process 1400. The process 1400 includes the following steps.

At 1402, a decentralized identifier blockchain node receives multiple sets of one or more requests for digital activity decentralized identifiers, in which each digital activity decentralized identifier is associated with a decentralized identifier (DID) of a user and also associated with a consortium blockchain, each set of one or more requests includes information about a corresponding decentralized identifier of a user and one or more business decentralized identifiers associated with one or more consortium blockchains, and different sets of one or more requests include information about different decentralized identifiers of different users.

In some embodiments, the decentralized identifier blockchain node can be a blockchain node of the data decentralized identifier blockchain network 508 (FIG. 7), the multiple sets of one or more requests can be similar to the request 704, the digital activity decentralized identifiers can be similar to the digital activity decentralized identifier 708, the decentralized identifiers can be similar to the digital identity decentralized identifier 512 (FIG. 5), the one or more business decentralized identifiers can be similar to the business decentralized identifier 610 (FIG. 6), and the one or more consortium blockchains can be similar to the consortium blockchain 602.

In some embodiments, each of the consortium blockchain can store at least one of warehouse receipt records, merchandise order processing records, medical health records, shopping transaction records, housing rental transaction records, vehicle rental transaction records, transportation transaction records, warehouse transaction records, financial transaction records, or marathon records.

At 1404, the decentralized identifier blockchain node generates the digital activity decentralized identifiers in response to the multiple sets of one or more requests for digital activity decentralized identifiers, in which each digital activity decentralized identifier is associated with a particular decentralized identifier of a particular user and also associated with a particular business decentralized identifier, different digital activity decentralized identifiers associated with the same set of one or more requests are associated with a same decentralized identifier of a user and associated with different business decentralized identifiers, and different digital activity decentralized identifiers associated with different sets of one or more requests are associated with different decentralized identifiers of different users.

In some embodiments, generating the digital activity decentralized identifiers can include executing a smart contract at the decentralized identifier blockchain node, in which the smart contract is configured to generate the digital activity decentralized identifiers based on information included in the corresponding requests.

At 1406, the decentralized identifier blockchain node stores data about the digital activity decentralized identifiers and the decentralized identifiers of the users in multiple records in a first decentralized identifier blockchain, in which each record stores data associated with one of the users. In some embodiments, storing data can include executing a smart contract at the decentralized identifier blockchain node to store the data.

At 1408, the decentralized identifier blockchain node controls or manages authorization of access to data that are associated with the users and stored in the consortium blockchains at least in part based on the records stored in the first decentralized identifier blockchain. In some embodiments, managing authorization of access to the data can include enabling one user to authorize another user to access data that are associated with the one user and stored in the corresponding consortium blockchain.

Figure 15:
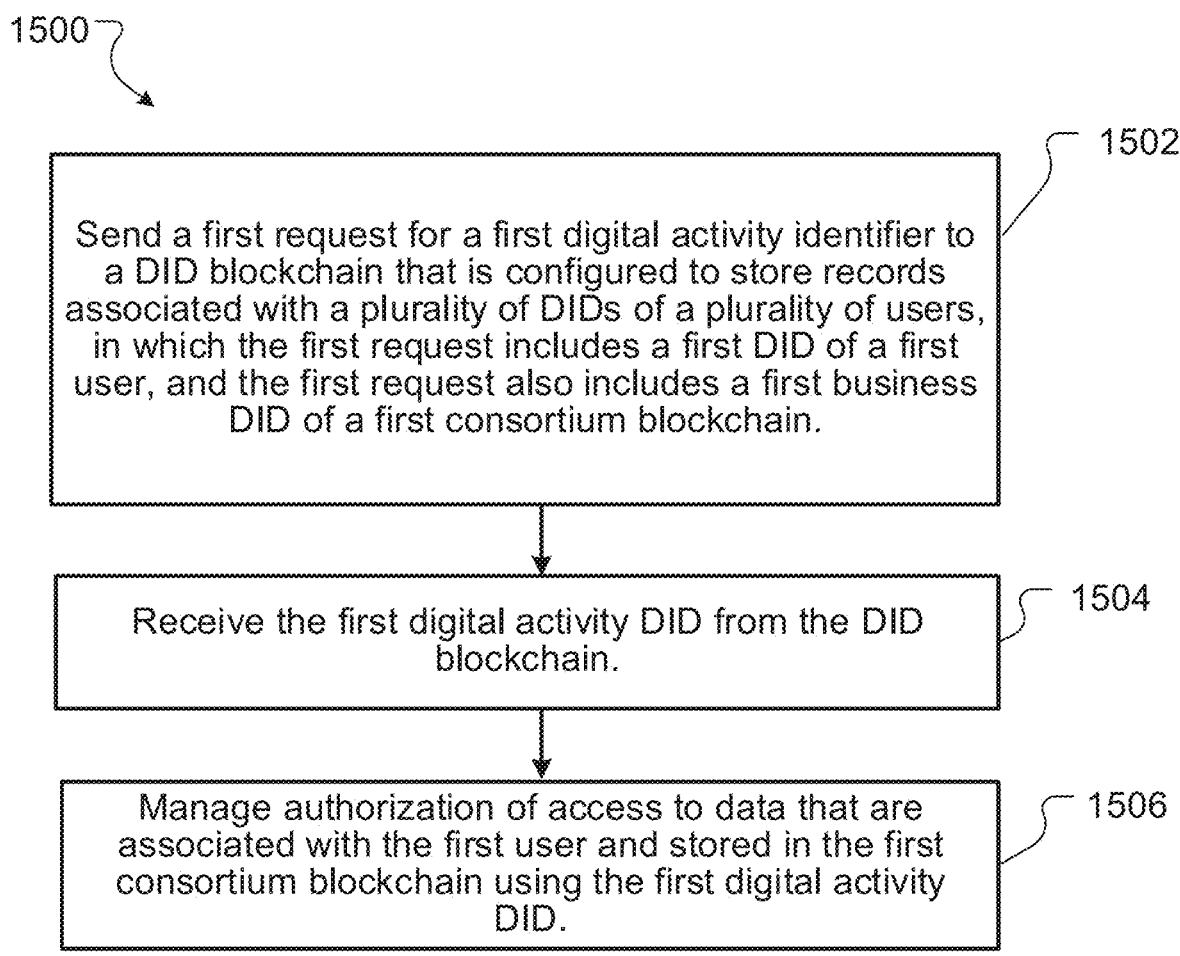

FIG. 15 is a flowchart of an example of a process 1500 for controlling or managing authorization of access to data. For convenience, the process 1500 will be described as being performed by a system of one or more computers, located in one or more locations, and programmed appropriately in accordance with this specification. For example, a user device, e.g., the client terminal 402, 404, or 406 of FIG. 4, appropriately programmed, can perform the process 1500. The process 1500 includes the following steps.

At 1502, an application sends a first request for a first digital activity decentralized identifier to a decentralized identifier blockchain that is configured to store records associated with a plurality of decentralized identifiers (DID) of a plurality of users, in which the first request includes a first decentralized identifier (DID) of a first user, and the first request also includes a first business decentralized identifier (BizDID) of a first consortium blockchain.

In some embodiments, the application can include a digital wallet decentralized application (e.g., 502) associated with the first user. The first request can be the request 704, the first digital activity decentralized identifier can be the digital activity decentralized identifier 708, the decentralized identifier blockchain node can be a blockchain node of the data decentralized identifier blockchain network 508 (FIG. 7), the plurality of decentralized identifiers can be similar to the digital identity decentralized identifier 512 (FIG. 5), the first business decentralized identifier can be the business decentralized identifier 610 (FIG. 6), and the first consortium blockchain can be the consortium blockchain 602.

In some embodiments, the consortium blockchain can store at least one of warehouse receipt records, merchandise order processing records, medical health records, shopping transaction records, housing rental transaction records, vehicle rental transaction records, transportation transaction records, warehouse transaction records, financial transaction records, or marathon records.

At 1504, the application receives the first digital activity decentralized identifier from the decentralized identifier blockchain.

At 1506, the application controls or manages authorization of access to data that are associated with the first user and stored in the first consortium blockchain using the first digital activity decentralized identifier.

In some embodiments, the process 1500 can further include: The application sends a second request for a second digital activity decentralized identifier to the decentralized identifier blockchain, in which the second request includes the first decentralized identifier (DID) of the first user, and the second request also includes a second business decentralized identifier (BizDID) of a second consortium blockchain. The application receives the second digital activity decentralized identifier from the decentralized identifier blockchain, and manages authorization of access to data that are associated with the first user and stored in the second consortium blockchain using the second digital activity decentralized identifier.

Figure 16:
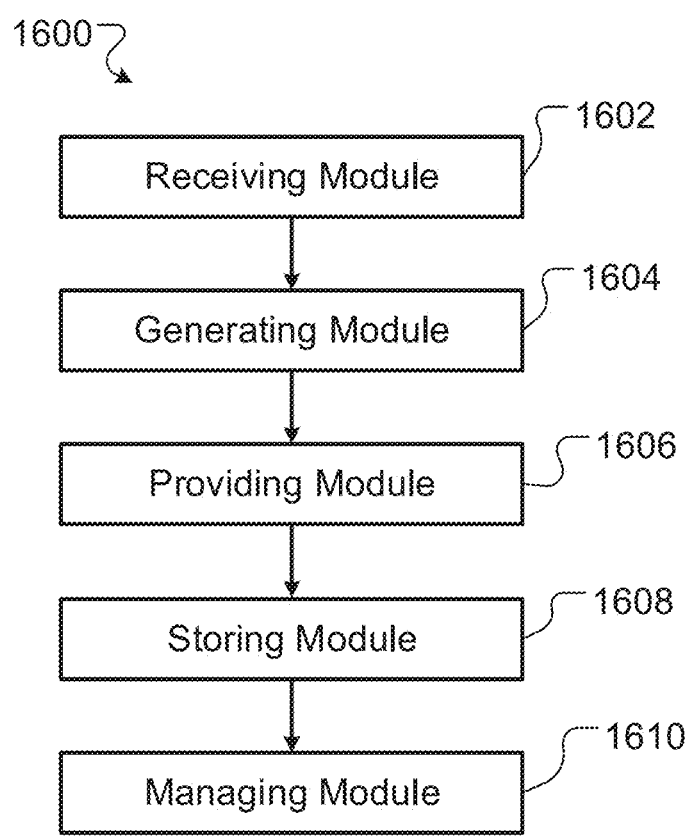
FIGS. 16 to 19 depict examples of modules of apparatuses in accordance with embodiments of this specification.

FIG. 16 is a diagram of an example of modules of an apparatus 1600 in accordance with embodiments of this specification. The apparatus 1600 can be an example of an embodiment of a data decentralized identifier blockchain node that is configured to control or manage authorization of access to user data stored in consortium blockchains. The apparatus 1600 can correspond to the embodiments described above, and the apparatus 1600 includes the following:

- a receiving module 1602 that receives a first request for a first digital activity decentralized identifier, in which the first request is sent from a first application associated with a first user, the first request includes information about a first decentralized identifier (DID) of the first user and a first business decentralized identifier (BizDID) associated with a first consortium blockchain;
- a generating module 1604 that generates the first digital activity decentralized identifier;
- a providing module 1606 that provides the first digital activity decentralized identifier to the first application;
- a storing module 1608 that stores information about the first decentralized identifier (DID) of the first user and the first digital activity decentralized identifier in a first record in a first decentralized identifier (DID) blockchain that is configured to store records associated with a plurality of decentralized identifiers (DID) of a plurality of users; and
- a managing module 1610 that manages authorization of access to data that are associated with the first user and stored in the first consortium blockchain using the information stored in the first record in the first decentralized identifier (DID) blockchain.

In an optional embodiment, the apparatus 1600 can further include a storing sub-module that stores information about the first business decentralized identifier associated with the first consortium blockchain in the first record.

In an optional embodiment, the apparatus 1600 can further include a receiving sub-module that receives a second request for a second digital activity decentralized identifier, in which the second request includes information about the first decentralized identifier of the first user and a second business decentralized identifier associated with a second consortium blockchain; a generating sub-module that generates the second digital activity decentralized identifier; a providing sub-module that provides the second digital activity decentralized identifier to the first application; a storing sub-module that stores information about the second digital activity decentralized identifier in the first record; and a managing sub-module that manages authorization of records that are associated with the first user and stored in the second consortium blockchain using information in the first record.

In an optional embodiment, the apparatus 1600 can further include a storing sub-module that stores information about the second business decentralized identifier associated with the second consortium blockchain in the first record.

In an optional embodiment, the apparatus 1600 can further include a receiving module that receives a plurality of requests for digital activity decentralized identifiers, in which each of the plurality of requests includes information about the first decentralized identifier of the first user and a particular business decentralized identifier associated with a particular consortium blockchain; a generating sub-module that generates the plurality of digital activity decentralized identifiers, in which each of the digital activity decentralized identifiers corresponds to one of the business decentralized identifiers; a storing sub-module that stores the digital activity decentralized identifiers in the first record; and a managing sub-module that manages authorization of records that are associated with the first user and stored in the consortium blockchains using information in the first record.

In an optional embodiment, the apparatus 1600 can further include a storing sub-module that stores information about the business decentralized identifiers corresponding to the plurality of digital activity decentralized identifiers in the first record.

In an optional embodiment, the first application associated with the first user can include a digital wallet decentralized application associated with the first user.

In an optional embodiment, the first request can be received at a first blockchain node that is associated with the first decentralized identifier blockchain, and the first digital activity decentralized identifier can be generated at the first blockchain node.

In an optional embodiment, the generating sub-module can include an executing sub-module that executes a smart contract at the first blockchain node that is associated with the first decentralized identifier blockchain, in which the smart contract can be configured to generate the first digital activity decentralized identifier based on information included in the first request.

In an optional embodiment, the storing sub-module can include an executing sub-module that executes a smart contract at the first blockchain node that is associated with the first decentralized identifier blockchain to store the information.

In an optional embodiment, the apparatus 1600 can further include a receiving sub-module that, prior to receiving the first request for the first digital activity decentralized identifier, receives a second request for obtaining the first decentralized identifier, in which the second request is sent from the first application associated with the first user; an obtaining sub-module that obtains a first proof of identity authentication based on the second request; a verifying sub-module that verifies an identity of the first user based on the first proof of identity authentication; a generating sub-module that generates the first decentralized identifier of the first user; a providing sub-module that provides the first decentralized identifier of the first user to the first application associated with the first user; and a storing sub-module that stores the first proof of identity authentication in the first record in the first decentralized identifier blockchain.

In an optional embodiment, the apparatus 1600 can further include a receiving sub-module that, prior to receiving the first request, receives a second request for obtaining the first business decentralized identifier, in which the second request is sent from the first consortium blockchain; a generating sub-module that generates the first business decentralized identifier; and a providing sub-module that provides the first business decentralized identifier to the first consortium blockchain.

In an optional embodiment, the first consortium blockchain can store at least one of warehouse receipt records, merchandise order processing records, medical health records, shopping transaction records, housing rental transaction records, vehicle rental transaction records, transportation transaction records, warehouse transaction records, financial transaction records, or marathon records.

In an optional embodiment, the apparatus 1600 can further include a receiving sub-module that receives a second request for a second digital activity decentralized identifier, in which the second request is sent from a second application associated with a second user, the second request includes information about a second decentralized identifier of the second user and the first business decentralized identifier associated with the first consortium blockchain; a generating sub-module that generates the second digital activity decentralized identifier; a providing sub-module that provides the second digital activity decentralized identifier to the second application; a storing sub-module that stores information about the second decentralized identifier of the second user and the second digital activity decentralized identifier in a second record in the first decentralized identifier (DID) blockchain; and a managing sub-module that manages authorization of records that are associated with the second user and stored in the first consortium blockchain at least in part based on information in the second record.

In an optional embodiment, the apparatus 1600 can further include a receiving sub-module that receives a plurality of requests for digital activity decentralized identifiers, in which each of the plurality of requests includes information about a particular decentralized identifier of one of a plurality of users and the first business decentralized identifier associated with the first consortium blockchain; a generating sub-module that generates the plurality of digital activity decentralized identifiers, each of the digital activity decentralized identifiers corresponding to one of the plurality of users; a storing sub-module that stores information about each of the digital activity decentralized identifiers to a corresponding record associated with a corresponding user; and a managing sub-module that manages authorization of records that are associated with the each of the users and stored in the first consortium blockchain at least in part based on the information in the records.

In an optional embodiment, the managing sub-module can include an enabling sub-module that enables the first user to authorize a second user to access one or more of the records that are associated with the first user and stored in the first consortium blockchain.

Figure 17:
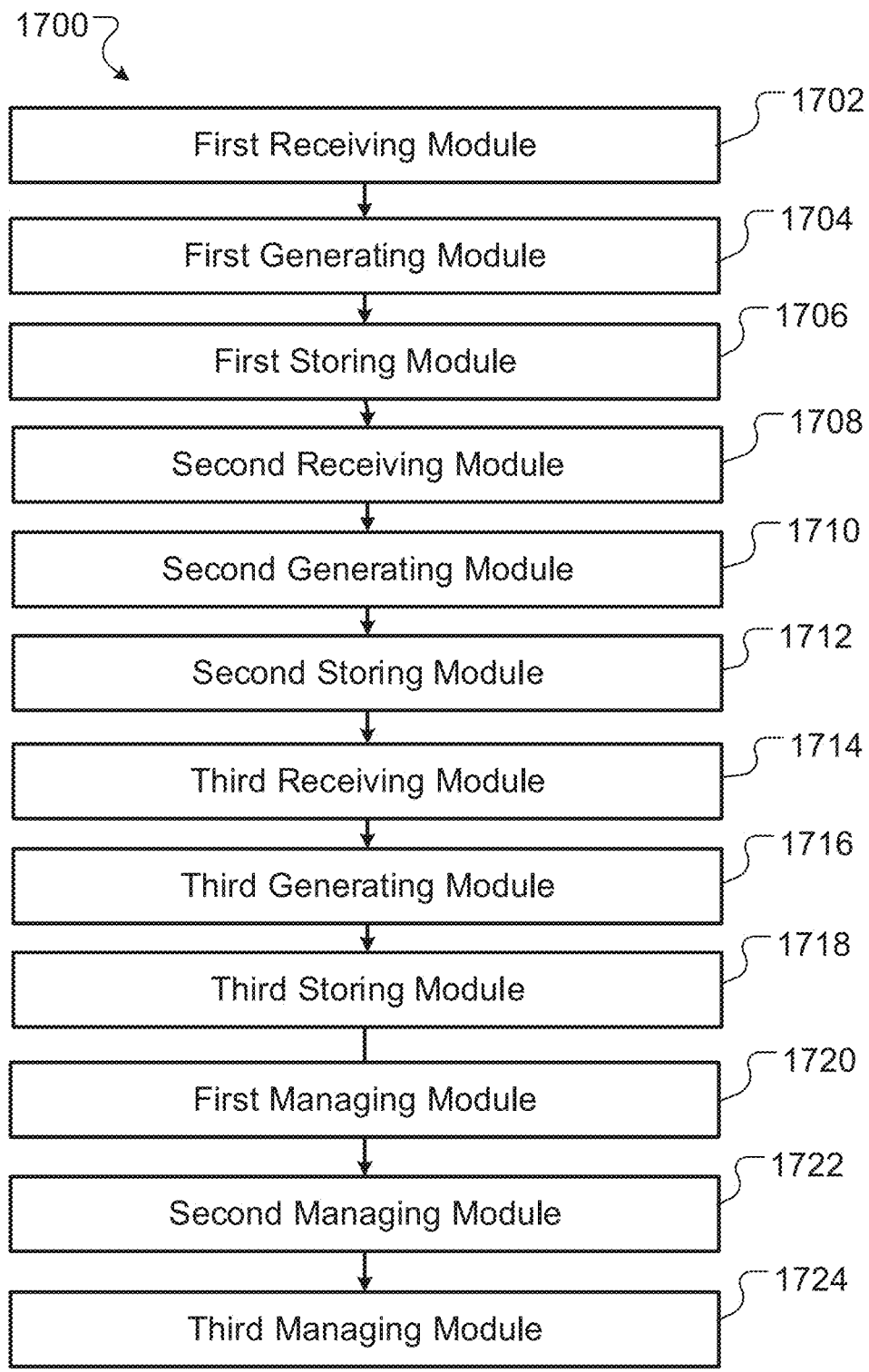

FIG. 17 is a diagram of an example of modules of an apparatus 1700 in accordance with embodiments of this specification. The apparatus 1700 can be an example of an embodiment of a data decentralized identifier blockchain node that is configured to control or manage authorization of access to user data stored in consortium blockchains. The apparatus 1700 can correspond to the embodiments described above, and the apparatus 1700 includes the following:

a first receiving module 1702 that receives a first request for a first digital activity decentralized identifier, in which the first request includes information about a first decentralized identifier of a first user and a first business decentralized identifier associated with a first consortium blockchain;

a first generating module 1704 that generates the first digital activity decentralized identifier;

a first storing module 1706 that stores information about the first digital activity decentralized identifier and the first decentralized identifier of the first user in a first record in a first decentralized identifier blockchain;

a second receiving module 1708 that receives a second request for a second digital activity decentralized identifier, in which the second request includes information about the first decentralized identifier of the first user and a second business decentralized identifier associated with a second consortium blockchain;

a second generating module 1710 that generates the second digital activity decentralized identifier;

a second storing module 1712 that stores information about the second digital activity decentralized identifier in the first record;

a third receiving module 1714 that receives a third request for a third digital activity decentralized identifier, in which the third request includes information about a second decentralized identifier of a second user and the first business decentralized identifier associated with the first consortium blockchain;

a third generating module 1716 that generates the third digital activity decentralized identifier;

a third storing module 1718 that stores information about the third digital activity decentralized identifier and the second decentralized identifier of the second user in a second record in the first decentralized identifier blockchain;

a first managing module 1720 that manages authorization of records that are associated with the first user and stored in the first consortium blockchain at least in part based on the information in the first record;

a second managing module 1722 that manages authorization of records that are associated with the first user and stored in the second consortium blockchain at least in part based on the information in the first record; and a third managing module 1724 that manages authorization of records that are associated with the second user and stored in the first consortium blockchain at least in part based on information in the second record.

In an optional embodiment, the first consortium blockchain can store at least a first one of warehouse receipt records, merchandise order processing records, medical health records, shopping transaction records, housing rental transaction records, vehicle rental transaction records, transportation transaction records, warehouse transaction records, financial transaction records, or marathon records.

In an optional embodiment, the second consortium blockchain can store at least a second one of warehouse receipt records, merchandise order processing records, medical health records, shopping transaction records, housing rental transaction records, vehicle rental transaction records, transportation transaction records, warehouse transaction records, financial transaction records, or marathon records.

Figure 18:
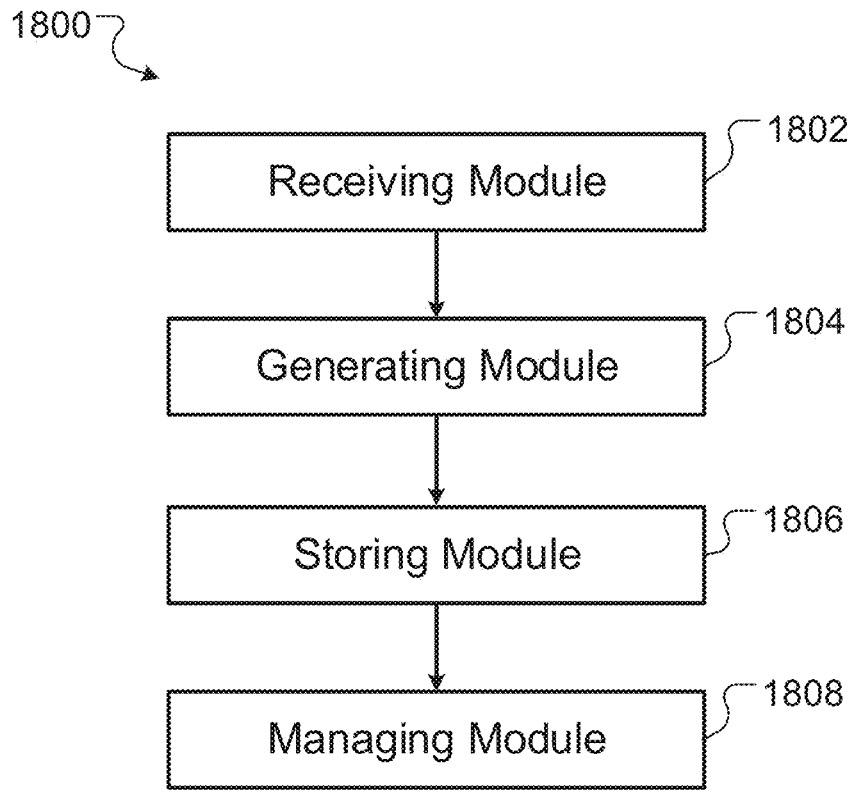

FIG. 18 is a diagram of an example of modules of an apparatus 1800 in accordance with embodiments of this specification. The apparatus 1800 can be an example of an embodiment of a data decentralized identifier blockchain node that is configured to control or manage authorization of access to user data stored in consortium blockchains. The apparatus 1800 can correspond to the embodiments described above, and the apparatus 1800 includes the following:

- a receiving module 1802 that receives multiple sets of one or more requests for digital activity decentralized identifiers, in which each digital activity decentralized identifier is associated with a decentralized identifier (DID) of a user and also associated with a consortium blockchain, each set of one or more requests includes information about a corresponding decentralized identifier of a user and one or more business decentralized identifiers associated with one or more consortium blockchains, and different sets of one or more requests include information about different decentralized identifiers of different users;
- a generating module 1804 that generates the digital activity decentralized identifiers in response to the multiple sets of one or more requests for digital activity decentralized identifiers, in which each digital activity decentralized identifier is associated with a particular decentralized identifier of a particular user and also associated with a particular business decentralized identifier, different digital activity decentralized identifiers associated with the same set of one or more requests are associated with a same decentralized identifier of a user and associated with different business decentralized identifiers, and different digital activity decentralized identifiers associated with different sets of one or more requests are associated with different decentralized identifiers of different users;
- a storing module 1806 that stores data about the digital activity decentralized identifiers and the decentralized identifiers of the users in multiple records in a first decentralized identifier blockchain, in which each record stores data associated with one of the users; and
- a managing module 1808 that manages authorization of access to data that are associated with the users and stored in the consortium blockchains at least in part based on the records stored in the first decentralized identifier blockchain.

In an optional embodiment, each of the consortium blockchains can store at least one of warehouse receipt records, merchandise order processing records, medical health records, shopping transaction records, housing rental transaction records, vehicle rental transaction records, transportation transaction records, warehouse transaction records, financial transaction records, or marathon records.

Figure 19:
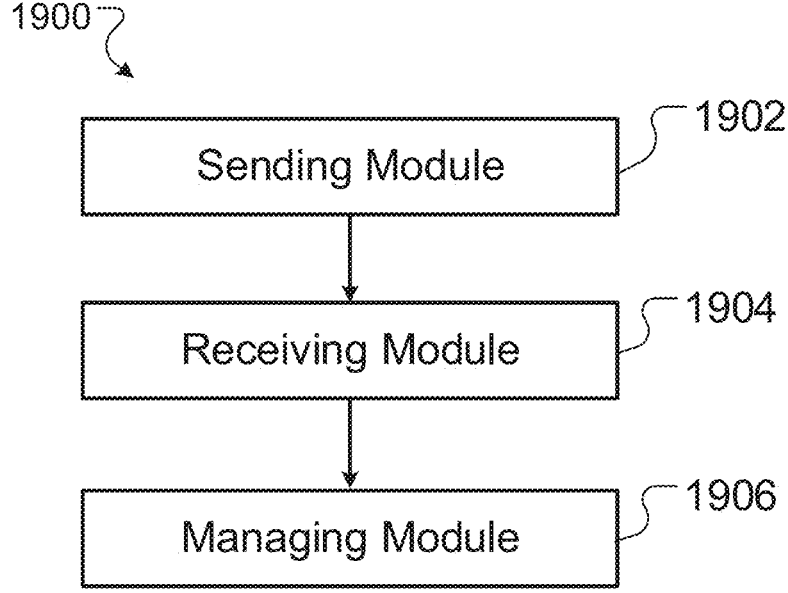

FIG. 19 is a diagram of an example of modules of an apparatus 1900 in accordance with embodiments of this specification. The apparatus 1900 can be an example of an embodiment of user device executing an application program that is configured to control or manage authorization of access to user data stored in consortium blockchains. The apparatus 1900 can correspond to the embodiments described above, and the apparatus 1900 includes the following:

- a sending module 1902 that sends a first request for a first digital activity decentralized identifier to a decentralized identifier blockchain that is configured to store records associated with a plurality of decentralized identifiers (DID) of a plurality of users, in which the first request includes a first decentralized identifier (DID) of a first user, and the first request also includes a first business decentralized identifier (BizDID) of a first consortium blockchain;
- a receiving module 1904 that receives the first digital activity decentralized identifier from the decentralized identifier blockchain; and
- a managing module 1906 that manages authorization of access to data that are associated with the first user and stored in the first consortium blockchain using the first digital activity decentralized identifier.

In an optional embodiment, the application program can be a digital wallet decentralized application.

In an optional embodiment, the apparatus 1900 can include a sending sub-module that sends a second request for a second digital activity decentralized identifier to the decentralized identifier blockchain, in which the second request includes the first decentralized identifier (DID) of the first user, and the second request also includes a second business decentralized identifier (BizDID) of a second consortium blockchain; a receiving sub-module that receives the second digital activity decentralized identifier from the decentralized identifier blockchain; and a managing sub-module that manages authorization of access to data that are associated with the first user and stored in the second consortium blockchain using the second digital activity decentralized identifier.

Figure 20:
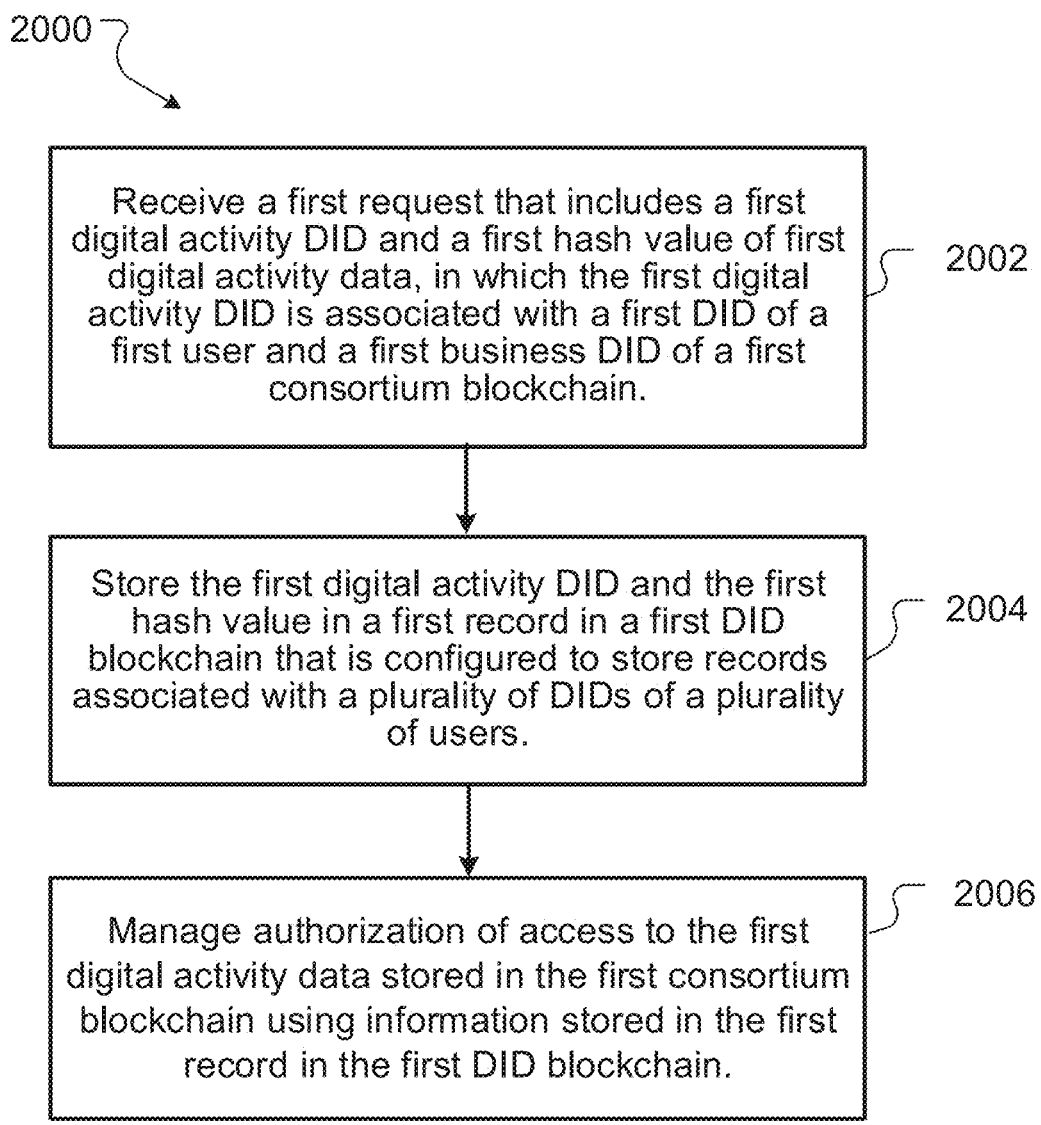
FIGS. 20 to 23 depict examples of processes for managing authorization of access to data that can be executed in accordance with embodiments of this specification.

FIG. 20 is a flowchart of an example of a process 2000 for controlling or managing authorization of access to data. For convenience, the process 1000 will be described as being performed by a system of one or more computers, located in one or more locations, and programmed appropriately in accordance with this specification. For example, a computing system, e.g., the computing system 106 or 108 of FIG. 1, appropriately programmed, can perform the process 2000. The process 2000 includes the following steps.

At 2002, a decentralized identifier blockchain node receives a first request that includes a first digital activity decentralized identifier and a first hash value of first digital activity data, in which the first digital activity decentralized identifier is associated with a first decentralized identifier (DID) of a first user and a first business decentralized identifier (BizDID) of a first consortium blockchain.

In some embodiments, the decentralized identifier blockchain node can be a blockchain node of the data decentralized identifier blockchain network 508 (FIG. 9), the first digital activity decentralized identifier can be the digital activity decentralized identifier 708 (FIG. 7), and the first consortium blockchain can be the consortium blockchain 602.

In some embodiments, the first request can be sent from the first consortium blockchain. The decentralized identifier blockchain node can determine whether the first digital activity decentralized identifier is valid by comparing the first digital activity decentralized identifier with pre-stored digital activity decentralized identifiers that are stored in the decentralized identifier (DID) blockchain.

At 2004, the decentralized identifier blockchain node stores the first digital activity decentralized identifier and the first hash value in a first record in a decentralized identifier (DID) blockchain that is configured to store records associated with a plurality of decentralized identifiers (DID) of a plurality of users.

In some embodiments, the first record can be similar to the record 1020 (FIG. 10C), the first digital activity decentralized identifier can be similar to the digital activity decentralized identifier 1006 or 1014, and the decentralized identifier blockchain can be the data decentralized identifier blockchain 509.

At 2006, the decentralized identifier blockchain node controls or manages authorization of access to the first digital activity data stored in the first consortium blockchain using information stored in the first record in the decentralized identifier (DID) blockchain.

In some embodiments, the decentralized identifier blockchain can send a first message to a first application associated with the first user, in which the first message can include the first hash value of the first digital activity data; receive a second message from the first application indicating either the first hash value is correct or the first hash value is incorrect; store the first hash value in the first record if the second message indicates that the first hash value is correct; and not store the first hash value in the first record if the second message indicates that the first hash value is not correct.

In some embodiments, the first application can include a digital wallet decentralized application.

In some embodiments, the decentralized identifier blockchain can receive a second request that includes the first digital activity decentralized identifier and a second hash value of second digital activity data; store the second hash value in the first record in the decentralized identifier (DID) blockchain; and manage authorization of access to the second digital activity data stored in the first consortium blockchain using information stored in the first record in the decentralized identifier (DID) blockchain.

In some embodiments, the second request can be sent from the first consortium blockchain.

In some embodiments, the decentralized identifier blockchain node can receive a second request that includes a second digital activity decentralized identifier and a second hash value of second digital activity data from a second consortium blockchain, in which the second digital activity decentralized identifier is associated with the first decentralized identifier (DID) of the first user and a second business decentralized identifier (BizDID) of the second consortium blockchain; store the second digital activity decentralized identifier and the second hash value in the first record in the decentralized identifier (DID) blockchain; and manage authorization of access to the second digital activity data stored in the second consortium blockchain using information stored in the first record in the decentralized identifier (DID) blockchain.

In some embodiments, the decentralized identifier blockchain node can receive a second request that includes a second digital activity decentralized identifier and a second hash value of second digital activity data from the first consortium blockchain, in which the second digital activity decentralized identifier is associated with a second decentralized identifier (DID) of a second user and the first business decentralized identifier (BizDID) of the first consortium blockchain; store the second digital activity decentralized identifier and the second hash value in a second record in the decentralized identifier (DID) blockchain; and manage authorization of access to the second digital activity data stored in the first consortium blockchain using information stored in the second record in the decentralized identifier (DID) blockchain.

Figure 21:
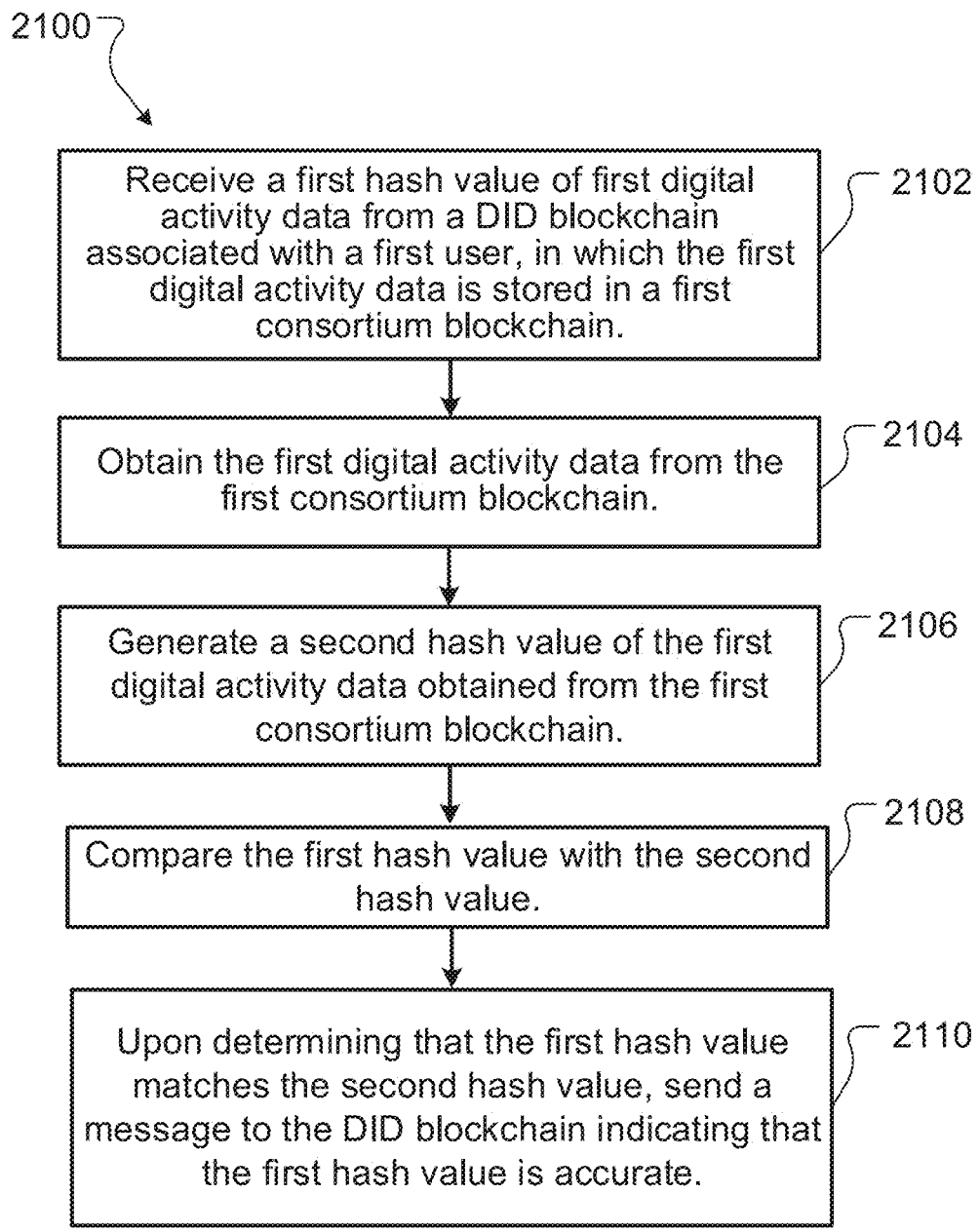

FIG. 21 is a flowchart of an example of a process 2100 for controlling or managing authorization of access to data. For convenience, the process 2100 will be described as being performed by a system of one or more computers, located in one or more locations, and programmed appropriately in accordance with this specification. For example, a user device, e.g., the client terminal 402, 404, or 406 of FIG. 4, appropriately programmed, can perform the process 2100. The process 2100 includes the following steps.

At 2102, an application associated with a first user receives a first hash value of first digital activity data from a decentralized identifier (DID) blockchain network, in which the first digital activity data is stored in a first consortium blockchain.

In some embodiments, the application can include a digital wallet decentralized application 502 (FIG. 9), the first digital activity data can be the digital activity data 902, the decentralized identifier blockchain network can be the data decentralized identifier blockchain network 508, and the first consortium blockchain can be the consortium blockchain 602.

At 2104, the application obtains the first digital activity data from the first consortium blockchain.

At 2106, the application generates a second hash value of the first digital activity data obtained from the first consortium blockchain.

At 2108, the application compares the first hash value with the second hash value.

At 2110, the application, upon determining that the first hash value matches the second hash value, sends a message to the decentralized identifier blockchain network indicating that the first hash value is accurate.

In some embodiments, the application can provide a user interface that shows the first digital activity data obtained from the first consortium blockchain to the first user; receive an indication from the first user indicating whether the first digital activity data are correct; and send the indication from the first user indicating whether the first digital activity data are correct to the decentralized identifier (DID) blockchain network.

Figure 22:
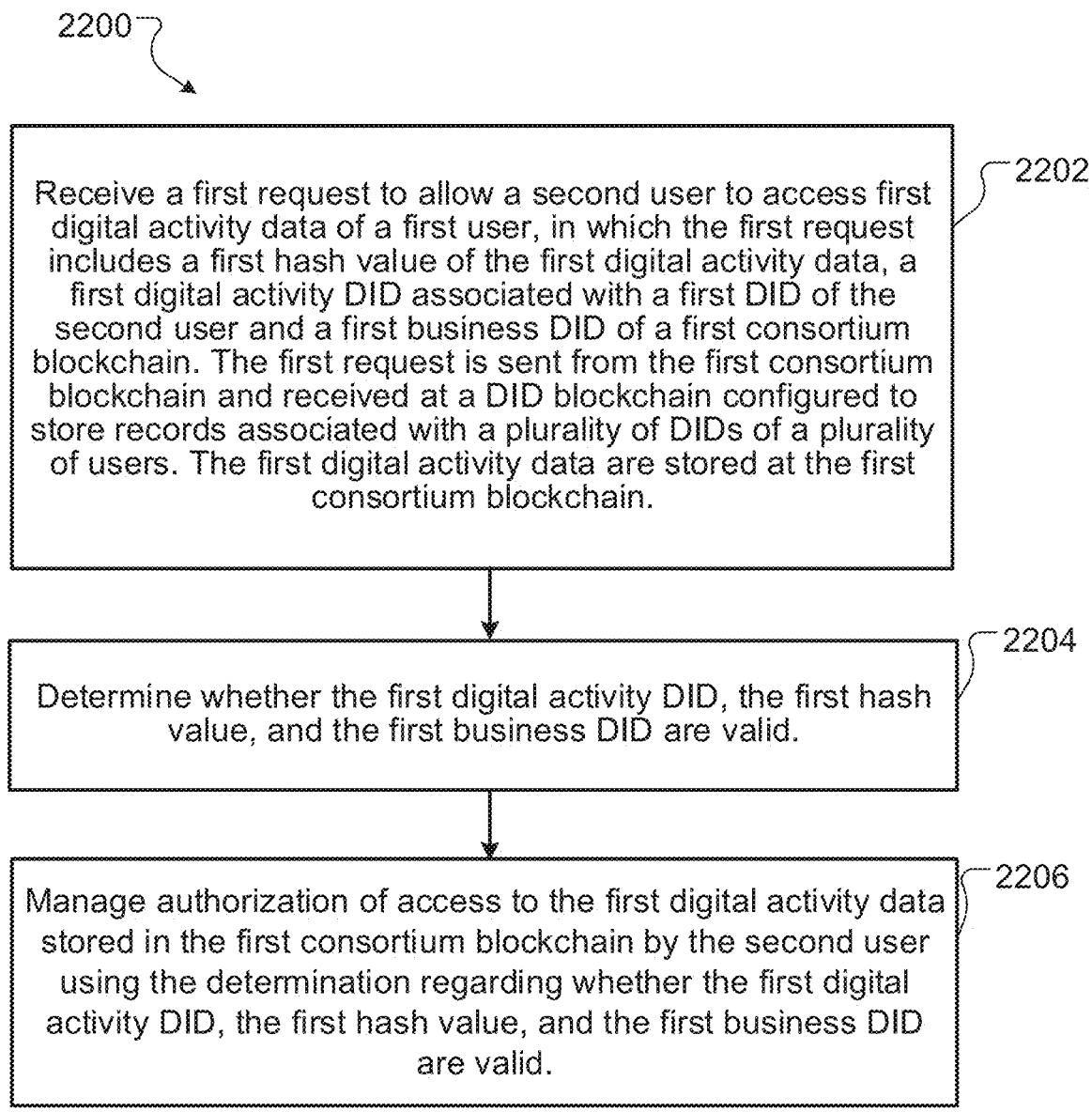

FIG. 22 is a flowchart of an example of a process 2200 for controlling or managing authorization of access to data. For convenience, the process 2200 will be described as being performed by a system of one or more computers, located in one or more locations, and programmed appropriately in accordance with this specification. For example, a computing system, e.g., the computing system 106 or 108 of FIG. 1, appropriately programmed, can perform the process 2200. The process 2200 includes the following steps.

At 2202, a decentralized identifier blockchain node receives a first request to allow a second user to access first digital activity data of a first user, in which the first request includes a first hash value of the first digital activity data, a first digital activity decentralized identifier associated with a first decentralized identifier of the second user and a first business decentralized identifier of a first consortium blockchain. The first request is sent from the first consortium blockchain and received at a decentralized identifier (DID) blockchain network that maintains a decentralized identifier blockchain that is configured to store records associated with a plurality of decentralized identifiers (DID) of a plurality of users. For example, the first request can be received at a node of a decentralized identifier blockchain network that maintains the decentralized identifier blockchain. For example, the first request can invoke a smart contract associated with the decentralized identifier blockchain. The first digital activity data are stored at the first consortium blockchain.

In some embodiments, the decentralized identifier blockchain node can be a node of the data decentralized identifier blockchain network 508 (FIG. 9), the first digital activity decentralized identifier can be the digital activity decentralized identifier 708 (FIG. 7), and the first consortium blockchain can be the consortium blockchain 602.

At 2204, the decentralized identifier blockchain node determines whether the first digital activity decentralized identifier, the first hash value, and the first business decentralized identifier are valid.

At 2206, the decentralized identifier blockchain node controls or manages authorization of access to the first digital activity data stored in the first consortium blockchain by the second user using the determination regarding whether the first digital activity decentralized identifier, the first hash value, and the first business decentralized identifier are valid.

In some embodiments, the decentralized identifier blockchain node, prior to receiving the first request, can store a second hash value of the first digital activity data provided by the first consortium blockchain. Determining whether the first hash value is valid can include comparing the first hash value with the stored second hash value, and determining that the first hash value is valid if the first hash value is the same as the stored second hash value.

In some embodiments, the decentralized identifier blockchain node can send a first message to an application associated with the first user to inform the first user about the request from the second user. The application associated with the first user can include a digital wallet decentralized application.

In some embodiments, the decentralized identifier blockchain node can receive a second message from the application indicating whether the first user authorizes the second user to access the first digital activity data. The managing of the authorization of access to the first digital activity data can be based at least in part on whether the second message indicates that the first user authorizes the second user to access the first digital activity data.

In some embodiments, the decentralized identifier blockchain node, upon determining that the first digital activity decentralized identifier, the first hash value, and the first business decentralized identifier are valid, and receiving the second message indicating that the first user authorizes the second user to access the first digital activity data, can send a third message to the first consortium blockchain to indicate that the first user has authorized the second user to access the first digital activity data.

In some embodiments, the second message can include a condition on the access of the first digital activity data by the second user. The condition can include a time limit condition specifying that the second user can only access the first digital activity data within a specified time limit.

Figure 23:
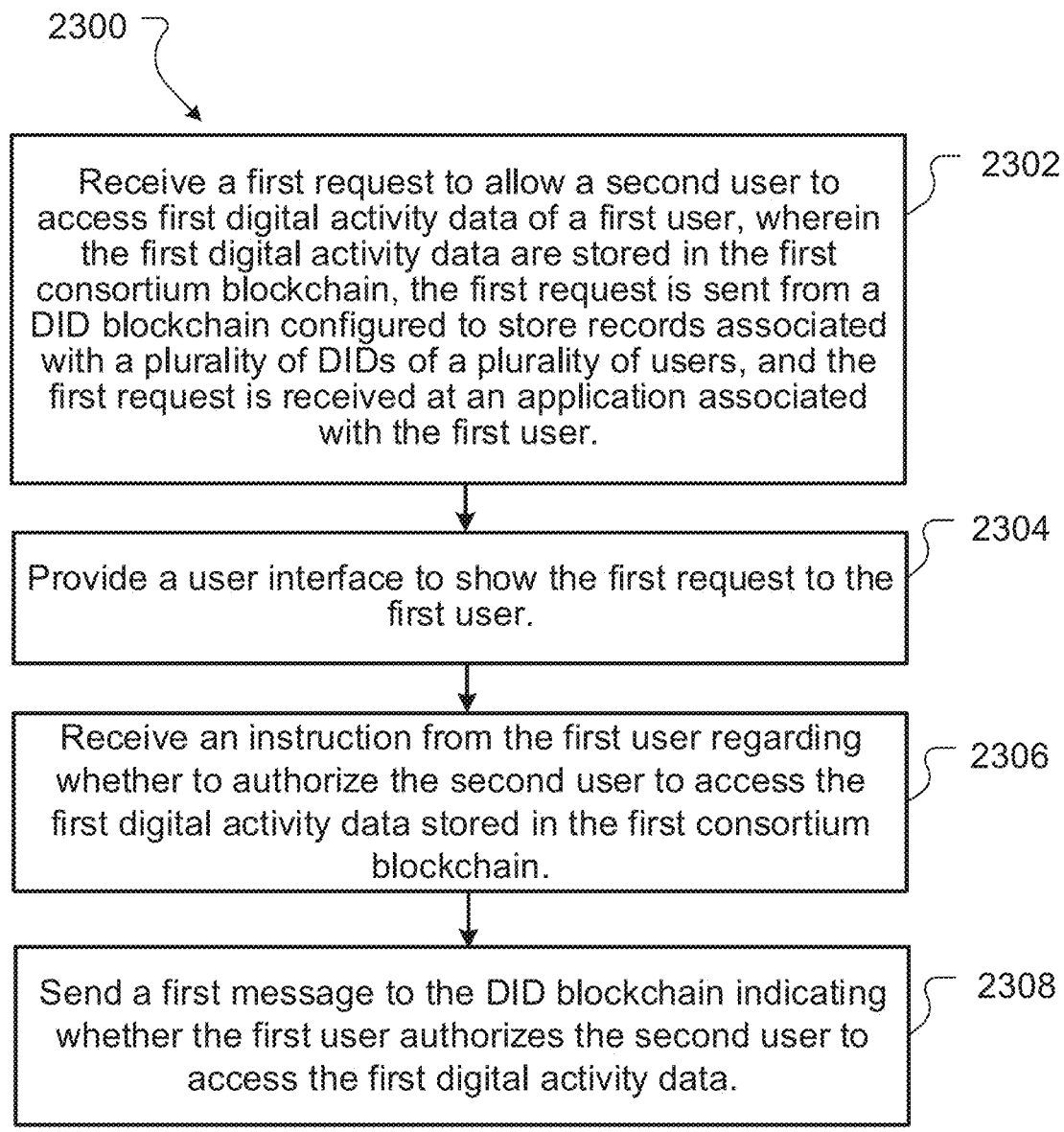

FIG. 23 is a flowchart of an example of a process 2300 for controlling or managing authorization of access to data. For convenience, the process 2300 will be described as being performed by a system of one or more computers, located in one or more locations, and programmed appropriately in accordance with this specification. For example, a user device, e.g., the client terminal 402, 404, or 406 of FIG. 4, appropriately programmed, can perform the process 2300. The process 2300 includes the following steps.

At 2302, an application receives a first request to allow a second user to access first digital activity data of a first user, in which the first digital activity data are stored in the first consortium blockchain, the first request is sent from a decentralized identifier (DID) blockchain network that maintains a decentralized identifier blockchain that is configured to store records associated with a plurality of decentralized identifiers (DID) of a plurality of users, and the first request is received at an application associated with the first user. For example, the first request can be sent from a node of a decentralized identifier blockchain network that maintains the decentralized identifier. For example, the first request can be sent as a result of executing a smart contract associated with the decentralized identifier blockchain.

In some embodiments, the application can include a digital wallet decentralized application 502 (FIG. 11), the first consortium blockchain can be the consortium blockchain 602, and the decentralized identifier blockchain network can be the data decentralized identifier blockchain network 508.

At 2304, the application provides a user interface to show the first request to the first user.

At 2306, the application receives an instruction from the first user regarding whether to authorize the second user to access the first digital activity data stored in the first consortium blockchain.

At 2308, the application sends a first message to the decentralized identifier blockchain indicating whether the first user authorizes the second user to access the first digital activity data.

In some embodiments, the first message can include a condition on the access of the first digital activity data by the second user. The condition can include a time limit condition specifying that the second user can only access the first digital activity data within a specified time limit.

Figure 24:
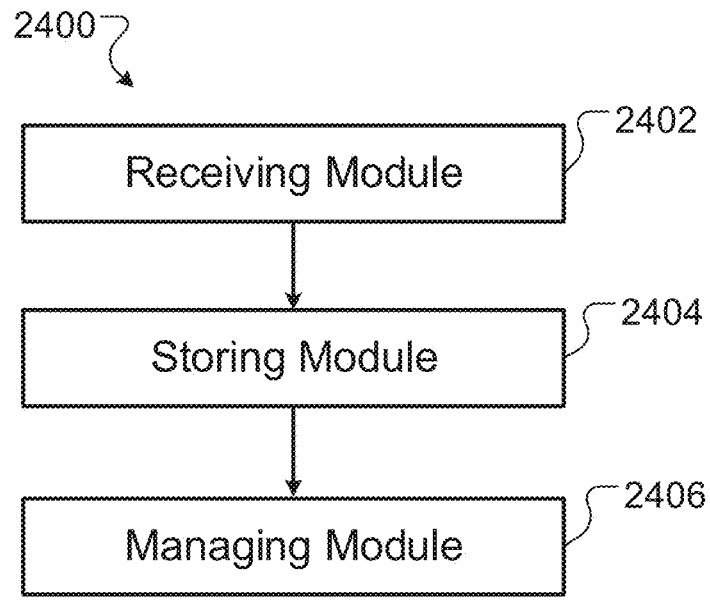
FIGS. 24 to 27 depict examples of modules of apparatuses in accordance with embodiments of this specification.

FIG. 24 is a diagram of an example of modules of an apparatus 2400 in accordance with embodiments of this specification. The apparatus 2400 can be an example of an embodiment of a data decentralized identifier blockchain node that is configured to control or manage authorization of access to user data stored in consortium blockchains. The apparatus 2400 can correspond to the embodiments described above, and the apparatus 2400 includes the following:

a receiving module 2402 that receives a first request that includes a first digital activity decentralized identifier and a first hash value of first digital activity data, in which the first digital activity decentralized identifier is associated with a first decentralized identifier (DID) of a first user and a first business decentralized identifier (BizDID) of a first consortium blockchain;

a storing module 2404 that stores the first digital activity decentralized identifier and the first hash value in a first record in a decentralized identifier (DID) blockchain that is configured to store records associated with a plurality of decentralized identifiers (DID) of a plurality of users; and a managing module 2406 that manages authorization of access to the first digital activity data stored in the first consortium blockchain using information stored in the first record in the decentralized identifier (DID) blockchain.

In an optional embodiment, the first request can be sent from the first consortium blockchain.

In an optional embodiment, the apparatus 2400 can further include a sending sub-module that sends a first message to a first application associated with the first user, in which the first message includes the first hash value of the first digital activity data; a receiving sub-module that receives a second message from the first application indicating either the first hash value is correct or the first hash value is incorrect; a storing sub-module that stores the first hash value in the first record if the second message indicates that the first hash value is correct, and not store the first hash value in the first record if the second message indicates that the first hash value is not correct.

In an optional embodiment, the first application can include a digital wallet decentralized application.

In an optional embodiment, the apparatus 2400 can further include a determining sub-module that determines whether the first digital activity decentralized identifier is valid by comparing the first digital activity decentralized identifier with pre-stored digital activity decentralized identifiers that are stored in the decentralized identifier (DID) blockchain.

In an optional embodiment, the apparatus 2400 can further include a receiving sub-module that receives a second request that includes the first digital activity decentralized identifier and a second hash value of second digital activity data; a storing sub-module that stores the second hash value in the first record in the decentralized identifier (DID) blockchain; and a managing sub-module that manages authorization of access to the second digital activity data stored in the first consortium blockchain using information stored in the first record in the decentralized identifier (DID) blockchain.

In an optional embodiment, the second request can be sent from the first consortium blockchain.

In an optional embodiment, the apparatus 2400 can further include a receiving sub-module that receives a second request that includes a second digital activity decentralized identifier and a second hash value of second digital activity data from a second consortium blockchain, in which the second digital activity decentralized identifier is associated with the first decentralized identifier (DID) of the first user and a second business decentralized identifier (BizDID) of the second consortium blockchain; a storing sub-module that stores the second digital activity decentralized identifier and the second hash value in the first record in the decentralized identifier (DID) blockchain; and a managing sub-module that manages authorization of access to the second digital activity data stored in the second consortium blockchain using information stored in the first record in the decentralized identifier (DID) blockchain.

In an optional embodiment, the apparatus 2400 can further include a receiving sub-module that receives a second request that includes a second digital activity decentralized identifier and a second hash value of second digital activity data from the first consortium blockchain, in which the second digital activity decentralized identifier is associated with a second decentralized identifier (DID) of a second user and the first business decentralized identifier (BizDID) of the first consortium blockchain; a storing sub-module that stores the second digital activity decentralized identifier and the second hash value in a second record in the decentralized identifier (DID) blockchain; and a managing sub-module that manages authorization of access to the second digital activity data stored in the first consortium blockchain using information stored in the second record in the decentralized identifier (DID) blockchain.

Figure 25:
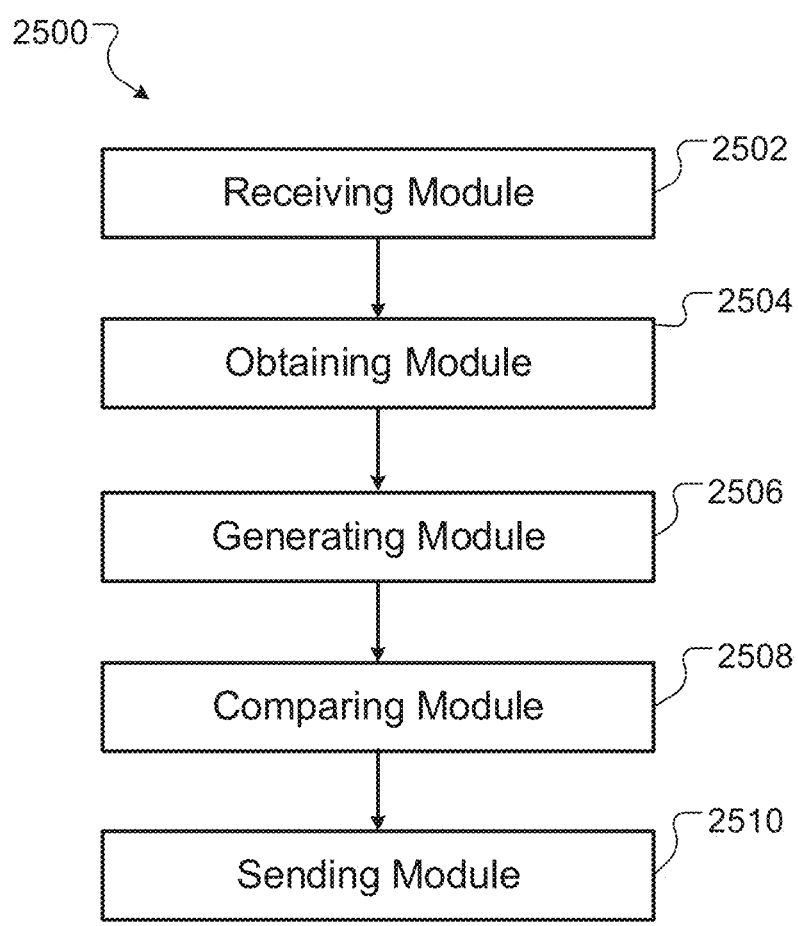

FIG. 25 is a diagram of an example of modules of an apparatus 2500 in accordance with embodiments of this specification. The apparatus 2500 can be an example of an embodiment of user device executing an application program that is configured to control or manage authorization of access to user data stored in consortium blockchains. The apparatus 2500 can correspond to the embodiments described above, and the apparatus 2500 includes the following:

a receiving module 2502 that receives a first hash value of first digital activity data from a decentralized identifier (DID) blockchain at an application associated with a first user, in which the first digital activity data is stored in a first consortium blockchain;

an obtaining module 2504 that obtains the first digital activity data from the first consortium blockchain;

a generating module 2506 that generates a second hash value of the first digital activity data obtained from the first consortium blockchain;

a comparing module 2508 that compares the first hash value with the second hash value; and a sending module 2510 that, upon determining that the first hash value matches the second hash value, sends a message to the decentralized identifier blockchain indicating that the first hash value is accurate.

In an optional embodiment, the apparatus 2500 can further include a providing sub-module that provides a user interface that shows the first digital activity data obtained from the first consortium blockchain to the first user; a receiving sub-module that receives an indication from the first user indicating whether the first digital activity data are correct; and a sending sub-module that sends the indication from the first user indicating whether the first digital activity data are correct to the decentralized identifier (DID) blockchain.

In an optional embodiment, the application can include a digital wallet decentralized application.

Figure 26:
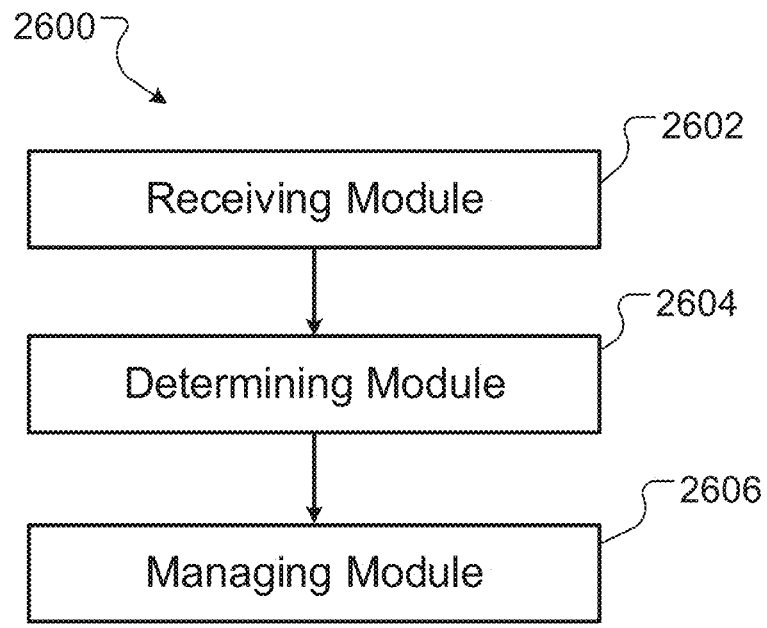

FIG. 26 is a diagram of an example of modules of an apparatus 2600 in accordance with embodiments of this specification. The apparatus 2600 can be an example of an embodiment of a data decentralized identifier blockchain node that is configured to control or manage authorization of access to user data stored in consortium blockchains. The apparatus 2600 can correspond to the embodiments described above, and the apparatus 2600 includes the following:

a receiving module 2602 that receives a first request to allow a second user to access first digital activity data of a first user, in which the first request includes a first hash value of the first digital activity data, a first digital activity decentralized identifier associated with a first decentralized identifier of the second user and a first business decentralized identifier of a first consortium blockchain, the first request is sent from the first consortium blockchain and received at a decentralized identifier (DID) blockchain that is configured to store records associated with a plurality of decentralized identifiers (DID) of a plurality of users, and the first digital activity data are stored at the first consortium blockchain;

a determining module 2604 that determines whether the first digital activity decentralized identifier, the first hash value, and the first business decentralized identifier are valid; and a managing module 2606 that manages authorization of access to the first digital activity data stored in the first consortium blockchain by the second user using the determination regarding whether the first digital activity decentralized identifier, the first hash value, and the first business decentralized identifier are valid.

In an optional embodiment, the apparatus 2600 can further include a storing sub-module that, prior to receiving the first request, stores a second hash value of the first digital activity data provided by the first consortium blockchain, in which determining whether the first hash value is valid includes comparing the first hash value with the stored second hash value, and determining that the first hash value is valid if the first hash value is the same as the stored second hash value.

In an optional embodiment, the apparatus 2600 can further include a sending sub-module that sends a first message to an application associated with the first user to inform the first user about the request from the second user.

In an optional embodiment, the application associated with the first user can include a digital wallet decentralized application.

In an optional embodiment, the apparatus 2600 can further include a receiving sub-module that receives a second message from the application indicating whether the first user authorizes the second user to access the first digital activity data, in which the managing of the authorization of access to the first digital activity data is based at least in part on whether the second message indicates that the first user authorizes the second user to access the first digital activity data.

In an optional embodiment, the apparatus 2600 can further include a sending sub-module that, upon determining that the first digital activity decentralized identifier, the first hash value, and the first business decentralized identifier are valid, and receiving the second message indicating that the first user authorizes the second user to access the first digital activity data, sends a third message to the first consortium blockchain to indicate that the first user has authorized the second user to access the first digital activity data.

In an optional embodiment, the second message can include a condition on the access of the first digital activity data by the second user. The condition can include a time limit condition specifying that the second user can only access the first digital activity data within a specified time limit.

Figure 27:
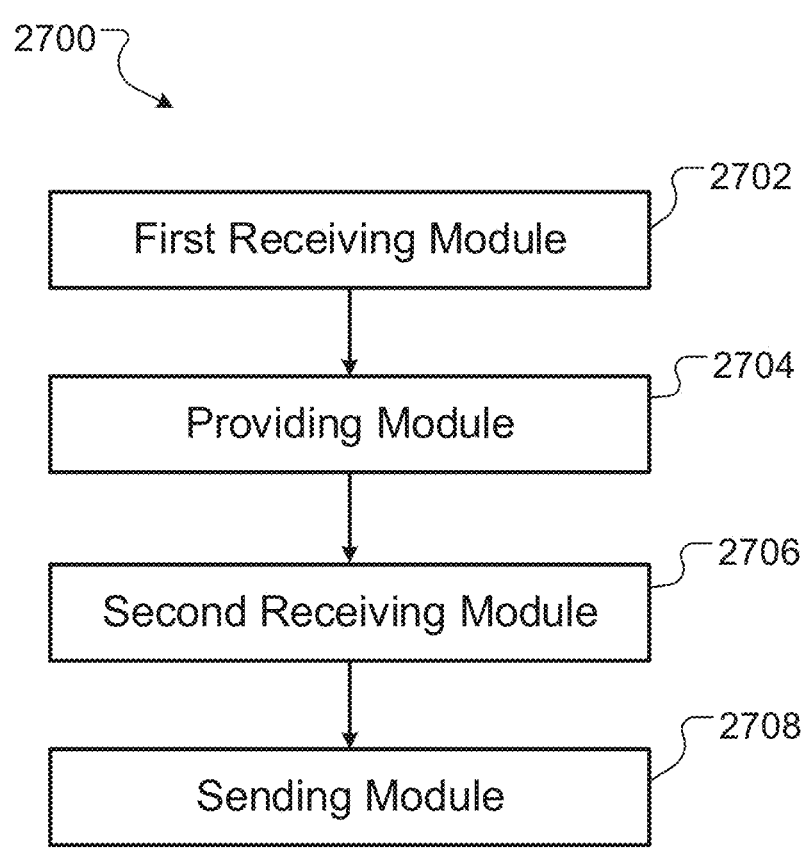

FIG. 27 is a diagram of an example of modules of an apparatus 2700 in accordance with embodiments of this specification. The apparatus 2700 can be an example of an embodiment of user device executing an application program that is configured to control or manage authorization of access to user data stored in consortium blockchains. The apparatus 2700 can correspond to the embodiments described above, and the apparatus 2700 includes the following:

a first receiving module 2702 that receives a first request to allow a second user to access first digital activity data of a first user, in which the first digital activity data are stored in the first consortium blockchain, the first request is sent from a decentralized identifier (DID) blockchain that is configured to store records associated with a plurality of decentralized identifiers (DID) of a plurality of users, and the first request is received at an application associated with the first user;

a providing module 2704 that provides a user interface to show the first request to the first user;

a second receiving module 2706 that receives an instruction from the first user regarding whether to authorize the second user to access the first digital activity data stored in the first consortium blockchain; and a sending module 2708 that sends a first message to the decentralized identifier blockchain indicating whether the first user authorizes the second user to access the first digital activity data.

In an optional embodiment, the first message can include a condition on the access of the first digital activity data by the second user. The condition can include a time limit condition specifying that the second user can only access the first digital activity data within a specified time limit.

The following provides additional information about decentralized identifiers and describes examples of how decentralized identifiers can be generated and managed.

Figure 28:
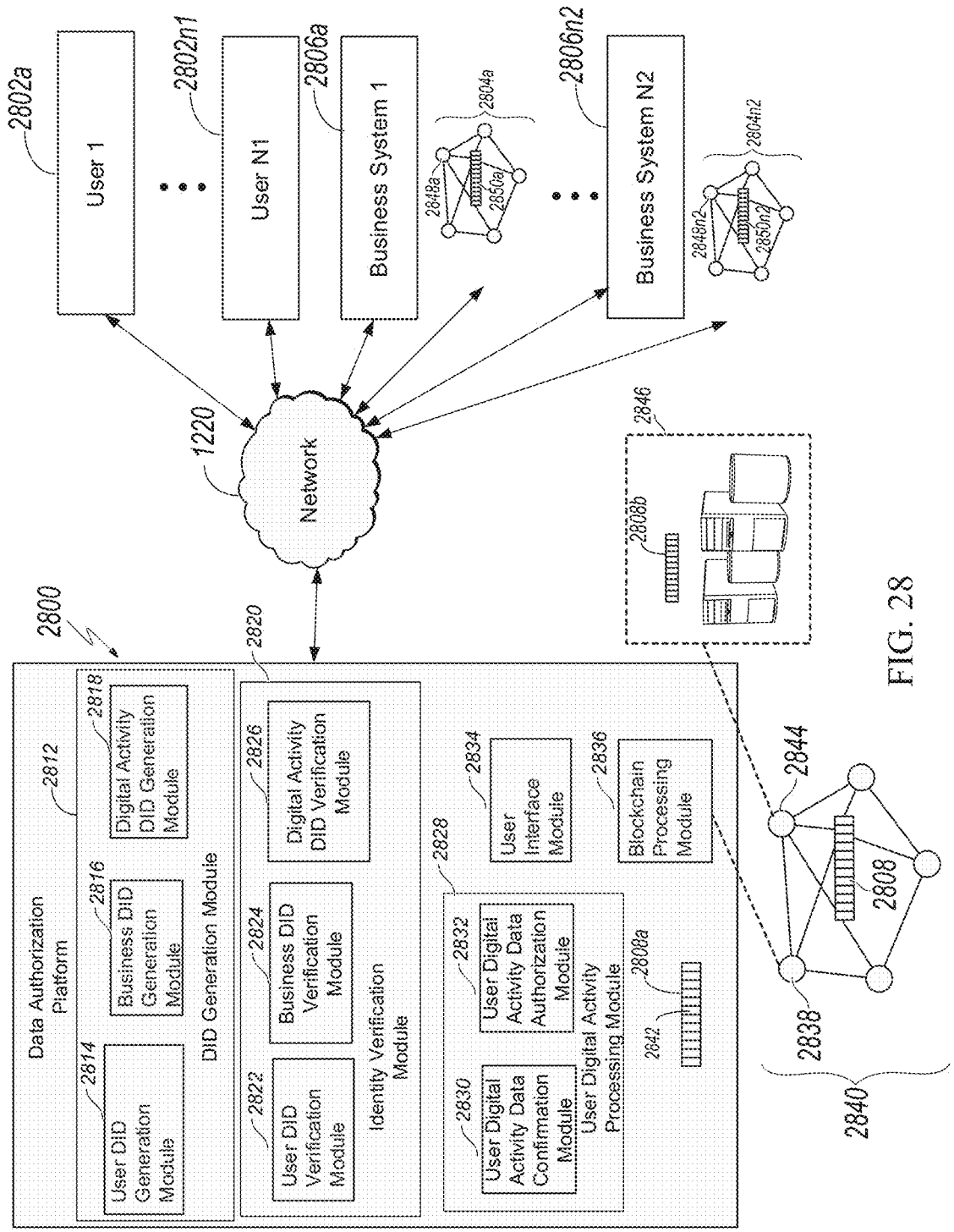
FIG. 28 is a diagram showing a data authorization platform.

FIG. 28 is a diagram showing a data authorization platform 2800 that enables users (2802*a*, . . . 2802*n*1, collectively referenced as 2802) to authorize access or sharing of user data with other users, in which the user data are stored in consortium blockchains (2804*a*, . . . 2804*n*2, collectively referenced as 2804) associated with business systems (2806*a*, . . . 2806*n*2, collectively referenced as 2806) of business entities that provide services to the users. The data authorization platform 2800 is associated with a data decentralized identifier blockchain 2808 that stores information about decentralized identifiers of the users, decentralized identifiers of the consortium blockchains, and decentralized identifiers that are associated with respective particular users and particular consortium blockchains. Multiple copies of the data decentralized identifier blockchain 2808 are maintained by a blockchain network 2840, in which the data authorization platform 2800 is a participant of the blockchain network 2840. The users 2802 and the business systems 2806 can communicate with the data authorization platform 2800 through a network 2810 that can be, e.g., the Internet.

The data authorization platform 2800 can include one or more computer systems, such as local and/or cloud computer systems that execute software to implement the processes described in this specification. The various modules of the data authorization platform 2800 can be implemented in hardware or software or both. In some implementations, the data authorization platform 2800 can include a decentralized identifier generation module 2812 that includes a user decentralized identifier generation module 2814, a business decentralized identifier generation module 2816, and a consortium blockchain digital activity decentralized identifier generation module 2818. For example, the user decentralized identifier generation module 2814 can be configured to generate digital identity decentralized identifiers 512 according to the process 500 shown in FIG. 5. The business decentralized identifier generation module 2816 can be configured to generate business decentralized identifiers 610 according to the process 600 shown in FIG. 6. The consortium blockchain digital activity decentralized identifier generation module 2818 can be configured to generate consortium blockchain digital activity decentralized identifiers 708 according to the process 700 shown in FIG. 7.

In some implementations, the data authorization platform 2800 can include an identity verification module 2820 that includes a user decentralized identifier verification module 2822, a business decentralized identifier verification module 2824, and a consortium blockchain digital activity decentralized identifier verification module 2826. In the process 700, the digital wallet Dapp 502 sends a request to the data decentralized identifier blockchain 508 for a new consortium blockchain digital activity decentralized identifier 708, in which the request includes the digital identity decentralized identifier of the user and the business decentralized identifier of the consortium blockchain. The user decentralized identifier verification module 2822 can verify the validity of the digital identity decentralized identifier of the user, and the business decentralized identifier verification module 2824 can verify the validity of the business decentralized identifier of the consortium blockchain. In the process 900 of FIG. 9, the consortium blockchain 602 sends a request to the data decentralized identifier blockchain 508, in which the request includes a hash value of digital activity data and a digital activity decentralized identifier associated with the digital activity data. The digital activity decentralized identifier verification module 2826 can verify the validity of the digital activity decentralized identifier.

In the process 1100 of FIG. 11, the consortium blockchain 602 sends a request to the data decentralized identifier blockchain 508, in which the request is from a second user who wishes to access digital activity data of a first user. The request includes the consortium blockchain digital activity decentralized identifier 1106 of the second user 304, the business decentralized identifier (BizDID) of the consortium blockchain 602, and the hash value 1111 of the digital activity data being requested by the second user 304. The digital activity decentralized identifier verification module 2826 can verify the validity of the consortium blockchain digital activity decentralized identifier 1106 of the second user 304, and the business decentralized identifier verification module 2824 can verify the validity of the business decentralized identifier (BizDID) of the consortium blockchain 602.

The data authorization platform 2800 can include a user digital activity processing module 2828 that includes a user digital activity data confirmation module 2830 and a user digital activity data authorization module 2832. The user digital activity data confirmation module 2830 can facilitate the confirmation of user digital activity data according to the process 900 in FIG. 9. The user digital activity data authorization module 2832 can facilitate the authorization of third party access to user digital activity data according to the process 1100 in FIG. 11.

The data authorization platform 2800 includes a user interface module 2834 that is configured to provide user interfaces that allow users to access the functions of the data authorization platform 2800. The data authorization platform 2800 includes a blockchain processing module 2836 that is configured to perform the functions of a blockchain node 2838 of the blockchain network 2840 and maintains a copy 2808a of the data decentralized identifier blockchain 2808. For example, the data decentralized identifier blockchain 2808a stores records 2842 similar to the record 1020 of FIG. 10C.

In some implementations, the blockchain network 2840 is a consortium blockchain network 2840 in which blocks are added to the blockchain 2808 through a consensus protocol. Multiple consensus nodes within the blockchain network participate in the consensus protocol and perform work to have a block added to the blockchain. The data authorization platform 2800 is one of the consensus nodes. A computer system 2846 can perform the functions of a consensus node 2844 and maintain a local copy 2808b of the data decentralized identifier blockchain 2808, In some implementations, each of the business systems 2806 is a participant of a consortium blockchain network. For example, the business system 2806a is a participant 2848a of a consortium blockchain network 2804a that maintains copies of a consortium blockchain 2850a. The business system 2806a provides services to the users 2802 and stores records that include information about digital activity data associated to the users 2802 in the consortium blockchain 2850. The records can be similar to, e.g., the record 1000 in FIG. 10A or record 1010 in FIG. 10B. For example, the business system 2806n2 is a participant 2848n2 of a consortium blockchain network 2804n2 that maintains copies of a consortium blockchain 2850n2. The business system 2806n2 provides services to the users 2802 and stores records that include information about digital activity data associated to the users 2802 in the consortium blockchain 2850n2. The records can be similar to, e.g., the record 1000 in FIG. 10A or the record 1010 in FIG. 10B.

Figure 29:
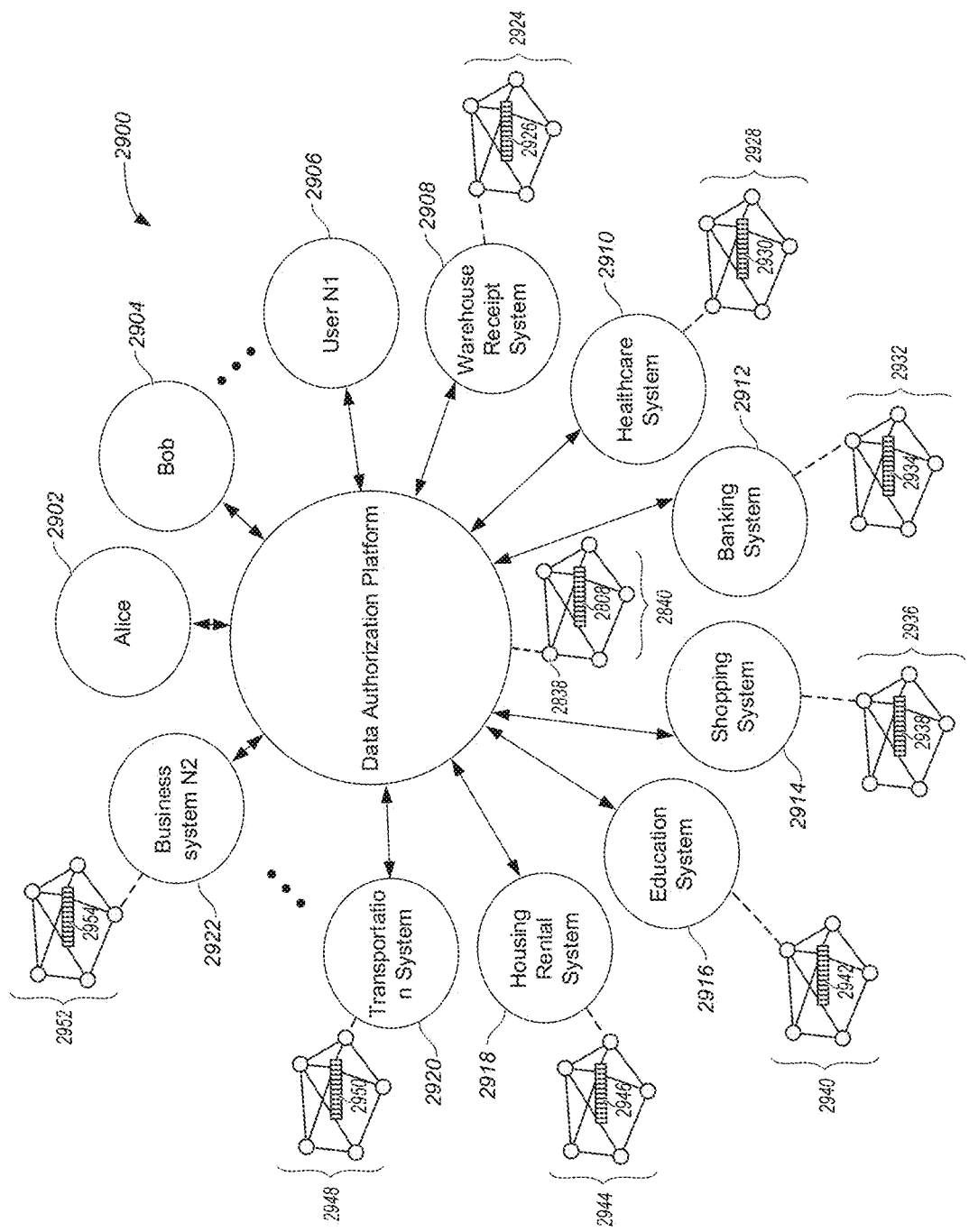
FIG. 29 is a diagram of an online services platform.

FIG. 29 is a diagram of an online services platform 2900 that illustrates the wide applications of the data authorization platform 2800. The data authorization platform 2800 is a participant of a data decentralized identifier blockchain network 2840 that maintains a data decentralized identifier blockchain 2808 that stores records useful for controlling or managing authorization of user data. Users, including e.g., Alice 2902, Bob 2904, and user N1 2906 use the services provided by business entities through business systems including but not limited to, e.g., a warehouse receipt system 2908, a healthcare system 2910, a banking system 2912, a shopping system 2914, an education system 2916, a housing rental system 2918, a transportation system 2920, and a business system N2 2922. Each of the business systems 2908 to 2922 can include online and offline components, and can interact with the users 2902 to 2906 through web portals or agents of the business entities. Each of the business systems 2908 to 2922 is a participant of a consortium blockchain network that stores digital activity data associated with the services provided to the users.

Each user has a unique decentralized identifier, and each consortium blockchain has a unique decentralized identifier. For each pair of user and consortium blockchain, there is a unique decentralized identifier associated with the digital activity data related to the user and the consortium blockchain.

For example, the warehouse receipt system 2908 is a participant of a warehouse receipt consortium blockchain network 2924 that stores digital activity data in a warehouse receipt consortium blockchain 2926, in which the digital activity data are associated with the warehouse receipt services provided to the users. The warehouse receipt consortium blockchain 2926 can store records similar to, e.g., the record 1000 shown in FIG. 10A. The data decentralized identifier blockchain 2840 stores information useful for controlling or managing the authorization of access to user data stored in the warehouse receipt consortium blockchain 2926. A consortium blockchain digital activity decentralized identifier, e.g., DigitalActivityDID_Alice_WareHouseReceipt is associated with the digital activity data related to Alice 2902 and stored in the warehouse receipt consortium blockchain 2926. A consortium blockchain digital activity decentralized identifier, e.g., DigitalActivityDID_Bob_WareHouseReceipt is associated with the digital activity data related to Bob 2904 and stored in the warehouse receipt consortium blockchain 2926.

When Alice 2902 uses the services of the warehouse receipt system 2908, digital activity data associated with Alice 2902 are generated and stored in the warehouse receipt consortium blockchain 2926. The user digital activity data confirmation module 2830 of the data authorization platform 2800 interacts with an application program associated with Alice 2902, such as a digital wallet Dapp controlled by Alice 2902, to confirm the digital activity data and store information about the digital activity data (such as the hash value of the digital activity data) in the data decentralized identifier blockchain 2808 using the process 900 of FIG. 9.

When Bob 2904 wishes to obtain access to the records related to Alice 2902 and stored in the warehouse receipt consortium blockchain 2926, Bob 2904 uses an application program, such as a digital wallet Dapp controlled by Bob 2904, to interact with the user digital activity data authorization module 2832 of the data authorization platform 2800, which in turn interacts with the digital wallet Dapp controlled by Alice 2902 to obtain authorization from Alice 2902 according to the process 1100 of FIG. 11. The consortium blockchain digital activity decentralized identifier, DigitalActivityDID_Alice_WareHouseReceipt, is used by the data authorization platform 2800 to perform various verifications in the process 1100.

When user N1 2906 wishes to obtain access to the records related to Bob 2904 and stored in the warehouse receipt consortium blockchain 2926, user N1 2906 uses an application program, such as a digital wallet Dapp controlled by user N1 2906, to interact with the user digital activity data authorization module 2832, which in turn interacts with the digital wallet Dapp controlled by Bob 2904 to obtain authorization from Bob 2904 according to the process 1100. The consortium blockchain digital activity decentralized identifier, DigitalActivityDID_Bob_WareHouseReceipt, is used by the data authorization platform 2800 to perform various verifications in the process 1100.

For example, the healthcare system 2910 provides healthcare services to the users and is a participant of a healthcare consortium blockchain network 2928 that stores digital activity data in a healthcare consortium blockchain 2930, in which the digital activity data are associated with the healthcare services provided to the users. A consortium blockchain digital activity decentralized identifier, e.g., DigitalActivityDID_Alice_Healthcare is associated with the digital activity data related to Alice 2902 and stored in the healthcare consortium blockchain 2930. A consortium blockchain digital activity decentralized identifier, e.g., DigitalActivityDID_Bob_Healthcare is associated with the digital activity data related to Bob 2904 and stored in the healthcare consortium blockchain 2930. The consortium blockchain digital activity decentralized identifier, DigitalActivityDID_Alice_Healthcare, is used by the data authorization platform 2800 to control or manage authorization of access to the digital activity data related to Alice 2902 and stored in the healthcare consortium blockchain 2930. The consortium blockchain digital activity decentralized identifier, DigitalActivityDID_Bob_Healthcare, is used by the data authorization platform 2800 to control or manage authorization of access to the digital activity data related to Bob 2904 and stored in the healthcare consortium blockchain 2930. Similarly, a consortium blockchain digital activity decentralized identifier, DigitalActivityDID_User_N1_Healthcare, is used by the data authorization platform 2800 to control or manage authorization of access to the digital activity data related to the user N1 2906 and stored in the healthcare consortium blockchain 2930.

The banking system 2912 provides financial services to the users and is a participant of a banking consortium blockchain network 2932 that stores digital activity data in a banking consortium blockchain 2934, in which the digital activity data are associated with the financial services provided to the users. A consortium blockchain digital activity decentralized identifier, e.g., DigitalActivityDID_Alice_Banking is associated with the digital activity data related to Alice 2902 and stored in the banking consortium blockchain 2934. A consortium blockchain digital activity decentralized identifier, e.g., DigitalActivityDID_Bob_Banking is associated with the digital activity data related to Bob 2904 and stored in the banking consortium blockchain 2934. The consortium blockchain digital activity decentralized identifier, DigitalActivityDID_Alice_Banking, is used by the data authorization platform 2800 to control or manage authorization of access to the digital activity data related to Alice 2902 and stored in the banking consortium blockchain 2934. The consortium blockchain digital activity decentralized identifier, DigitalActivityDID_Bob_Banking, is used by the data authorization platform 2800 to control or manage authorization of access to the digital activity data related to Bob 2904 and stored in the banking consortium blockchain 2934. Similarly, a consortium blockchain digital activity decentralized identifier, DigitalActivityDID_User_N1_Banking, is used by the data authorization platform 2800 to control or manage authorization of access to the digital activity data related to the user N1 2906 and stored in the banking consortium blockchain 2934.

The shopping system 2914 provides shopping services to the users and is a participant of a shopping consortium blockchain network 2936 that stores digital activity data in a shopping consortium blockchain 2938, in which the digital activity data are associated with the shopping services provided to the users. A consortium blockchain digital activity decentralized identifier, e.g., DigitalActivityDID_Alice_Shopping is associated with the digital activity data related to Alice 2902 and stored in the shopping consortium blockchain 2938. A consortium blockchain digital activity decentralized identifier, e.g., DigitalActivityDID_Bob_Shopping is associated with the digital activity data related to Bob 2904 and stored in the shopping consortium blockchain 2938. The consortium blockchain digital activity decentralized identifier, DigitalActivityDID_Alice_Shopping, is used by the data authorization platform 2800 to control or manage authorization of access to the digital activity data related to Alice 2902 and stored in the shopping consortium blockchain 2938. The consortium blockchain digital activity decentralized identifier, DigitalActivityDID_Bob_Shopping, is used by the data authorization platform 2800 to control or manage authorization of access to the digital activity data related to Bob 2904 and stored in the shopping consortium blockchain 2938. Similarly, a consortium blockchain digital activity decentralized identifier, DigitalActivityDID_User_N1_Shopping, is used by the data authorization platform 2800 to control or manage authorization of access to the digital activity data related to the user N1 2906 and stored in the shopping consortium blockchain 2938.

The education system 2916 provides education services to the users and is a participant of a consortium blockchain network 2940 that stores digital activity data in a consortium blockchain 2942, in which the digital activity data are associated with the education services provided to the users. A consortium blockchain digital activity decentralized identifier, e.g., DigitalActivityDID_Alice_Education is associated with the digital activity data related to Alice 2902 and stored in the education consortium blockchain 2942. A consortium blockchain digital activity decentralized identifier, e.g., DigitalActivityDID_Bob_Education is associated with the digital activity data related to Bob 2904 and stored in the education consortium blockchain 2942. The consortium blockchain digital activity decentralized identifier, DigitalActivityDID_Alice_Education, is used by the data authorization platform 2800 to control or manage authorization of access to the digital activity data related to Alice 2902 and stored in the education consortium blockchain 2942. The consortium blockchain digital activity decentralized identifier, DigitalActivityDID_Bob_Education, is used by the data authorization platform 2800 to control or manage authorization of access to the digital activity data related to Bob 2904 and stored in the education consortium blockchain 2942. Similarly, a consortium blockchain digital activity decentralized identifier, DigitalActivityDID_User_N1_Education, is used by the data authorization platform 2800 to control or manage authorization of access to the digital activity data related to the user N1 2906 and stored in the education consortium blockchain 2942.

The housing rental system 2918 provides housing rental services to the users and is a participant of a consortium blockchain network 2944 that stores digital activity data in a consortium blockchain 2946, in which the digital activity data are associated with the housing rental services provided to the users. A consortium blockchain digital activity decentralized identifier, e.g., DigitalActivityDID_Alice_HousingRental is associated with the digital activity data related to Alice 2902 and stored in the housing rental consortium blockchain 2946. A consortium blockchain digital activity decentralized identifier, e.g., DigitalActivityDID_Bob_HousingRental is associated with the digital activity data related to Bob 2904 and stored in the housing rental consortium blockchain 2946. The consortium blockchain digital activity decentralized identifier, DigitalActivityDID_Alice_HousingRental, is used by the data authorization platform 2800 to control or manage authorization of access to the digital activity data related to Alice 2902 and stored in the housing rental consortium blockchain 2946. The consortium blockchain digital activity decentralized identifier, DigitalActivityDID_Bob_HousingRental, is used by the data authorization platform 2800 to control or manage authorization of access to the digital activity data related to Bob 2904 and stored in the housing rental consortium blockchain 2946. Similarly, a consortium blockchain digital activity decentralized identifier, DigitalActivityDID_User_N1_HousingRental, is used by the data authorization platform 2800 to control or manage authorization of access to the digital activity data related to the user N1 2906 and stored in the housing rental consortium blockchain 2946.

The transportation system 2920 provides transportation services to the users and is a participant of a consortium blockchain network 2948 that stores digital activity data in a consortium blockchain 2950, in which the digital activity data are associated with the transportation services provided to the users. A consortium blockchain digital activity decentralized identifier, e.g., DigitalActivityDID_Alice_Transportation is associated with the digital activity data related to Alice 2902 and stored in the transportation consortium blockchain 2950. A consortium blockchain digital activity decentralized identifier, e.g., DigitalActivityDID_Bob_transportation is associated with the digital activity data related to Bob 2904 and stored in the transportation consortium blockchain 2950. The consortium blockchain digital activity decentralized identifier, DigitalActivityDID_Alice_Transportation, is used by the data authorization platform 2800 to control or manage authorization of access to the digital activity data related to Alice 2902 and stored in the transportation consortium blockchain 2950. The consortium blockchain digital activity decentralized identifier, DigitalActivityDID_Bob_Transportation, is used by the data authorization platform 2800 to control or manage authorization of access to the digital activity data related to Bob 2904 and stored in the transportation consortium blockchain 2950. Similarly, a consortium blockchain digital activity decentralized identifier, DigitalActivityDID_User_N1_Transportation, is used by the data authorization platform 2800 to control or manage authorization of access to the digital activity data related to the user N1 2906 and stored in the transportation consortium blockchain 2950.

In a similar manner, the business system N2 2922 provides services to the users and is a participant of a consortium blockchain network 2952 that stores digital activity data in a consortium blockchain 2954, in which the digital activity data are associated with the services provided to the users. A consortium blockchain digital activity decentralized identifier, e.g., DigitalActivityDID_Alice_Business_N2 is associated with the digital activity data related to Alice 2902 and stored in the consortium blockchain 2954. A consortium blockchain digital activity decentralized identifier, e.g., DigitalActivityDID_Bob_Business_N2 is associated with the digital activity data related to Bob 2904 and stored in the consortium blockchain 2954. The consortium blockchain digital activity decentralized identifier, DigitalActivityDID_Alice_Business_N2, is used by the data authorization platform 2800 to control or manage authorization of access to the digital activity data related to Alice 2902 and stored in the consortium blockchain 2954. The consortium blockchain digital activity decentralized identifier, DigitalActivityDID_Bob_Business_N2, is used by the data authorization platform 2800 to control or manage authorization of access to the digital activity data related to Bob 2904 and stored in the consortium blockchain 2954. Similarly, a consortium blockchain digital activity decentralized identifier, DigitalActivityDID_User_N1_Business_N2, is used by the data authorization platform 2800 to control or manage authorization of access to the digital activity data related to the user N1 2906 and stored in the consortium blockchain 2954.

The decentralized identifier generation module 2812 verifies the identities of the users and the business entities managing the consortium blockchains before issuing the decentralized identifiers to the users and the consortium blockchains. This prevents an imposter from high jacking the identity of another user and obtaining access to the data of the other use without authorization. The following describes examples of techniques for managing decentralized identifiers that enable a decentralized identifier management system to provide unique and verifiable decentralized identifiers to entities (e.g., users and businesses).

Verifiable claims (VCs) may allow for authorizations, endorsements, and acknowledgements among different entities. For example, the business systems 2806 (FIG. 28) the data authorization platform 2800 may use its customers' decentralized identifiers and verifiable claims to identify and authenticate the customers prior to providing services and/or products to the customers. The data authorization platform 2800 may use the decentralized identifiers and verifiable claims of the users 2802 to identify and authenticate the users when performing the processes 500, 600, 700, 900, and 1100 in FIGS. 5, 6, 7, 9, and 11, respectively.

In some embodiments, a verifiable claim may provide verifiable online information about an entity's qualities, characteristics, relationships, and other relevant information. A verifiable claim may include descriptive text in a preset format (e.g., JSON-LD) that describes one or more declarations regarding a decentralized identifier (e.g., age of the owner of the decentralized identifier, educational background of the owner of the decentralized identifier) and an endorsement of an entity for the declaration. A verifiable claim may include various properties such as, e.g., contexts, identifiers, types, credential subject, issuer, issuance date, proofs, expiration, status, and/or presentations. The verifiable claim may specify a type of its claim, which may indicate a structure of the claim. This may facilitate automatic processing by the verifiable claim issuer and verifiable claim verifiers.

For example, an individual may desire to use the services provided by a business entity, which requires proof that the individual is over 18 years of age. The individual may be an owner of a decentralized identifier and may request a verifiable claim issued by a government agency that provides verification of citizens' ages. The business entity may verify the verifiable claim to ascertain that the individual meets the age requirement. In this scenario, the individual may be a decentralized identifier owner and a verifiable claim holder; the government agency may be a verifiable claim issuer, and the business entity may be a verifiable claim verifier.

As described below, in some embodiments, blockchain networks, cloud applications, agent services, resolver services, user applications, application programing interface (API) services, key management systems (KMS), identity authentication systems in cooperate to enable the generation and authentication of decentralized identifiers, and issuance and verification of verifiable claims. The data authorization platform 2800 may provide one or more API interfaces for interacting with the application programs of the users 2802 and the business systems 2806. The data authorization platform 2800 may offer agent services that perform various operations related to decentralized identifiers and verifiable claims on behalf of the users 2802 and the business systems 2806. For example, the data authentication platform may provide SDKs that can be integrated into applications of the users 2802 or the business systems 2806 for directly performing operations related to decentralized identifiers and verifiable claims. The data authorization platform 2800 may also manage mappings of identities of real-world individuals to the corresponding decentralized identifiers.

Examples of systems and methods for generating decentralized identifiers are described in PCT application PCT/CN2019/103780, filed on Aug. 30, 2019, and Chinese patent application CN201910963431.0, filed on Oct. 11, 2019. Examples of systems and methods for mapping decentralized identifiers to real-world entities are described in application PCT/CN2019/095299, filed on Jul. 9, 2019. The above three patent applications are incorporated by reference in their entirety.

Figure 30:
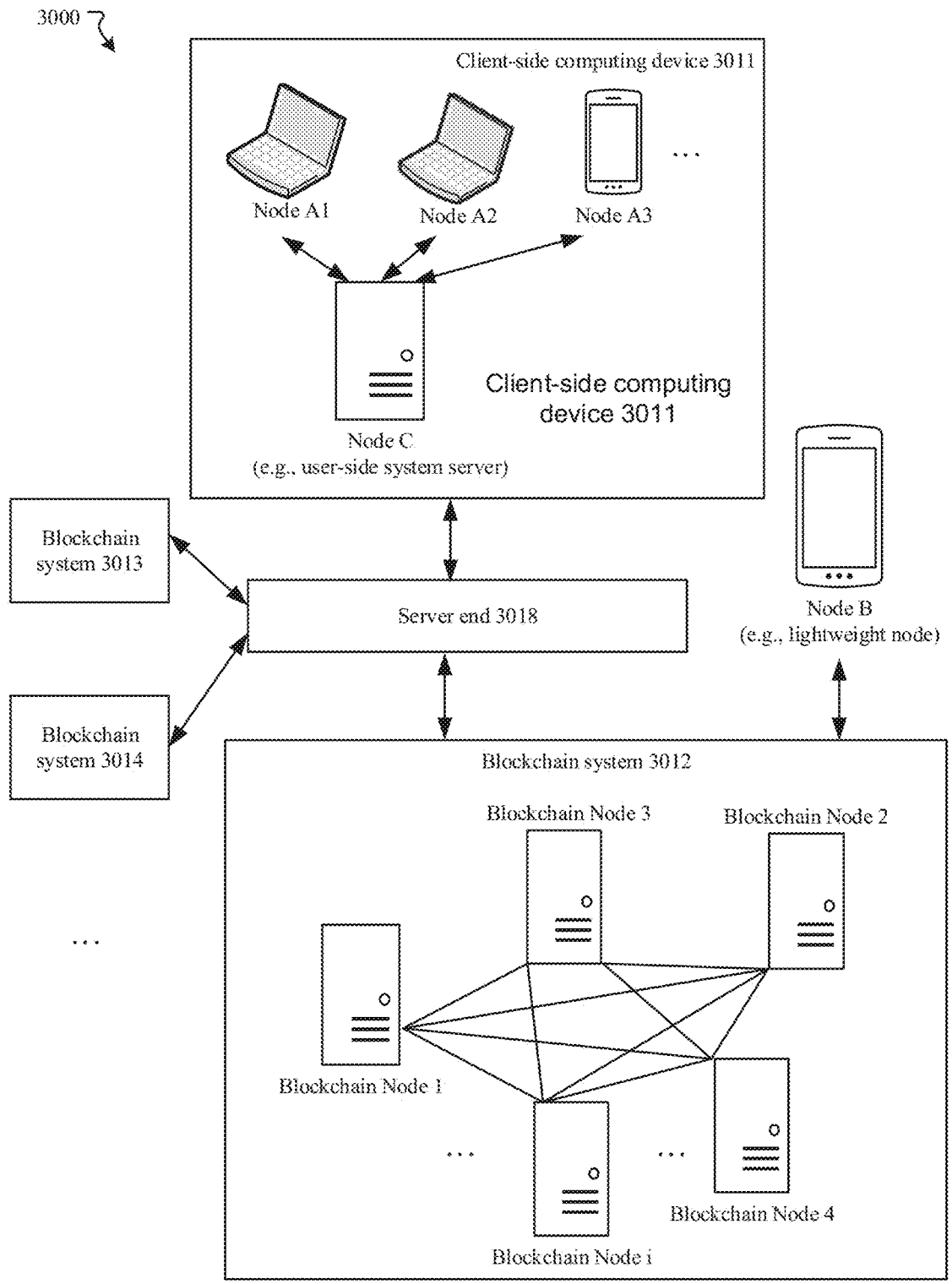
FIG. 30 illustrates an example of a network environment associated with a data decentralized identifier blockchain.

The following describes examples of how the various decentralized identifiers (e.g., the digital identity decentralized identifier 512 associated with a user, the business decentralized identifier 610 associated with a consortium blockchain, and the digital activity decentralized identifier 708 associated with a user and a consortium blockchain) can be generated. FIG. 30 illustrates an example of a network environment 3000 associated with a data decentralized identifier blockchain (e.g., 508). A client-side computing device 3011 may couple to a server end 3018, and the server end 3018 and a Node B may couple to a blockchain system 3012 through various communication networks. Similarly, the server end 3018 may optionally couple to more blockchain systems similar to the blockchain system 3012 such as, e.g., blockchain system 3013 and blockchain system 3014. Each blockchain system may maintain one or more blockchains.

In some embodiments, the client-side computing device 3011 may include one or more servers (e.g., Node C) and one or more other computing devices (e.g., Node A1, Node A2, Node A3). Node A1, Node A2, and Node A3 may couple to Node C. Node C may be implemented by an entity (e.g., website, mobile phone Application, organization, company, enterprise) that has various local accounts (e.g., local accounts accessed from Node A1, Node A2, Node A3). For example, a mobile phone Application (e.g., digital wallet Dapp 502) may have millions of end-users accessing the Application's server from respective user accounts. The Application's server may correspondingly store millions of user accounts. The components of the client-side computing device 3011 and their arrangement may have many other configurations.

In some embodiments, the blockchain system 3012 may include a plurality of blockchain nodes (e.g., Blockchain Node 1, Blockchain Node 2, Blockchain Node 3, Blockchain Node 4, Blockchain Node i) that maintain one or more blockchains (e.g., public blockchain, private blockchain, consortium blockchain). Other blockchain systems (e.g., blockchain system 3013) may include a similar arrangement of blockchain nodes maintaining another blockchain. Each blockchain node may be found in one or more blockchain systems. The blockchain nodes may include full nodes. Full nodes may download every block and blockchain transaction and check them against the blockchain's consensus rules. The blockchain nodes may form a network with one blockchain node communicating with another blockchain node. The order and the number of the blockchain nodes as shown are merely examples for illustration. The blockchain nodes may be implemented in computer servers. For example, each blockchain node may be implemented in a server or a cluster of servers. Each blockchain node may correspond to one or more physical hardware devices or virtual devices coupled together via various types of communication methods such as TCP/IP.

In some embodiments, Node B may include a lightweight node. A lightweight node may not download the complete blockchain, but may instead just download the block headers to validate the authenticity of the blockchain transactions. Lightweight nodes may be served by and effectively dependent on full nodes (e.g., blockchain nodes in the blockchain system 3012) to access more functions of the blockchain. The lightweight nodes may be implemented in electronic devices such as, e.g., laptops and mobile phones by installing an appropriate software. For example, Node B may send a blockchain transaction to the blockchain system 3012 for adding to the blockchain.

In some embodiments, there may be many more client-side computing devices coupled to the server end 3018 similar to client-side computing device 3011. The server end 3018 may provide Blockchain-as-a-Service (BaaS) and be referred to as a BaaS cloud. In one embodiment, BaaS is a cloud service model in which clients or developers outsource behind-the-scenes aspects of a web or mobile application. BaaS may provide pre-written software for activities that take place on blockchains, such as user authentication, database management, and remote updating. The BaaS cloud may be implemented in a server, server cluster, or other devices. In one embodiment, the BaaS cloud provides an enterprise-level platform service based on blockchain technologies. This service may help clients to build a secure and stable blockchain environment as well as manage the deployment, operation, maintenance, and development of blockchain easily. Based on the abundant security strategies and multi-tenant isolation of cloud, the BaaS cloud can provide advanced security protection using chip encryption technologies. Based on highly reliable data storage, this service may provide end-to-end and highly available services that can scale up quickly without interruption. The BaaS cloud can provide native support for standard blockchain applications and data. For example, the data authorization platform 2800 can provide BaaS to the business systems 2806 to help manage the consortium blockchains 2804.

In the environment 3000, each of the systems, nodes, and devices may be installed with appropriate software (e.g., application program interface) and/or hardware (e.g., with wired or wireless connections to the network) to access other devices in the environment 3000. In general, the systems, nodes, and devices may be able to communicate with one another through one or more wired or wireless networks (e.g., the Internet) through which data can be communicated. Each of the systems, nodes, and devices may include one or more processors and one or more memory devices coupled to the one or more processors. The memory devices may be, e.g., non-transitory and computer-readable and configured with instructions executable by one or more processors to cause the one or more processors to perform operations described in this specification. The instructions may be stored in the memory devices or downloaded over a communications network without necessarily being stored in the memory devices. Although the systems, nodes, and devices are shown as separate components in this figure, the systems, nodes, and devices can also be implemented as single devices or multiple devices coupled together. For example, Node B may be integrated into Blockchain Node 2.

The devices such as Node A1, Node A2, Node A3, Node B, and Node C may be installed with an appropriate blockchain software for initiating, forwarding, or accessing blockchain transactions. The term "blockchain transaction" may refer to a unit of task executed in a blockchain system and recorded in the blockchain upon verification. In some embodiments, the server end 3018 may construct a blockchain contract based on information obtained from Node A1, A2, or A3. The server end 3018 may add the blockchain contract in a blockchain transaction. After the server end 3018 submits the blockchain transaction to the blockchain system, the blockchain nodes may verify the blockchain transaction for adding to the blockchain. If the blockchain transaction is added to the blockchain, the blockchain contract is deployed on the blockchain and initiated at a certain state. Through one or more additional blockchain transactions, the deployed blockchain contract may be invoked to update the certain state.

Blockchain transactions may be verified according to a consensus rule. For example, a POW (proof-of-work) consensus process is provided below. Notwithstanding, other types of consensus processes such as POS (proof-of-stake), DPOS (delegate-proof-of-stake), and PBFT (practical Byzantine Fault Tolerance) may be similarly applied to the disclosed systems and methods.

In some embodiments with respect to blockchain transaction verification, after receiving a blockchain transaction request of an unconfirmed blockchain transaction, a recipient blockchain node may perform some preliminary verification of the blockchain transaction. For example, Blockchain Node 1 may perform the preliminary verification after receiving a blockchain transaction from Node C. Once verified, the blockchain transaction may be stored in the database of the recipient blockchain node (e.g., Blockchain Node 1), which may also forward the blockchain transaction to one or more other blockchain nodes (e.g., Blockchain Node 3, Blockchain Node 4). Similarly, each blockchain node may include or couple to a memory device storing a database. The database may store a plurality of unconfirmed blockchain transactions. After receiving the blockchain transaction, the one or more other blockchain nodes may repeat the preliminary verification and broadcasting process done by the recipient blockchain node.

For verification, each blockchain node may select some of the blockchain transactions from the database according to its preference and format them into a proposed new block for the blockchain. The blockchain node may perform "mining" of the proposed new block by devoting computing power to solve complex mathematical problems. If the blockchain transaction involves a blockchain contract, the blockchain nodes may execute the blockchain contract locally in respective virtual machines (VMs). To handle the blockchain contracts, each blockchain node of the blockchain network executes a corresponding virtual machine and executes the same instructions in the blockchain contract. A virtual machine is a software emulation of a computer system based on computer architectures and provides functionality of a physical computer. Virtual machine in the blockchain context can be understood as a system designed to operate as a runtime environment for blockchain contracts.

A certain blockchain node that successfully mines the proposed new block of blockchain transactions in accordance with consensus rules may pack the new block into its local copy of the blockchain and multicast the results to other blockchain nodes. The certain blockchain node may be a blockchain node that has first successfully completed the verification, that has obtained a verification privilege, and that has been chosen based on another consensus rule. Then, the other blockchain nodes may follow the same order of execution performed by the certain blockchain node to locally execute the blockchain transactions in the new block, verify the execution results with one another (e.g., by performing hash calculations), and synchronize their copies of the blockchain with that of the certain blockchain node. By updating their local copies of the blockchain, the other blockchain nodes may similarly write such information in the blockchain transaction into respective local memory devices. As such, the blockchain contract can be deployed on the blockchain. If the verification fails at some point, the blockchain transaction is rejected.

The deployed blockchain contract may have an address, according to which the deployed contract can be accessed. A blockchain node may invoke the deployed blockchain contract by inputting certain parameters to the blockchain contract. In one embodiment, a deployed blockchain contract may be invoked to add or update certain information in the blockchain contract, thereby updating one or more states in the blockchain contract. In one embodiment, the one or more states of the blockchain contract may be retrieved from the blockchain by inquiring a corresponding blockchain transaction added to the blockchain. The most recently updated state may be reflected in the most recent relevant blockchain transaction. Notwithstanding the above, other types of blockchain systems and associated consensus rules may be applied to the devices and methods described in this specification.

Figure 31:
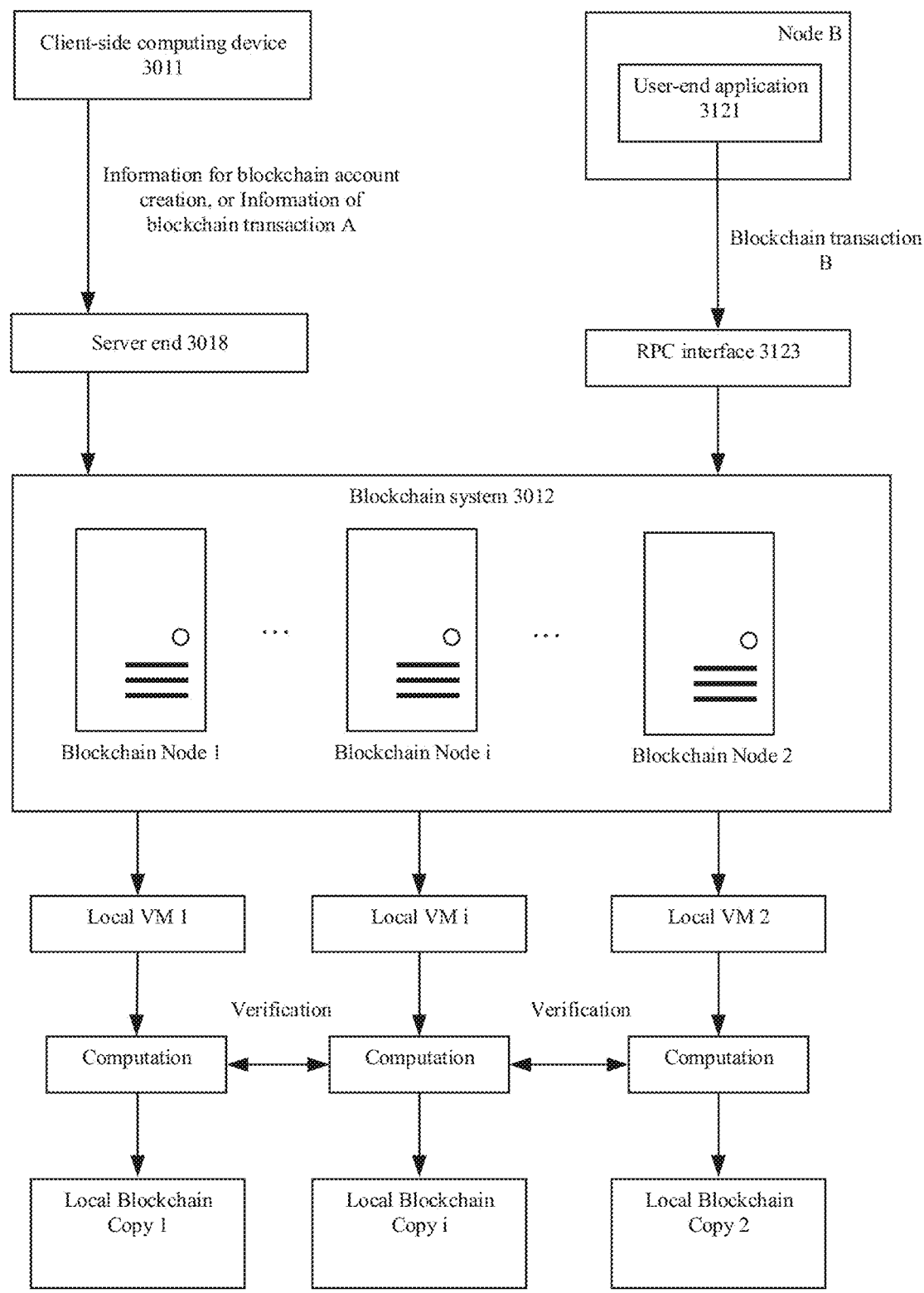
FIG. 31 illustrates a framework for implementing blockchain transactions.

FIG. 31 illustrates a framework for implementing blockchain transactions in accordance with some embodiments. The client-side computing device 3011 may transmit information (e.g., a request with relevant information for generating a blockchain account) to the server end 3018 for the server end 3018 to generate a blockchain account. The server end 3018 may generate cryptography keys and compile the request with other account generation requests. The server end 3018 may transmit a blockchain transaction (e.g., blockchain transaction A) including the compiled account generation requests to one or more of blockchain nodes for execution.

In some embodiments, Node B may construct a signed blockchain transaction and transmit it to one or more blockchain nodes for execution. Node B may construct a blockchain transaction B, which may include a blockchain contract B for deployment, or invoking a deployed blockchain contract. For example, the blockchain transaction B may include a blockchain contract that generates a blockchain account or invokes a deployed blockchain contract A. The blockchain contract B may be programmed in source code at a user-end application 3121. For example, a user or machine may program the blockchain contract B, which may compile the source code using a corresponding compiler that converts the source code into bytecode. The blockchain transaction B may include information such as nonce (e.g., transaction serial number), from (e.g., a blockchain address of Node B or another blockchain address), to (e.g., empty if deploying a blockchain contract), transaction fee, value (e.g., transaction amount), signature (e.g., signature of Node B), and/or data (e.g., message to a contract account). The Node B may send the blockchain transaction B to one or more blockchain nodes through a remote procedure call (RPC) interface 3123 for execution. RPC is a protocol that a first program (e.g., user-end application) can use to request a service from a second program located in another computer on a network (e.g., blockchain node) without having to understand the network's details. When the first program causes a procedure to execute in a different address space, it is as if a normal (local) procedure call, without the programmer explicitly coding the details for the remote interaction.

In some embodiments, upon receiving the blockchain transaction (e.g., blockchain transaction A or B), the recipient blockchain may verify if the blockchain transaction is valid. For example, the signature and other formats may be verified. If the verification succeeds, the recipient blockchain node may broadcast the received blockchain transaction (e.g., blockchain transaction A or B) to the blockchain network including various other blockchain nodes. Some blockchain nodes may participate in the mining process of the blockchain transactions. The blockchain transaction may be picked by a certain node for consensus verification to pack into a new block. If the blockchain transaction involves a blockchain contract, the certain node may generate a contract account for a blockchain contract in association with a contract account address. If the blockchain transaction involves invoking a deployed blockchain contract, the certain node may trigger its local VM to execute the received blockchain transaction, thereby invoking the deployed blockchain contract from its local copy of the blockchain and updating the account states in the blockchain. If the certain node succeeds in mining a new block, the certain node may broadcast the new block to other blockchain nodes. The other blockchain nodes may verify the new block as mined by the certain blockchain node. If consensus is reached, the blockchain transaction B is respectively packed to the local copies of the blockchain maintained by the blockchain nodes. The blockchain nodes may similarly trigger their local VMs to execute the blockchain transaction B, thus invoking the blockchain contract A deployed on the local copies of the blockchain and making corresponding updates.

Upon receiving the new block, the other blockchain nodes may perform verifications. If a consensus is reached that the new block is valid, the new block is respectively packed to the local copies of the blockchain maintained by the blockchain nodes. The blockchain nodes may similarly trigger their local VMs (e.g., local VM 1, local VM i, local VM 2) to execute the blockchain transactions in the new block, thus invoking local copies of the blockchain (e.g., local blockchain copy 1, local blockchain copy i, local blockchain copy 2) and making corresponding updates. The hardware machine of each blockchain node may have access to one or more virtual machines, which may be a part of or couple to the corresponding blockchain node. A corresponding local VM may be triggered to execute the blockchain transaction, and other blockchain transactions in the new block may be executed. Lightweight nodes may also synchronize to the updated blockchain.

Figure 32:
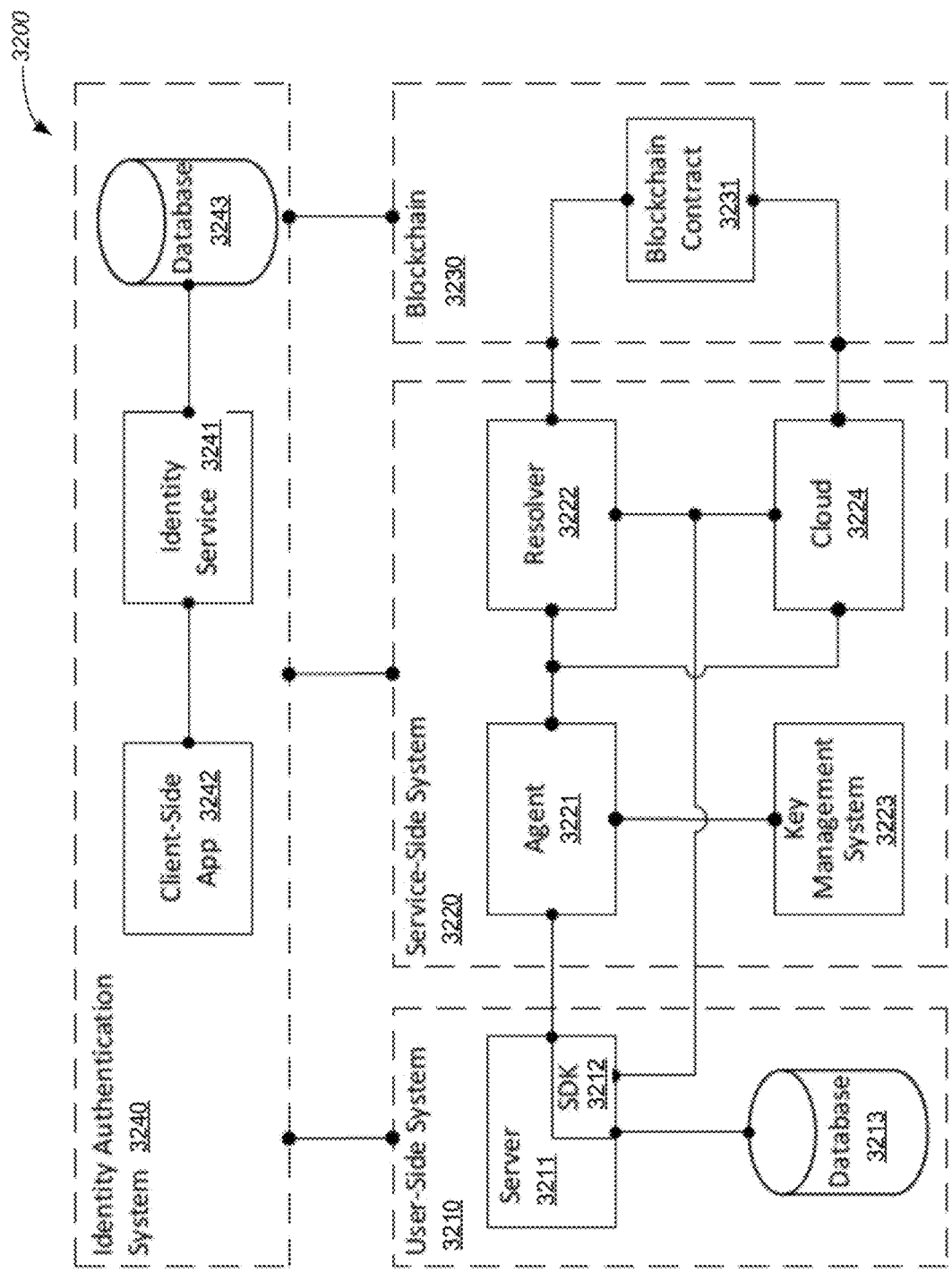
FIG. 32 illustrates an environment associated with a system or platform for managing decentralized identifiers and verifiable claims.

FIG. 32 illustrates an environment 3200 associated with a system or platform, e.g., the data authorization platform 2800, for managing decentralized identifiers and verifiable claims in accordance with some embodiments. In this example, the environment 3200 includes a user-side system 3210, a service-side system 3220, a blockchain 3230, and an identity authentication system 3240. The user-side system 3210, the service-side system 3220, and the identity authentication system 3240 can be part of the data authorization platform 2800. The blockchain 3230 can be part of the blockchain 2808. The user-side system 3210 may include a plurality of computer systems, data stores, cloud services, mobile applications, other components, or any combination of the above. For example, the user-side system 3210 may include a server 3211 and a database 3213. The database 3213 may store data associated with a plurality of user accounts of the users of the data authorization platform 2800. The data authorization platform 2800 may generate and manage decentralized identifiers and verifiable claims for its users, and may include one or more software development kits (SDKs) 3212 for managing generation and authentication of decentralized identifiers, or issuance and verification of verifiable claims.

In some embodiments, to implement functionalities associated with decentralized identifiers and verifiable claims, the user-side system 3210 may interface with a service-side system 3220, which may be equivalent to, be part of, or include one or more components of the server end 3018 in FIGS. 30 and 31. The service-side system 3220 may include one or more agents 3221, one or more resolvers 3222, one or more key management systems 3223, one or more clouds 3224, other components, or any combination of the above. The agent 3221 may provide various services or applications related to decentralized identifiers or verifiable claims and maintain databases mapping account information or other business data from the user-side system 3210 to decentralized identifiers, verifiable claims, or other information or data stored on one or more blockchains. The agent 3221 may provide one or more application programming interfaces (APIs) that may be used by the user-side system 3210 to directly submit requests related to decentralized identifiers or verifiable claims. The agent 3221 may manage communications between the user-side system 3210 and the resolver 3222 and the cloud 3224.

In some embodiments, the agent 3221 may be coupled to a key management system (KMS) 3223. The KMS 3223 may generate, distribute, and manage cryptographic keys for devices and applications. It may cover security aspects from secure generation of keys over the secure exchange of keys to secure key handling and storage. The functionalities of the KMS 3223 may include key generation, distribution, and replacement as well as key injection, storing, and management. The KMS 3223 may include or be coupled to a trusted execution environment (TEE). The TEE may be an isolated area on the main processor of a device that is separate from the main operating system. The TEE may provide an isolated execution environment offering security features such as isolated execution, integrity of applications executing with the TEE, along with confidentiality of their assets. It may guarantee code and data loaded inside to be protected with respect to confidentiality and integrity. In some embodiments, the KMS 3223 may generate one or more cryptographic key pairs in the TEE. Before outputting the cryptographic key pair, the TEE may encrypt the private key. The encryption of the private key can be based on various methods or standards, such as Data Encryption Standard (DES), TripleDES, RSA, Advanced Encryption Standard (AES), Twofish, etc. The KMS 3223 may store the encrypted private key in association with the public key. To use the private key, the KMS 3223 may feed the encrypted private key to the TEE for decryption and processing.

In some embodiments, the agent 3221 may be coupled to a resolver 3222, which may include software applications for managing interactions between the agent and a blockchain 3230 in transactions related to decentralized identifiers or verifiable claims (e.g., correspondence between a decentralized identifier and a decentralized identifier document). Here, depending on the context, the blockchain 3230 may refer to a ledger of records or a blockchain system that includes a decentralized network of nodes that store the ledger of records and participate in a consensus process for adding data to the ledger of records. The resolver 3222 may be part of or coupled to the one or more cloud-based services. The one or more cloud-based services may be associated with a blockchain-as-a-service (BaaS) cloud 3224. The BaaS cloud 3224 may constitute a platform that offers various interfaces to one or more blockchains 3230. The BaaS cloud 3224 may receive inputs from an external application and facilitate the generation and execution of operations such as blockchain transaction deployment, blockchain contract generation and execution, and blockchain account generation based on the inputs. The BaaS cloud 3224 may also obtain information and data from one or more blockchains 3230 and provide the information and data to one or more other systems using the BaaS cloud 3224. The agent 3221 may be directly coupled to the cloud 3224 to use its services. One or more of the agent 3221, the resolver 3222, and the KMS 3223 may be integrated as part of the BaaS cloud 3224.

In some embodiments, the resolver 3222 and cloud 3224 may be coupled to a blockchain 3230. The blockchain 3230 may include one or more blockchain contracts 3231. One or more of the blockchain contracts 3231 may be configured to be executed by a virtual machine associated with the blockchain 3230 to perform one or more operations associated with decentralized identifiers and verifiable claims. The operations may include generating a new decentralized identifier, storing a decentralized identifier document, updating a decentralized identifier document, identifying a decentralized identifier document based on a decentralized identifier, storing information associated with a verifiable claim, and/or retrieving information associated with a verifiable claim. The resolver 3222 and cloud 3224 may be configured to deploy one or more transactions on the blockchain 3230 that invoke one or more of the blockchain contracts 3231. The transactions may trigger one or more operations related to decentralized identifiers and verifiable claims.

In some embodiments, the network environment may include an identity authentication system 3240. The identity authentication system 3240 may establish mapping relationships between decentralized identifiers and real-world identities. The identity authentication system 3240 may be associated with an entity performing identity authentication for individuals or entities. The identity authentication may be performed based on documents, and/or photos provided by an individual or entity. The identity authentication may also be performed based on data that is collected directly, such as photos, fingerprints, and/or password inputs. The identity authentication system 3240 may be coupled to the user-side system 3210 and/or the service-side system 3220. The identity authentication system 3240 may receive one or more requests from the user-side system 3210 or the service-side system 3220 for proofs of identity authentication. In response, the identity authentication system 3240 may perform any necessary identity authentication and send the proofs of identity authentication back to the requester. The proofs of identity authentication may include, for example, a confirmation message, a security key, and/or a unique identification code. The identity authentication system 3240 may be coupled to a blockchain system. The blockchain system connected to the identity authentication system 3240 may be the blockchain system 3230 that is coupled to the service-side system 3220. Alternatively, although FIG. 32 illustrates the identity authentication system 3240 coupled to the blockchain 3230, the identity authentication system 3240 can also be coupled to a different blockchain system. The identity authentication system 3240 may have access to the blockchain 3230 directly or via an intermediate system (e.g., the BaaS cloud 3224).

The identity authentication system 3240 may include an identity service 3241, which may be implemented on one or more servers or cloud platforms. In some embodiments, the identity service 3241 may be implemented as part of the service-side system 3220 (e.g., the cloud 3224). In other embodiments, the identity service 3241 may be implemented on a system separate from the service-side system 3220. The identity service 3241 may be configured to process requests for identity authentication, to control a client-side application 3242 to collect identity data, to generate proofs of identity authentication, to store or access identity information in a database 3243, to perform one or more operations on the blockchain 3230 (e.g., obtain identity information, store proof of identity authentication). The identity authentication system 3240 may include a client-side application 3242 that is connected to the identity service 3241 via a network. The client-side application 3242 may be dedicated to identity authentication or may incorporate identity authentication as one of its functions along with one or more other functions. The client-side application 3242 may be configured to collect data associated with a user. The client-side application 3242 may further be configured to compare collected data with pre-stored data corresponding to a purported identity of a user to authenticate the identity of the user. The identity authentication system 3240 may include a database 3243 connected to the identity service 3241. The database 3243 may store identity information associated with a plurality of individuals or entities. The identity information may include, for example, a proof of identity authentication, visual features of a person, voice features of a person, a fingerprint of a person, a signature of a person, and/or a password associated with an identity.

Figure 33:
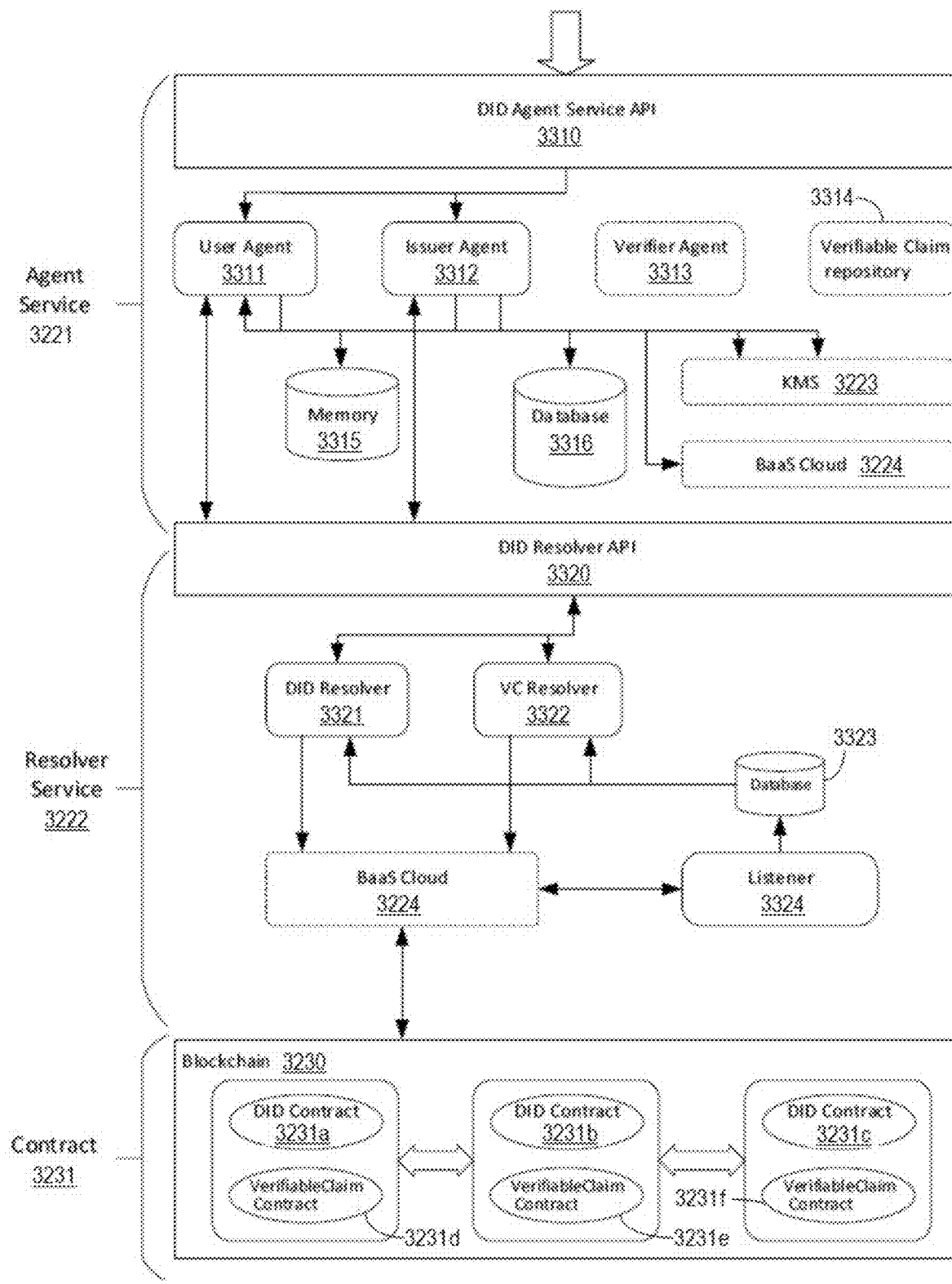
FIG. 33 illustrates an architecture associated with a blockchain-based system for managing decentralized identifiers and verifiable claims.

FIG. 33 illustrates an architecture associated with a blockchain-based system (e.g., the data authorization platform 2800) for managing decentralized identifiers (e.g., digital identity decentralized identifier 512, business decentralized identifier 610, consortium blockchain digital activity decentralized identifier 708) and verifiable claims in accordance with some embodiments. The system may include one or more agent services 3221, one or more resolver services 3222, and one or more blockchain contracts 3231. The one or more agent services 3221 may be configured to process requests related to decentralized identifiers and verifiable claims that are received from users. The one or more agent services 3221 may manage mapping relationships between account information on user-side systems 3210 and decentralized identifiers of the owners of the accounts. The agent services 3221 may include a decentralized identifier agent service API 3310 for receiving decentralized identifier-related requests from user-side systems 3210. Depending on the nature of a request, it may be provided to a user agent 3311 for performing operations such as generation and authentication of decentralized identifiers, or provided to an issue agent 3312 for performing operations such as issuance of verifiable claims. The requests from a party desiring to verify a verifiable claim may be provided to the verifier agent 3313. The one or more agent services 3221 may also provide a verifiable claim repository 3314 for storing one or more verifiable claims. The agent services 3221 may also use one or more memory devices 3315 and one or more databases 3316. The agent services 3221 may be coupled to a KMS 3223 and a BaaS Cloud 3224. The agent services 3221 may be coupled to the resolver services 3222.

In some embodiments, one or more agents of the agent services 3221 may send one or more requests to a decentralized identifier resolver API 3320 associated with the resolver services 3222. The resolver services 3222 may be configured to process interactions between the agent services 3221 and the blockchain 3230. The resolver services 3222 may perform operations such as obtaining data from the blockchain 3230, adding data to the blockchain 3230, generating blockchain contracts 3231, and/or deploying transaction to the blockchain 3230 to invoke blockchain contracts 3231. The resolver services 3222 may include a decentralized identifier resolver 3321 configured to manage decentralized identifiers and decentralized identifier documents stored on the blockchain 3230, and a verifiable claim resolver 3322 configured to manage verifiable claims for decentralized identifiers generated based on the blockchain 3230. The resolver services 3222 may also include a listener 3324 for obtaining data from the blockchain 3231. The listener 3324 may store obtained data to a database 3323. The data may be used by the decentralized identifier resolver 3321 and the verifiable claim resolver 3322. The decentralized identifier resolver 3321, verifiable claim resolver 3322, and listener 3324 may be coupled to a BaaS cloud 3224 for interactions with the blockchain 3230.

In some embodiments, the blockchain 3230 may include one or more blockchain contracts (3231*a*, 3231*b*, 3231*c*) for managing decentralized identifiers and decentralized identifier documents and include one or more contracts (3231*d*, 3231*e*, 32310 for managing verifiable claims. The contracts may be executed by one or more virtual machines associated with the blockchain 3230 to perform operations such as, e.g., generating decentralized identifiers, storing decentralized identifier documents, updating decentralized identifier documents, and/or storing information associated with verifiable claims.

Figure 34:
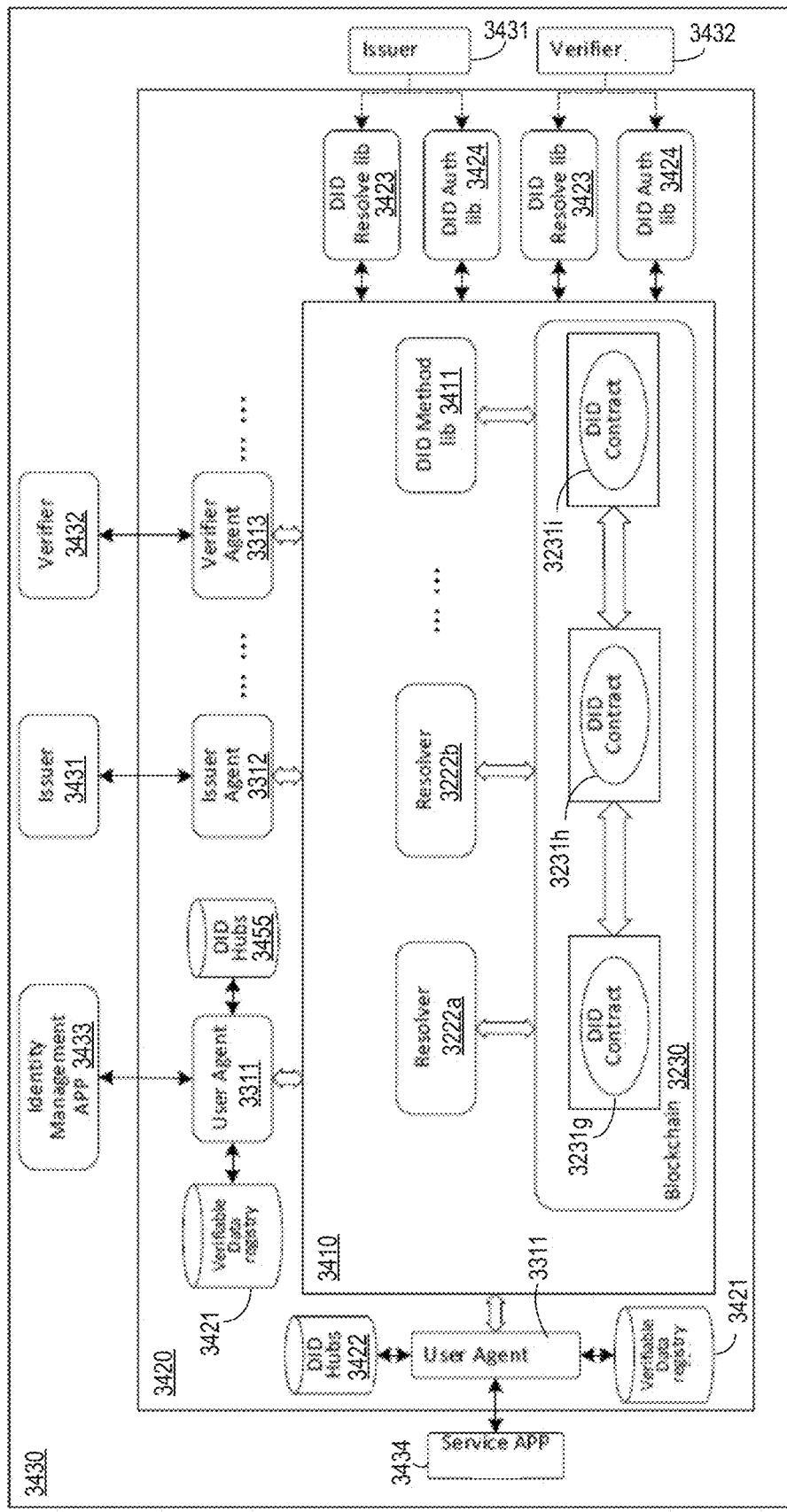
FIG. 34 illustrates a network environment associated with a system or platform for implementing various examples of functionalities associated with decentralized identifiers and verifiable claims.

FIG. 34 illustrates a network environment associated with a system or platform for implementing various examples of functionalities associated with decentralized identifiers and verifiable claims in accordance with some embodiments. Components of the network environment may be categorized into three layers 3410, 3420, and 3430. In some embodiments, the bottom or core layer 3410 may include one or more blockchains 3230, which may include one or more blockchain contracts (3231*g*, 3231*h*, 3231*i*) that can be executed to perform operations related to decentralized identifiers and verifiable claims. The blockchain 3230 may store a plurality of decentralized identifiers and a plurality of decentralized identifier documents corresponding to the decentralized identifiers. The blockchain contracts (3231*g*, 3231*h*, 3231*i*) may be configured to manage mapping relationships between decentralized identifiers and decentralized identifier documents, and generation and changes to decentralized identifier documents. The blockchains 3230 may be accessible to one or more resolvers (3222*a*, 3222*b*) for operations related to decentralized identifiers and verifiable claims. The resolvers (3222*a*, 3222*b*) may be configured to provide to an external system services such as searching for decentralized identifier documents or data contained in decentralized identifier documents based on inputted decentralized identifiers. One or more method libraries 3411 may also be available for external systems to adopt to interact with the blockchain 3230.

In some embodiments, the middle or enhancement layer 3420 may include one or more user agents 3311, one or more issuer agents 3312, and/or one or more verifier agents 3313. The blockchain 3230 may include a consortium blockchain, which may or may not be directly accessible to users that are not consensus nodes of the consortium blockchain. A user agent 3311 may provide an interface for an ordinary user to interact with the blockchain. The user agent 3311 may be configured to generate one or more decentralized identifiers, authenticate one or more decentralized identifiers, interact with one or more verifiable data registry 3421 or one or more decentralized identifier hubs 3422, send notifications to an owner of a decentralized identifier, or any combination of the above. Here, a decentralized identifier hub 3422 may include a system in which an owner of a decentralized identifier stores its sensitive data. The owner may grant certain other entities (e.g., institutions issuing verifiable claims) access to data stored in the decentralized identifier hub 3422. A verifiable data registry 3421 may include a verifiable claim repository for storing and managing the verifiable claims issued to an owner of a decentralized identifier. An issuer agent 3312 may include one or more APIs (e.g., REST API) or SDKs. The issuer agent 3312 may be configured to issue one or more verifiable claims, withdraw one or more verifiable claims, check and inspect an existing verifiable claim, publish a template for verifiable claims, and/or maintain a template for verifiable claims. A verifier agent 3313 may include one or more APIs (e.g., REST API) or SDKs and be configured to verify a verifiable claim. In some embodiments, the layer 3420 may also include one or more code libraries (e.g., decentralized identifier resolve library 3423, decentralized identifier authentication library 3424) that can be adopted and used to interact with the decentralized identifier resolvers 3222 or directly with the blockchain 3230. The code libraries may be packaged into one or more SDKs and be used to perform functionalities such as decentralized identifier authentication, interactions with the blockchain 3230, or interfacing with blockchain contracts 3231. The issuer agent 3312 and verifier agent 3313 may be used by key participants in the network environment associated with decentralized identifiers and verifiable claims such as entities able to perform know-your-customer (KYC) authentication or endorsement for users or to issue or verify verifiable claims (e.g., government institutions, banks, financial service providers). The key participants may provide third-party services that can be integrated via connections with the issuer agent 3312 or the verifiable agent 3313.

In some embodiments, the upper or extension layer 3430 may include one or more external services or applications related to decentralized identifiers and verifiable claims. The services or applications may include, e.g., one or more issuer applications 3431, one or more verifier applications 3432, an identity management application 3433, and/or a service application 3434. An issuer application 3431 may correspond to an entity (e.g., government institution, banks, credit agency) issuing verifiable claims signed or endorsed by the entity for users. The issuer application 3431 may operate on a user-side system 3210. The issuer application 3431 may include an issuer verifiable claim manager service which may allow an issuer to manage issued verifiable claims, maintain their status (e.g., validity), or perform other suitable operations. The issuer application 3431 may interact with the layers 3410 and 3420 via a connection or interface with the issuer agent 3312 or one or more code libraries 3423 and 3424. A verifier application 3432 may correspond to an entity (e.g., service provider, credit issuer) needing to verify verifiable claims to ascertain a user's information (e.g., identity, age, credit score). The verifier application 3432 may operate on a user-side system 3210. The verifier application 3432 may interact with layers 3410 and 3420 via a connection or interface with the verifier agent 3313 or one or more code libraries 3423 and 3424. The identity management application 3433 may be installed on a client device or terminal associated with a user. The user may be a decentralized identifier owner, which may be an individual, a business, an organization, and/or an application. The identity management application 3433 may allow a user to manage cryptographic key pairs associated with decentralized identifiers, original data, or verifiable claims, to receive notifications from a user agent 3311, to authenticate a decentralized identifier, to grant access to data, and/or to use a verifiable claim, or any combination of the above. The identity management application 3433 may interact with the layers 3410 and 3420 through a connection or interface with the user agent 3311. The service application 3434 may also be coupled to the user agent 3311 and be configured to manage functions related to decentralized identifiers or verifiable claims for one or more users or accounts.

Figure 35:
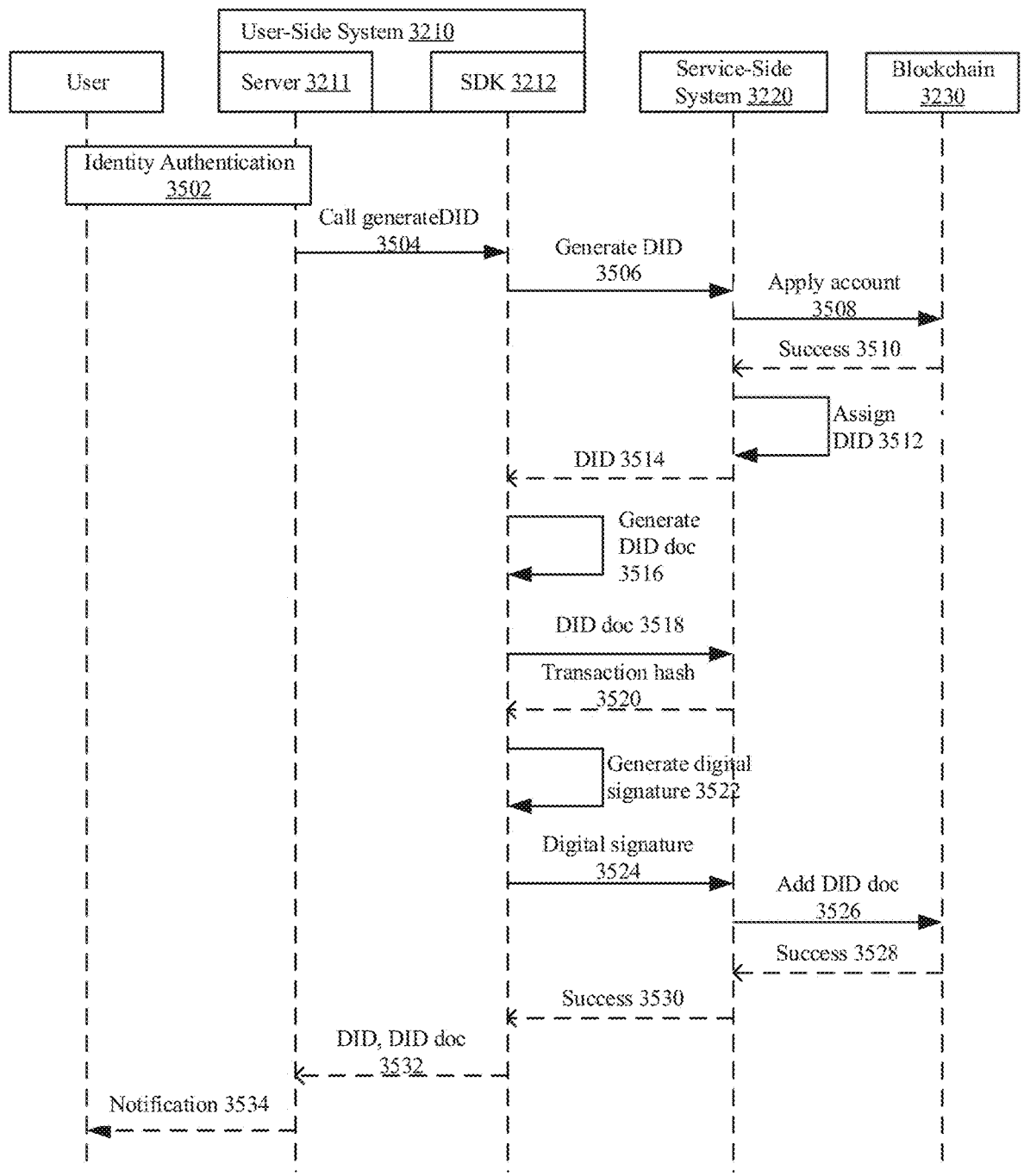
FIGS. 35 and 36 illustrate methods for generating a decentralized identifier.
Figure 36:
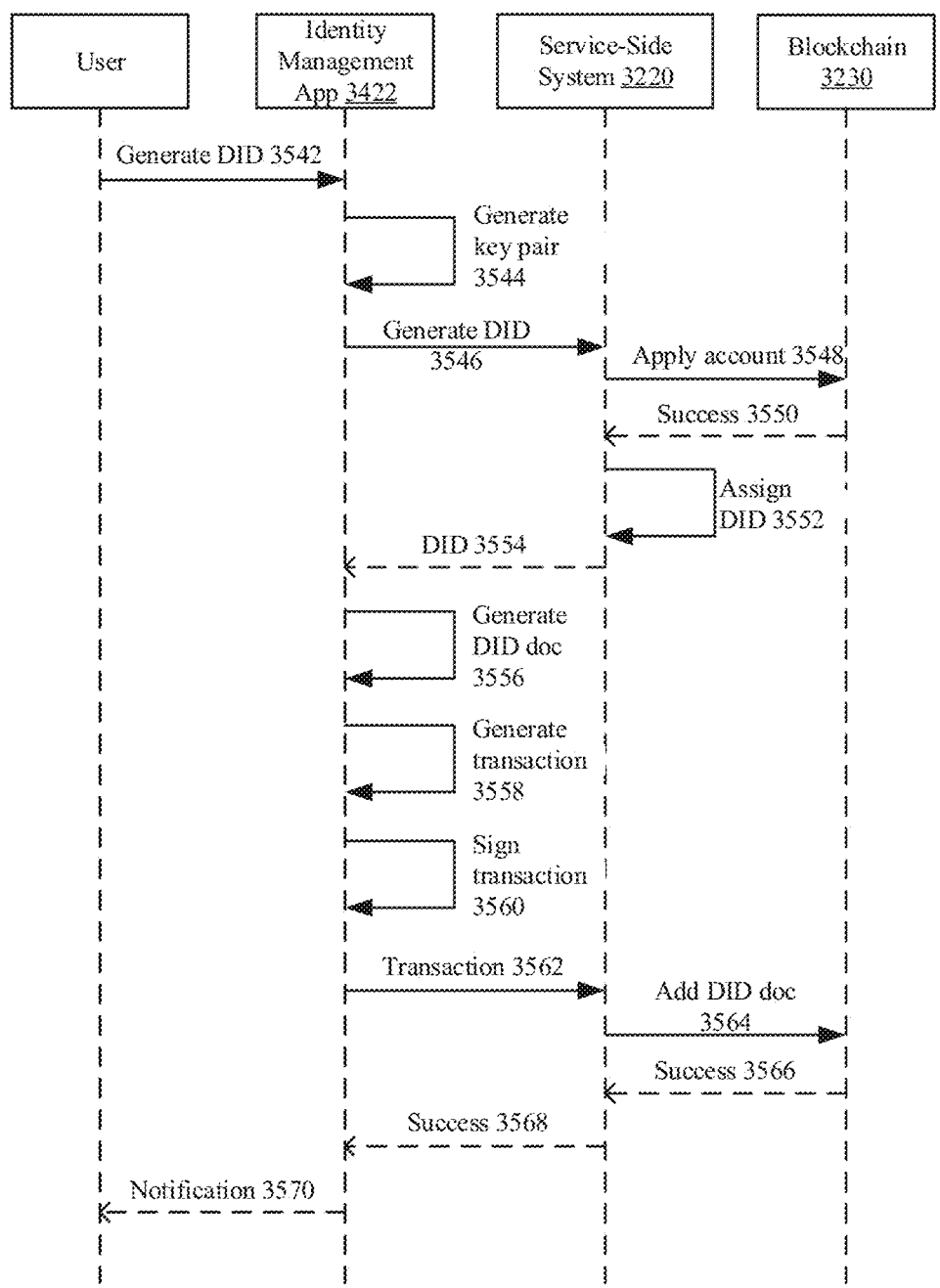

FIGS. 35 and 36 illustrate example operations associated with decentralized identifiers or verifiable claims performed by one or more user-side systems 3210, one or more resolvers 3222, one or more clouds 3224, or one or more blockchain systems 3230. In some embodiments, a user-side system 3210 may manage one or more decentralized identifiers or one or more verifiable claims by interfacing with a decentralized identifier resolver 3222 and a blockchain 3230 storing decentralized identifiers and decentralized identifier documents. The user-side system 3210 may use one or more SDKs 3212 for managing decentralized identifiers that are compatible with methods associated with the decentralized identifiers. The SDKs 3212 may be integrated with one or more applications used by the user-side system 3210. The user-side system 3210 may also interface with one or more service endpoints for storing verifiable claims, one or more service endpoints for storing status information for verifiable claims, one or more service endpoints for authentication of decentralized identifiers, other suitable systems, or any combination of the above.

FIGS. 35 and 36 illustrate methods for generating a decentralized identifier in accordance with some embodiments. The operations of the methods presented below are intended to be illustrative. Depending on the implementation, the methods may include additional, fewer, or alternative steps performed in various orders or in parallel. Furthermore, one or more steps performed in either of methods 35 and 36 may be replaced with one or more suitable steps performed in the other method. The devices or systems performing certain steps as illustrated in FIGS. 35 and 36 may also be substituted by other suitable devices or systems to perform the same steps. The suitable devices or systems may include sub-systems, parent systems, or counterpart systems with similar functionalities. As an example, one or more steps performed by the user-side system 3210 in FIG. 35 may be performed by the identity management application 3433 in FIG. 36 and vice versa. As another example, one or more steps performed by the service-side system 3220 may be performed by the resolver 3222, which may be a sub-system of the service-side system 3220. Although this specification describes particular devices or systems performing particular steps, this specification contemplates any suitable devices or systems performing any suitable steps for creating a decentralized identifier.

In some embodiments, as illustrated in FIG. 35, the user-side system 3210 may generate a decentralized identifier for each of one or more of its users. The user-side system 3210 may control the cryptographic key pair associated with the decentralized identifier and use the cryptographic key pair to perform various operations related to the decentralized identifier including, for example, signing blockchain transactions, signing verifiable claims, or authentication of the decentralized identifier. The user-side system 3210 may include an SDK 3212 for performing the various operations. The SDK 3212 may also manage various interactions between the user-side system 3210 and various interfaces provided by the service-side system 3220. The interfaces may include an interface for assignment of decentralized identifiers, an interface for generating decentralized identifier documents, an interface for adding decentralized identifier documents to the blockchain 3230, an interface for searching decentralized identifier documents, other suitable interfaces, or any combination thereof. The interfaces may be provided by way of, for example, software programs and network ports. In response to requests received at the interfaces, the service-side system 3220 may perform corresponding operations and return results via the interfaces to appropriate external systems. The method illustrated in FIG. 35 may start at step 3502, in which a server 3211 of a user-side system 3210 may obtain identity authentication of a user for whom it is going to obtain a decentralized identifier. The identity authentication may have been performed by the identity authentication system 3240 or another suitable system. In other embodiments, the user-side system 3210 may have obtained a proof of identity authentication for the user from an identity authentication system 3240. The proof of identity authentication for the user may comprise a proof of real-name authentication (e.g., based on government-issued identity documents), a proof of real-person authentication (e.g., based on a photo of the user taken based on instructions of the identity authentication system 3240), a proof of other identity authentication, or any combination thereof. The user-side system 3210 may also generate or retrieve a cryptographic key pair including a public key and a private key for use to create the decentralized identifier.

At step 3504, the server 3211 may invoke a functionality of an SDK 3212 for generating a new decentralized identifier. The server 3211 may provide various information to the SDK 3212 for invoking the functionality. The information may include an account identifier for the user corresponding to the to-be-generated decentralized identifier, a public key or private key of the cryptographic key pair generated for the decentralized identifier, specification of one or more services associated with the to-be-generated decentralized identifier, a callback network address associated with the server 3211 for return of confirmations or other communications, other suitable information, or any combination thereof. The account identifier may correspond to a business or service account of the user with an entity associated with the user-side system 3210. At step 3506, the user-side system 3210 may send a request for creating a new decentralized identifier to the service-side system 3220 using the SDK 3212. The service-side system 3220 may obtain the request for generating a decentralized identifier. The request may include a public key of a cryptographic key pair, which may have been generated by the user-side system 3210. FIG. 35 illustrates a scenario in which the request for generating the decentralized identifier is received from a computing device associated with a first entity (e.g., user-side system 3210) for generating the decentralized identifier on behalf of a second entity (e.g., user). The request may further include, in addition to the public key, an account identifier associated with the second entity (e.g., user), profile information associated with the second entity (e.g., user), information about one or more services associated with the decentralized identifier, a callback address associated with the first entity (e.g., user-side system 3210) or the second entity (e.g., user), other suitable information, or any combination thereof. An alternative scenario is illustrated in FIG. 36 in which the request for generating the decentralized identifier is received directly from a computing device associated with an entity to own the decentralized identifier. In some embodiments, the request may be in the form of an application programming interface (API) message to one or more of the interfaces provided by the service-side system.

In response to the request obtained from the user-side system 3210, the service-side system 3220 may generate, based on the public key in the request, a blockchain account associated with a blockchain 2330. At step 3508, the service-side system 3220 may send a request to the blockchain system 3230 for generating a new blockchain account. Here, the request may be directly sent to one or more blockchain nodes of the blockchain 3230 in the form of one or more blockchain transactions or be sent via a BaaS Cloud 3224 or other suitable interface systems associated with the blockchain 3230. After sending the request, at step 3510, the service-side system 3220 may obtain an indication from blockchain 3230 that a new blockchain account has been generated. The blockchain account may be associated with an address on the blockchain 3230. The service-side system 3220 may obtain information associated with the newly-generated blockchain address.

Then, the service-side system 3220 may generate a decentralized identifier based on information associated with the blockchain account. At step 3512, the service-side system 3220 may assign a decentralized identifier to the user based on the blockchain account. The service-side system 3220 may assure that the assigned decentralized identifier is unique by determining that the decentralized identifier is not duplicative of any existing decentralized identifier associated with the blockchain 3230. According to this embodiment, the decentralized identifier may be assigned and determined to be unique prior to the construction or upload of a decentralized identifier document corresponding to the decentralized identifier. This may effectively prevent potential failed attempts to upload the decentralized identifier document due to duplication of the decentralized identifier, and thus save processing and computation efforts in generating and uploading the decentralized identifier document. The service-side system 3220 may associate the decentralized identifier with the user's account with the user-side system 3210 by storing a mapping relationship between the account identifier and the generated decentralized identifier. The service-side system 3220 may further store a status of the decentralized identifier. As an example and not by way of limitation, the status of the decentralized identifier may indicate whether the decentralized identifier has been registered to the blockchain 3230 or whether a corresponding decentralized identifier document has been stored in the blockchain 3230. At step 3514, the service-side system 3220 may send a message back to the SDK 3212 associated with the user-side system 3210. The message may include information associated with the newly generated decentralized identifier.

At step 3516, the user-side system 3210 may use the SDK 3212 to generate a decentralized identifier document associated with the decentralized identifier. The decentralized identifier document may include information associated with the decentralized identifier such as the public key associated with the decentralized identifier, authentication information associated with the decentralized identifier (e.g., one or more authentication methods), authorization information associated with the decentralized identifier (e.g., a decentralized identifier associated with a controller), delegation information associated with the decentralized identifier (e.g., one or more delegation methods), one or more services associated with the decentralized identifier (e.g., one or more types of services such as credential repository service and agent service), one or more service endpoints associated with the decentralized identifier (e.g., URI for each of one or more service endpoints), other suitable information, or any combination thereof. The SDK 3212 may generate the decentralized identifier document based on information received from the server 3211 when the server 3211 invokes the SDK 3212 at step 3504. The user-side system 3210 may further use the SDK 3212 to generate a blockchain transaction for adding the decentralized identifier document to the blockchain 3230. The blockchain transaction generated at this stage may or may not be complete and valid. In some embodiments, the blockchain transaction generated by the user-side system 3210 may lack information associated with the blockchain 3230, one or more blockchain contracts associated with the blockchain 3230, a digital signature, other suitable information, or any combination thereof.

At step 3518, the SDK 3212 may send the decentralized identifier document to service-side system 3220. If the SDK 3212 has generated a blockchain transaction, it may send the blockchain transaction to the service-side system 3220, which may include the decentralized identifier document. At this step, the SDK 3212 may request the service-side system 3220 to provide a hash value associated with a completed but unsigned blockchain transaction for adding the decentralized identifier document to the blockchain 3230. After obtaining the decentralized identifier document corresponding to the decentralized identifier from the user-side system 3210, the service-side system 3220 may generate or complete a blockchain transaction for adding the decentralized identifier document to the blockchain 3230. The blockchain transaction may invoke a blockchain contract 3231 previously deployed on the blockchain 3230 for managing relationships between decentralized identifiers and corresponding decentralized identifier documents. The blockchain contract 3231 invoked may include one or more interfaces, such as an interface for adding one or more decentralized identifier documents to the blockchain 3230. The one or more interfaces of the blockchain contract 3231 may include executable code corresponding to one or more executable functions of the blockchain contract 3231. To generate the blockchain transaction, the service-side system 3220 may include one or more information items in the blockchain transaction. The one or more information items may include an address associated with the blockchain 3230, an identifier of a blockchain contract 3231 associated with the blockchain transaction, version information of the blockchain contract 3231 associated with the blockchain transaction, information of one or more interfaces of the blockchain contract 3231 associated with the blockchain transaction, other suitable information, or any combination thereof. The information added by the service-side system 3220 to the blockchain transaction may include public or other suitable information associated with the blockchain system 3230, blockchain contracts on the blockchain 3230, or other information necessary for generating a valid blockchain transaction. The service-side system 3220 may automatically populate such information and relieve the user-side system 3210 of the burden of keeping track of such information. This may reduce the technical capabilities required for the user-side system 3210 to add a decentralized identifier document to the blockchain 3230.

The blockchain transaction generated by the service-side system 3220 based on the decentralized identifier document received from the user-side system 3210 may be unsigned at this stage. The service-side system 3220 may determine a hash value of the unsigned blockchain transaction according to a hash function acceptable to the blockchain system 3230. At step 3520, the service-side system 3220 may send the hash value of the unsigned blockchain transaction to the user-side system 3210. Then, at step 3522, the SDK 3212 associated with the user-side system 3210 may generate a digital signature on the hash value. As an example, the digital signature may be generated by encrypting the hash value using the private key of the cryptographic key pair associated with the owner of the decentralized identifier that is received from the server 3211. At step 3524, the SDK 3212 may return the digital signature to the service-side system 3220, thereby authorizing the blockchain transaction. After receiving the digital signature from the user-side system 3210 at step 3524, the service-side system 3220 may add the digital signature to the unsigned blockchain transaction to generate or complete the blockchain transaction for adding the decentralized identifier document to the blockchain. Then, at step 3526, the service-side system 3220 may send the blockchain transaction to one or more blockchain nodes associated with the blockchain 3230 for adding to the blockchain. At step 3528, the service-side system 3220 may obtain information from the blockchain 3230 confirming successful storage of the decentralized identifier document in the blockchain 3230. At step 3530, the service-side system 3220 may return a confirmation message to the SDK 3212. The confirmation message may include the decentralized identifier and decentralized identifier document that have been generated. Then, at step 3532, the SDK 3212 may provide the decentralized identifier and decentralized identifier document to the server 3211. Here, the SDK 3212 may send information associated with the decentralized identifier and the decentralized identifier document based on information associated with the callback address received from the server 3211. At step 3534, the server 3211 may send the user a notification confirming successful generation of the decentralized identifier and the corresponding decentralized identifier document.

In some embodiments, as illustrated in FIG. 36, a user may generate a decentralized identifier for itself directly using one or more interfaces provided by the service-side system 3220 and without using a service provided by a user-side system 3210. The user may include an individual, a business, an organization, another suitable entity, or any combination thereof. As an example, the user may use an identity management application 3433 or another suitable software or hardware system to interact with the service-side system 3220. The identity management application 3433 may be developed by an entity associated with the service-side system 3220 and provided for installation on a client device associated with the user. The identity management application 3433 may be configured to manage interactions with various interfaces provided by the service-side system 3220. The method illustrated in FIG. 36 may start at step 3542, the user may provide one or more inputs to the identity management application 3433 in order to request generation of a decentralized identifier for the user. The identity management application 3433 may request inputs from the user verifying the real-world identity of the user. Alternatively, the identity management application 3433 may have obtained identity authentication information associated with the user previously and may be configured to retrieve such information, for example, when the user logs in the identity management application 3433.

At step 3544, the identity management application 3433 may generate a cryptographic key pair for the user. The cryptographic key pair may include a public key and a private key to be used to generate the decentralized identifier associated with the user. At step 3546, the identity management application 3433 may send a request for generating a new decentralized identifier to the service-side system 3220. At step 3548, the service-side system 3220 may send a request to a blockchain system 3230 for generating a new blockchain account. Here, the request may be directly sent to one or more blockchain nodes of the blockchain 3230 in the form of one or more blockchain transactions or be sent via a BaaS Cloud 3224 or other suitable interface systems associated with the blockchain 3230. Then, at step 3550, the service-side system 3220 may obtain from the blockchain 3230 information indicating that a new blockchain account has been generated. The blockchain account may be associated with an address on the blockchain 3230. The information obtained by the service-side system 3230 may include information associated with the newly-generated blockchain address. It may include information sufficient to generate the decentralized identifier. At step 3552, the service-side system 3220 may assign a unique decentralized identifier to the user according to information associated with the blockchain account. At step 3554, the service-side system 3220 may send a message back to the identity management application 3433. The message may include information associated with the newly generated decentralized identifier.

In some embodiments, a decentralized identifier document may be generated and stored on the blockchain 3230.

At step 3556, the identity management application 3433 may generate a decentralized identifier document and add the public key associated with the newly-generated decentralized identifier and other suitable information (e.g., authentication information) to the decentralized identifier document. The identity management application 3433 may add information associated with one or more service endpoints (e.g., information associated with an authentication service endpoint, information associated with a verifiable claim repository) to the decentralized identifier document. The authentication service endpoint and the verifiable claim repository may be provided as part of the service-side system 3220 or be provided by third-party systems. Then, at step 3558, the identity management application 3433 may generate one or more blockchain transactions for adding the decentralized identifier document to the blockchain 3230. The identity management application 3433 may generate a hash value of the blockchain transaction and generate a digital signature for the transaction using the private key associated with the decentralized identifier at step 3560. Alternatively, the identity management application 3433 may interact with the service-side system 3220 in a manner similar to the interactions between the user-side system 3210 and the service-side system 3220 as illustrated by steps 3518, 3520, and 3522 of FIG. 35 in order to generate and sign the blockchain transaction. At step 3562, the identity management application 3433 may send the decentralized identifier document as well as the blockchain transaction to the service-side system 3220 for sending to the blockchain system 3230. At step 3564, the service-side system 3220 may send the one or more transactions to the blockchain system 3230. The one or more transactions may invoke a blockchain contract 3231 for managing decentralized identifier s and decentralized identifier documents on the blockchain 3230. At step 3566, the service-side system 3220 may obtain information from the blockchain 3230 indicating that the decentralized identifier document has been successfully stored. At step 3568, the service-side system 3220 may forward a confirmation to the identity management application 3433. At step 3570, the identity management application 3433 may provide a notification including information associated with the generated decentralized identifier and decentralized identifier document for display to the user.

Figure 37:
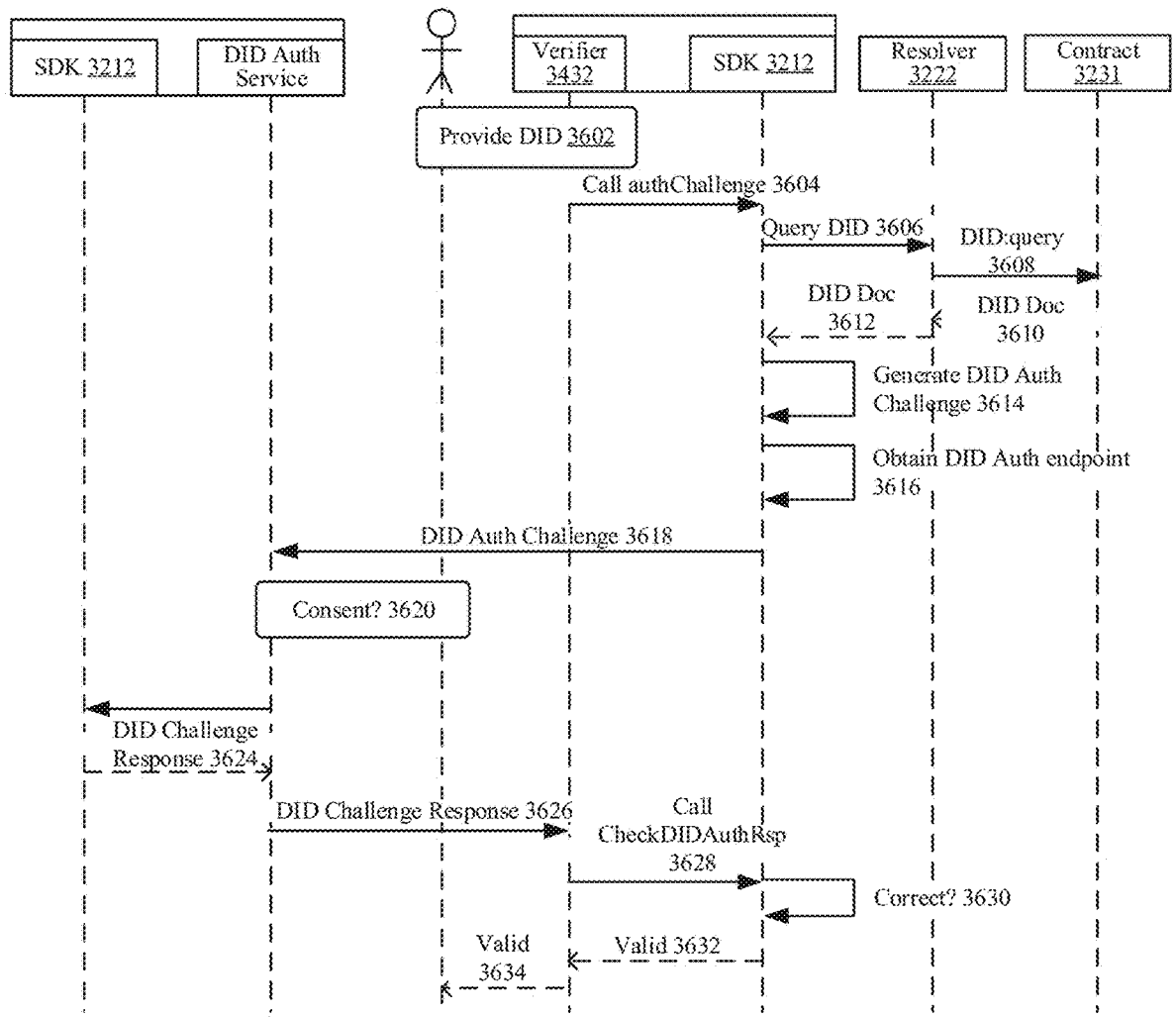
FIG. 37 illustrates a method for authenticating a decentralized identifier using decentralized identifier authentication services.

FIG. 37 illustrates a method for authenticating a decentralized identifier using decentralized identifier authentication services in accordance with some embodiments. The operations of the method presented below are intended to be illustrative. Depending on the implementation, the method may include additional, fewer, or alternative steps performed in various orders or in parallel. In some embodiments, a user owning a decentralized identifier may use decentralized identifier authentication services provided by the data authorization platform 2800 to achieve authentication of its ownership of the decentralized identifier. The owner may trust a public-private key pair corresponding to the decentralized identifier to the data authorization platform 2800 for storage. The owner may provide a network location (e.g., identified by a URL) of the decentralized identifier authentication services as a service endpoint for authentication of the decentralized identifier. The location identifier of the decentralized identifier authentication services may be included in a "service" field of the decentralized identifier document associated with the decentralized identifier.

In some embodiments, a verifier 3432 (e.g., a service provider needing to verify information of a customer) may initiate a decentralized identifier authentication process using an SDK 3212. At step 3602, the verifier 3432 may obtain the decentralized identifier provided by a purported owner. At step 3604, the verifier 3432 may call the SDK 3212 to generate a decentralized identifier authentication challenge. The verifier 3432 may input to the SDK 3212 the decentralized identifier to be authenticated and a network address (e.g., a URL) to which a response to the challenge is to be sent. At step 3606, the SDK 3212 may send a query to a resolver 3222 for the decentralized identifier document associated with the decentralized identifier to be authenticated. At step 3608, the resolver 3222 may formulate a blockchain transaction invoking a blockchain contract 3231 for managing decentralized identifiers and send the blockchain transaction to one or more blockchain nodes associated with the blockchain 3230 for execution. As a result, the resolver 3222 may obtain the decentralized identifier document corresponding to the decentralized identifier at step 3610 and forward it to the SDK 3212 at step 3612. At step 3614, the verifier 3432 may use the SDK 3212 to generate a decentralized identifier authentication challenge based on the obtained decentralized identifier document. In some embodiments, the decentralized identifier authentication challenge may include a ciphertext generated by encrypting original text using a public key associated with the decentralized identifier that is recorded in the decentralized identifier document. The challenge may also include a network address to which a response is to be sent. At step 3616, the verifier 3432 may obtain information associated with the authentication service endpoint for the decentralized identifier from the decentralized identifier document. At step 3618, the verifier 3432 may use the SDK 3212 to send the challenge to the decentralized identifier authentication services associated with the decentralized identifier.

In some embodiments, after obtaining the decentralized identifier authentication challenge from the verifier 3432, the decentralized identifier authentication services may obtain consent from the owner for such authentication request at step 3620. If the owner provides consent or permission for the identity authentication, the decentralized identifier authentication services may call its version of the SDK 3212 to generate a response to the decentralized identifier authentication challenge at step 3622. In some embodiments, the response to the decentralized identifier authentication challenge may include plaintext that is the result of decrypting the ciphertext in the challenge using the private key associated with the decentralized identifier. The SDK 3212 may return the response to the decentralized identifier authentication services at step 3624, which may then send the response to the network address provided by the verifier 3332 at step 3626. Upon receiving the response to the decentralized identifier authentication challenge, the verifier 3432 may call its SDK 3212 at step 3628 to check the response. At step 3630, the SDK 3212 may determine whether the response proves that the user providing the decentralized identifier is the owner of the decentralized identifier. In some embodiments, the SDK 3212 may check the response by comparing decrypted text in the response with the original text that was used to generate the decentralized identifier authentication challenge. If the response is determined to be correct, the SDK 3212 may return a message to the verifier 3432 indicating the decentralized identifier is a valid proof of identity of the user at step 3632. At step 3634, the verifier 3432 may notify the user as to the validity of the decentralized identifier.

Figure 38:
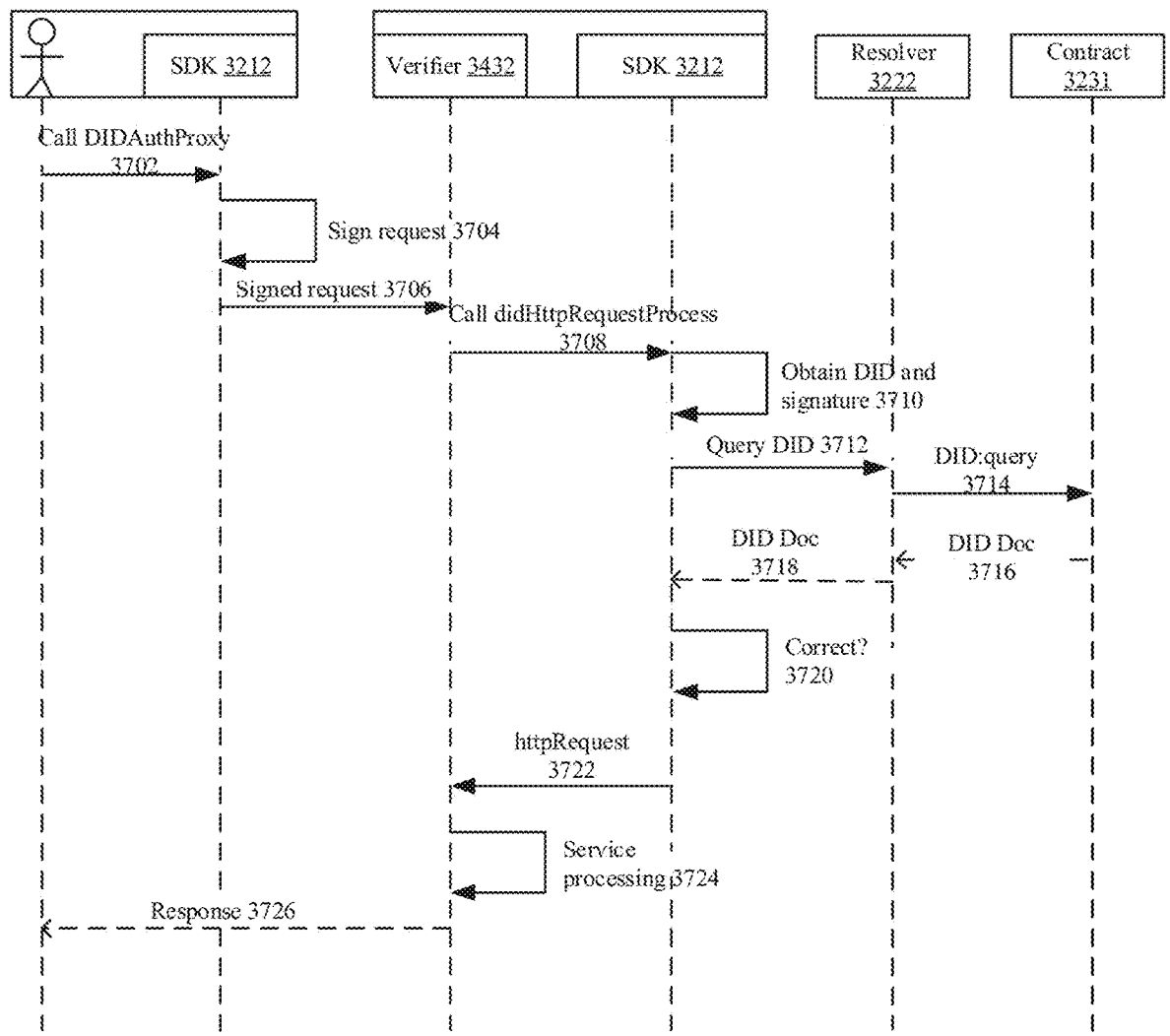
FIG. 38 illustrates a method for authenticating a decentralized identifier using an identity management application.

FIG. 38 illustrates a method for authenticating a decentralized identifier using an identity management application in accordance with some embodiments. The operations of the method presented below are intended to be illustrative.

Depending on the implementation, the method may include additional, fewer, or alternative steps performed in various orders or in parallel. In some embodiments, a user may use a terminal for managing decentralized identifiers, which may include an identity management application or another suitable application. The application may include a version of the SDK 3212. In this example, the user may need services from a service provider (i.e., verifier), which requires verification that the user owns a particular decentralized identifier in order to provide its services. The user may send a service request to the verifier. The service request may be in the form of an HTTP request.

At step 3702, the user may call the identity management application 3433 to provide authentication information for the service request. The user may provide the original service request as an input to the SDK 3212 included in the identity management application 3433. At step 3704, the SDK 3212 may sign the content of the original service request using a private key of a cryptographic key pair associated with the decentralized identifier. The SDK 3212 may be used to add the decentralized identifier and a digital signature for the original service request to the original service request to generate a signed service request. In case the original service request is a HTTP request, the SDK 3212 may add the decentralized identifier and the digital signature to a header of the HTTP request. At step 3706, the SDK 3212 may send the signed service request to the verifier 3432.

In some embodiments, the verifier 3432 may call its version of an SDK 3212 to authenticate the decentralized identifier included in the signed service request at step 3708. At step 3710, the SDK 3212 may obtain the decentralized identifier and the digital signature included in the signed service request. In case the signed service request is an HTTP request, the decentralized identifier and the digital signature may be obtained from the header of the HTTP request. At step 3712, the SDK 3212 may send a query to a resolver 3222 for the decentralized identifier document associated with the decentralized identifier to be authenticated. At step 3714, the resolver 3222 may formulate a transaction invoking a blockchain contract 3231 for managing decentralized identifiers and send the transaction to one or more blockchain nodes associated with the blockchain 3230 for execution. As a result, the resolver 3222 may obtain the decentralized identifier document corresponding to the decentralized identifier at step 3716 and forward it to the SDK 3212 at step 3718. At step 3720, the SDK 3212 associated with the verifier 3432 may check the signed service request to determine whether it is from the owner of the decentralized identifier based on the obtained decentralized identifier document. In some embodiments, the SDK 3212 may decrypt the digital signature using a public key obtained from decentralized identifier document, and check the decryption result against a hash value of the original service request to determine if the public key is associated with the key used to generate the digital signature in the signed service request. If so, the SDK 3212 may determine that the service request from the user is valid. It may then send it to the verifier 3432 for processing at step 3722. The verifier 3432 may process the service request and provide appropriate services to the user at step 3724. Then, the verifier 3432 may send a response to the user at step 3726 to confirm completion of the requested services.

The system, apparatus, module, or unit illustrated in the previous embodiments can be implemented by using a computer chip or an entity, or can be implemented by using a product having a certain function. A typical embodiment device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

For an embodiment process of functions and roles of each module in the apparatus, references can be made to an embodiment process of corresponding steps in the previous method. Details are omitted here for simplicity.

Because an apparatus embodiment basically corresponds to a method embodiment, for related parts, references can be made to related descriptions in the method embodiment. The previously described apparatus embodiment is merely an example. The modules described as separate parts may or may not be physically separate, and parts displayed as modules may or may not be physical modules, may be located in one position, or may be distributed on a number of network modules. Some or all of the modules can be selected based on actual demands to achieve the objectives of the solutions of the specification. A person of ordinary skill in the art can understand and implement the embodiments of the present application without creative efforts.

Referring again to FIGS. 16 to 19 and 24 to 27, it can be interpreted as illustrating an internal functional module and a structure of a blockchain node. An execution body in essence can be an electronic device, and the electronic device includes the following: one or more processors; and one or more computer-readable memories configured to store an executable instruction of the one or more processors. In some embodiments, the one or more computer-readable memories are coupled to the one or more processors and have programming instructions stored thereon that are executable by the one or more processors to perform algorithms, methods, functions, processes, flows, and procedures, as described in this specification. This specification also provides one or more non-transitory computer-readable storage media coupled to one or more processors and having instructions stored thereon which, when executed by the one or more processors, cause the one or more processors to perform operations in accordance with embodiments of the methods provided herein.

This specification further provides a system for implementing the methods provided herein. The system includes one or more processors, and a computer-readable storage medium coupled to the one or more processors having instructions stored thereon which, when executed by the one or more processors, cause the one or more processors to perform operations in accordance with embodiments of the methods provided herein.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. For example, a computer program carrier can include one or more computer-readable storage media that have instructions encoded or stored thereon. The carrier may be a tangible non-transitory computer-readable medium, such as a magnetic, magneto optical, or optical disk, a solid state drive, a random access memory (RAM), a read-only memory (ROM), or other types of media.

Alternatively, or in addition, the carrier may be an artificially generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

Processors for execution of a computer program include, by way of example, both general- and special-purpose microprocessors, and any one or more processors of any kind of digital computer. Generally, a processor will receive the instructions of the computer program for execution as well as data from a non-transitory computer-readable medium coupled to the processor.

The term "data processing apparatus" encompasses all kinds of apparatuses, devices, and machines for processing data, including by way of example a programmable processor, a computer, or multiple processors or computers. Data processing apparatus can include special-purpose logic circuitry, e.g., an FPGA (field programmable gate array), an ASIC (application specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

The processes and logic flows described in this specification can be performed by one or more computers or processors executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read only memory or a random access memory or both. Elements of a computer can include a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more storage devices. The storage devices can be, for example, magnetic, magneto optical, or optical disks, solid state drives, or any other type of non-transitory, computer-readable media. However, a computer need not have such devices. Thus, a computer may be coupled to one or more storage devices, such as, one or more memories, that are local and/or remote. For example, a computer can include one or more local memories that are integral components of the computer, or the computer can be coupled to one or more remote memories that are in a cloud network. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Components can be "coupled to" each other by being commutatively such as electrically or optically connected to one another, either directly or via one or more intermediate components. Components can also be "coupled to" each other if one of the components is integrated into the other. For example, a storage component that is integrated into a processor (e.g., an L2 cache component) is "coupled to" the processor.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific embodiment details, these should not be construed as limitations on the scope of what is being claimed, which is defined by the claims themselves, but rather as descriptions of features that may be specific to particular embodiments. Certain features that are described in this specification in the context of separate embodiments can also be realized in combination in a single embodiment. Conversely, various features that are described in the context of a single embodiments can also be realized in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous. The consortium blockchain digital activity identifier does not necessarily have to be a decentralized identifier, and can be any combination of the user digital identity decentralized identifier (e.g., 512) and the consortium blockchain decentralized identifier BizDID (e.g., 610), such as concatenation of the user digital identity decentralized identifier and the consortium blockchain decentralized identifier BizDID.

The invention claimed is:

1. A computer-implemented method, comprising:
    generating a first decentralized identifier based on information about a second decentralized identifier and information about a third decentralized identifier, wherein the second decentralized identifier is associated with a first user, and wherein the third decentralized identifier is associated with a first blockchain that is configured to store records associated with the first user;
    registering a first set of records and the first decentralized identifier at a second blockchain, wherein the first set of records include data associated with the first user, wherein the first set of records is stored in a first consortium blockchain, wherein the second blockchain includes one or more blockchain contracts configured to, upon execution, perform one or more operations associated with the first decentralized identifier, and wherein registering the first set of records includes storing a hash value for each record in the first set of records in the second blockchain; and
    controlling authorization of access to the first set of records based on the first decentralized identifier, including, in response to receiving a request to grant a second user access to a particular record in the first set of records, determining whether the request includes the first decentralized identifier.

2. The computer-implemented method of claim 1, wherein the first decentralized identifier comprises a digital activity decentralized identifier, the second decentralized identifier comprises a digital identity decentralized identifier, and the third decentralized identifier comprises a business decentralized identifier.

3. The computer-implemented method of claim 1, wherein the first set of records is generated or managed by a business system that provides a service to the first user, and the business system manages storage of the first set of records into the first consortium blockchain and retrieval of the first set of records from the first consortium blockchain.

4. The computer-implemented method of claim 1, wherein the first blockchain comprises a consortium blockchain.

5. The computer-implemented method of claim 1, wherein the second blockchain comprises a decentralized identifier blockchain that is configured to store records associated with a plurality of decentralized identifiers of a plurality of users, and the decentralized identifier blockchain includes one or more blockchain contracts configured to, upon execution, perform one or more operations associated with the decentralized identifiers.

6. The computer-implemented method of claim 1, wherein the request includes a first value that represents a hash value of the particular record, wherein controlling authorization of access to the first set of records includes:
    comparing the first value in the request with a hash value of the particular record stored in the second blockchain, and
    at least one of (i) upon determining that the first value in the request is equal to the hash value of the particular record stored in the second blockchain, approving the request to grant the second user access to the particular record, or (ii) upon determining that the first value in the request is different from the hash value of the particular record stored in the second blockchain, denying the request to grant the second user access to the particular record.

7. The computer-implemented method of claim 1, comprising sending a first message to a first application program associated with the first user to cause the first application program to retrieve the particular record from the first blockchain and present the particular record for review by the first user.

8. The computer-implemented method of claim 7, wherein the first message includes a first value that represents the hash value of the particular record, and the first message is configured to cause the first application program to perform operations comprising:
    calculating a second value that represents a hash value of the particular record retrieved from the first blockchain, comparing the first value with the second value, and
    at least one of (i) upon determining that the first value is equal to the second value, approving the request to grant the second user access to the particular record, or (ii) upon determining that the first value is different from the second value, denying the request to grant the second user access to the particular record.

9. A computer-implemented system, comprising:
    one or more computers; and
    one or more computer memory devices interoperably coupled with the one or more computers and having tangible, non-transitory, machine-readable media storing one or more instructions that, when executed by the one or more computers, perform one or more operations comprising:

generating a first decentralized identifier based on information about a second decentralized identifier and information about a third decentralized identifier, wherein the second decentralized identifier is associated with a first user, and wherein the third decentralized identifier is associated with a first blockchain that is configured to store records associated with the first user;

registering a first set of records and the first decentralized identifier at a second blockchain, wherein the first set of records include data associated with the first user, wherein the first set of records is stored in a first consortium blockchain, wherein the second blockchain includes one or more blockchain contracts configured to, upon execution, perform one or more operations associated with the first decentralized identifier, and wherein registering the first set of records includes storing a hash value for each record in the first set of records in the second blockchain; and controlling authorization of access to the first set of records based on the first decentralized identifier, including, in response to receiving a request to grant a second user access to a particular record in the first set of records, determining whether the request includes the first decentralized identifier.

10. The computer-implemented system of claim 9, wherein the first decentralized identifier comprises a digital activity decentralized identifier, the second decentralized identifier comprises a digital identity decentralized identifier, and the third decentralized identifier comprises a business decentralized identifier.

11. The computer-implemented system of claim 9, wherein the first set of records is generated or managed by a business system that provides a service to the first user, and the business system manages storage of the first set of records into the first consortium blockchain and retrieval of the first set of records from the first consortium blockchain.

12. The computer-implemented system of claim 9, wherein the first blockchain comprises a consortium blockchain.

13. The computer-implemented system of claim 9, wherein the second blockchain comprises a decentralized identifier blockchain that is configured to store records associated with a plurality of decentralized identifiers of a plurality of users, and the decentralized identifier blockchain includes one or more blockchain contracts configured to, upon execution, perform one or more operations associated with the decentralized identifiers.

14. The computer-implemented system of claim 9, wherein the request includes a first value that represents a hash value of the particular record, wherein controlling authorization of access to the first set of records includes:

comparing the first value in the request with a hash value of the particular record stored in the second blockchain, and at least one of (i) upon determining that the first value in the request is equal to the hash value of the particular record stored in the second blockchain, approving the request to grant the second user access to the particular record, or (ii) upon determining that the first value in the request is different from the hash value of the particular record stored in the second blockchain, denying the request to grant the second user access to the particular record.

15. The computer-implemented system of claim 9, the operations further comprising sending a first message to a first application program associated with the first user to cause the first application program to retrieve the particular record from the first blockchain and present the particular record for review by the first user.

16. The computer-implemented system of claim 15, wherein the first message includes a first value that represents the hash value of the particular record, and the first message is configured to cause the first application program to perform operations comprising:

calculating a second value that represents a hash value of the particular record retrieved from the first blockchain, comparing the first value with the second value, and at least one of (i) upon determining that the first value is equal to the second value, approving the request to grant the second user access to the particular record, or (ii) upon determining that the first value is different from the second value, denying the request to grant the second user access to the particular record.

17. A non-transitory, computer-readable medium storing one or more instructions executable by a computer system to perform operations comprising:

generating a first decentralized identifier based on information about a second decentralized identifier and information about a third decentralized identifier, wherein the second decentralized identifier is associated with a first user, and wherein the third decentralized identifier is associated with a first blockchain that is configured to store records associated with the first user;

registering a first set of records and the first decentralized identifier at a second blockchain, wherein the first set of records include data associated with the first user, wherein the first set of records is stored in a first consortium blockchain, wherein the second blockchain includes one or more blockchain contracts configured to, upon execution, perform one or more operations associated with the first decentralized identifier, and wherein registering the first set of records includes storing a hash value for each record in the first set of records in the second blockchain; and controlling authorization of access to the first set of records based on the first decentralized identifier, including, in response to receiving a request to grant a second user access to a particular record in the first set of records, determining whether the request includes the first decentralized identifier.

18. The non-transitory, computer-readable medium of claim 17, wherein the first decentralized identifier comprises a digital activity decentralized identifier, the second decentralized identifier comprises a digital identity decentralized identifier, and the third decentralized identifier comprises a business decentralized identifier.

19. The non-transitory, computer-readable medium of claim 17, wherein the request includes a first value that represents a hash value of the particular record, wherein controlling authorization of access to the first set of records includes:

comparing the first value in the request with a hash value of the particular record stored in the second blockchain, and at least one of (i) upon determining that the first value in the request is equal to the hash value of the particular record stored in the second blockchain, approving the request to grant the second user access to the particular record, or (ii) upon determining that the first value in the request is different from the hash value of the particular record stored in the second blockchain, denying the request to grant the second user access to the particular record.

20. The non-transitory, computer-readable medium of claim 17, the operations further comprising sending a first message to a first application program associated with the first user to cause the first application program to retrieve the particular record from the first blockchain and present the particular record for review by the first user.

* * * * *